US011178608B2

(12) United States Patent
Ingale et al.

(10) Patent No.: US 11,178,608 B2
(45) Date of Patent: Nov. 16, 2021

(54) METHOD AND SYSTEM FOR SYSTEM INFORMATION ACQUISITION IN WIRELESS COMMUNICATION SYSTEM

(71) Applicant: Samsung Electronics Co., Ltd., Gyeonggi-do (KR)

(72) Inventors: Mangesh Abhimanyu Ingale, Bangalore (IN); Anil Agiwal, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/908,300

(22) Filed: Jun. 22, 2020

(65) Prior Publication Data

US 2020/0359310 A1  Nov. 12, 2020

Related U.S. Application Data

(63) Continuation of application No. 16/319,710, filed as application No. PCT/KR2017/007916 on Jul. 21, 2017, now Pat. No. 10,694,460.

(30) Foreign Application Priority Data

Jul. 22, 2016 (IN) .................. 201641025194 PS
Jul. 20, 2017 (IN) .................. 201641025194 CS

(51) Int. Cl.
  *H04W 24/06* (2009.01)
  *H04W 48/20* (2009.01)
  (Continued)

(52) U.S. Cl.
  CPC .......... *H04W 48/20* (2013.01); *H04W 48/10* (2013.01); *H04W 48/14* (2013.01); *H04W 48/16* (2013.01);
  (Continued)

(58) Field of Classification Search
  CPC ..... H04W 48/20; H04W 48/16; H04W 48/14; H04W 48/10; H04W 76/11;
  (Continued)

(56) References Cited

U.S. PATENT DOCUMENTS

2007/0111751 A1   5/2007  Iimori
2008/0313300 A1  12/2008  Alanara et al.
(Continued)

FOREIGN PATENT DOCUMENTS

CN   102970729   3/2013
CN   108605268   9/2018
(Continued)

OTHER PUBLICATIONS

Samsung, "Preliminary View on Initial Access in 5G", R2-162300, 3GPP TSG-RAN WG2 Meeting #93bis, Apr. 11-15, 2016, 3 pages.
(Continued)

*Primary Examiner* — Afshawn M Towfighi
(74) *Attorney, Agent, or Firm* — The Farrell Law Firm, P.C.

(57) ABSTRACT

Disclosed is a method that decodes a broadcast channel to obtain first system information periodically broadcasted from a base station; applies at least one cell selection parameter indicated in the first system information to camp on a cell served by the base station and storing the first system information; accesses the camped cell based on at least one random access parameter indicated in the first system information; and determines whether at least one of a system information block of second system information available in the camped cell is provided based on at least one of the periodic broadcast and an on-demand basis. The on-demand basis to deliver the corresponding system information block of the second system information available in the camped cell is decided based on at least one of an
(Continued)

indication and a flag included in the first system information for the system information block.

10 Claims, 20 Drawing Sheets

(51) Int. Cl.

| | | |
|---|---|---|
| *H04W 48/16* | (2009.01) | |
| *H04W 48/14* | (2009.01) | |
| *H04W 48/10* | (2009.01) | |
| *H04W 76/11* | (2018.01) | |
| *H04W 56/00* | (2009.01) | |
| *H04W 68/00* | (2009.01) | |
| *H04W 72/04* | (2009.01) | |
| *H04W 48/12* | (2009.01) | |
| *H04W 84/04* | (2009.01) | |

(52) U.S. Cl.
CPC ....... *H04W 56/001* (2013.01); *H04W 68/005* (2013.01); *H04W 72/042* (2013.01); *H04W 76/11* (2018.02); *H04W 48/12* (2013.01); *H04W 68/00* (2013.01); *H04W 84/042* (2013.01)

(58) Field of Classification Search
CPC ............. H04W 56/001; H04W 68/005; H04W 72/042; H04W 48/12; H04W 68/00; H04W 84/042; H04W 48/08; H04W 68/02

See application file for complete search history.

(56) References Cited

U.S. PATENT DOCUMENTS

| | | | |
|---|---|---|---|
| 2015/0056988 A1 | 2/2015 | Goel et al. | |
| 2015/0351011 A1* | 12/2015 | Shukla | H04W 48/16 455/434 |
| 2016/0316411 A1* | 10/2016 | Jung | H04W 4/70 |
| 2017/0111886 A1* | 4/2017 | Kim | H04W 72/042 |
| 2020/0146075 A1 | 5/2020 | Agiwal et al. | |
| 2020/0187096 A1 | 6/2020 | Mustapha | |

FOREIGN PATENT DOCUMENTS

| | | |
|---|---|---|
| EP | 3 409 048 | 12/2018 |
| WO | WO 2011/152999 | 12/2011 |
| WO | WO 2015/084046 | 6/2015 |
| WO | WO 2017/065548 | 4/2017 |
| WO | WO 2017/150863 | 9/2017 |

OTHER PUBLICATIONS

ZTE, "Consideration on the System Information in NR", R2-163743, 3GPP TSG-RAN WG2 Meeting #94, May 23-27, 2016, 4 pages.
Samsung, "System Information Signalling Design in NR", R2-163371, 3GPP TSG-RAN WG #94, May 23-27, 2016, 7 pages.
European Search Report dated May 20, 2019 issued in counterpart application No. 17831394.6-1214, 14 pages.
PCT/ISA/210 Search Report dated Oct. 26, 2017 issued on PCT/KR2017/007916 (pp. 3).
PCT/ISA/237 Written Opinion dated Oct. 26, 2017 issued on PCT/KR2017/007916 (pp. 7).
NEC, "LTE BCH-On-Demand", R2-062930, TSG-RAN Working Group2#55, Oct. 9-13, 2006, 5 pages.
NEC, "Further Clarification of On-Demand S-BCH", R2-063090, TSG-RAN Working Group2#56, Nov. 6-10, 2006, 5 pages.
Nortel, "System Information Broadcast Gating", R2-063137, 3GPP TSG RAN WG2#56, Nov. 6-10, 2006, 5 pages.
Chinese Office Action dated Aug. 12, 2020 issued in counterpart application No. 201780044717.8, 32 pages.
Sony, "System Information Area Scope and Value Tag", R2-161140, 3GPP TSG RAN WG2 Meeting #93, Feb. 15-19, 2016, 4 pages.
European Search Report dated Oct. 4, 2021 issued in counterpart application No. 21181436.3-1212, 10 pages.

* cited by examiner

System Information Table (SIT)

System Information Block X: Parameter A; Parameter B; Parameter C

Configuration List for System Information Block X

Config 1: SCI#1 {a0, b0, c1}
Config 2: SCI#2: {a0, b1, c1}
Config 3: SCI#3: {a1, b1, c1}

System Information Block Y: Parameter D; Parameter E

Configuration List for System Information Block Y

Config 1: SCI#1 {d0, e0}
Config 2: SCI#2: {d0, e1}
Config 3: SCI#3: {d1, e1}

System Information Block Z: Parameter F; Parameter G, Parameter H

Configuration List for System Information Block Z

Config 1: SCI#1 {f0, g0, h1}
Config 2: SCI#2: {f0, g1, h1}

Linking of Area-Id and SCI

Area ID#1::SIB X:SCI#1, SIB Y: SCI#3, SIB Z: SCI#1
Area ID#2::SIB X:SCI#2, SIB Y: SCI#1, SIB Z: SCI#1
Area ID#3::SIB X:SCI#3, SIB Y: SCI#3, SIB Z: SCI#1

FIG. 5a

METHOD AND SYSTEM FOR SYSTEM INFORMATION ACQUISITION IN WIRELESS COMMUNICATION SYSTEM

PRIORITY

This application is a Continuation of, and claims benefit of, U.S. patent application Ser. No. 16/319,710, filed with the U.S. Patent and Trademark Office on Jan. 22, 2019, and claims priority to International Application No. PCT/KR2017/007916, which was filed on Jul. 21, 2017, and further claims priority to Indian Patent Application Nos. 201641025194 (PS) and 201641025194 (CS), which were filed on Jul. 22, 2016 and Jul. 20, 2017, respectively, the content of each of which are incorporated herein by reference.

BACKGROUND

1. Field

The embodiment herein generally relates to a wireless communication system, and more specially related to a method and system for System Information (SI) acquisition in the wireless communication system.

2. Description of the Related Art

The present disclosure relates to a pre-5th-Generation (5G) or 5G communication system being developed to meet the growing demand for high speed data services, support ultra-reliability and low latency applications and support massive machine type communication beyond 4th-Generation (4G) communication system such as Long Term Evolution (LTE) system.

In order to meet the demand of exponentially increasing data traffic and new services, efforts are being made to develop an improved 5G or the pre-5G communication system. Therefore, the 5G or pre-5G communication system is also called a 'Beyond 4G Network' or a 'Post LTE System' or 'Next generation of International Mobile Telecommunication (IMT)-Advanced' system or IMT-2020 system.

The 5G communication system is considered to be implemented in higher frequency (mmWave) bands (e.g., 10 GHz to 100 GHz bands), so as to accomplish higher data rates. In order to mitigate propagation loss of radio waves and increase transmission distance of the radio waves, a beamforming, massive Multiple-Input Multiple-Output (MIMO), Full Dimensional MIMO (FD-MIMO), array antenna, an analog beam forming, large scale antenna techniques are discussed in the 5G communication system.

In addition, in the 5G communication systems, development for the system network improvement is under way based on advanced small cells, cloud Radio Access Networks (RANs), ultra-dense networks, Device-to-Device (D2D) communication, wireless backhaul, moving network based on mobile relay, cooperative communication, Coordinated Multi-Points (CoMP), reception-end interference cancellation and the like.

In the 5G communication system, Hybrid FSK and QAM Modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) are potential candidates for advanced access technology.

In addition, the next generation wireless system is expected to address different use cases having quite different requirements in terms of data rate, latency, reliability, mobility etc. However, it is expected that the design of an air-interface of the next generation wireless system is flexible enough to serve a User Equipment's (UEs) having quite different capabilities depending on the use case and market segment the UE cater service to an end customer. Few example use cases the next generation wireless system is expected to address the enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for an autonomous vehicle (e.g., autonomous cars, or the like).

Further, a physical layer of the wireless cellular system in both a Downlink (DL) and an Uplink (UL) operating in mmWave/cmWave would be based on new air-interface different from that of IMT-Advanced air-interface to meet the challenging requirements and provide enhanced mobile broadband user experience. Further, next generation of the IMT-Advanced wireless cellular system is expected to deliver several 100 Mbps to a few tens of Gbps user experienced data rates in comparison to the wireless systems based on the IMT-Advanced. These very high data rates need to be available ubiquitously across the coverage area.

Further, apart from the user experienced data rates next generation of the wireless cellular system is expected to deliver on other requirements like peak data rate (few 10 of Gbps), reduced latency (down to 1 ms), better spectral efficiency compared to the IMT-Advanced system and many other requirements. The next generation of the wireless cellular system is foreseen to be deployed in the higher frequency bands above 6 GHz (e.g., 10 GHz~100 GHz, also called mmWave and/or cmWave) due to availability of large amount of spectrum bandwidths. In an initial phase of deployment next generation of the wireless cellular system is expected to be deployed in lower frequency bands below 6 GHz using spectrum farming techniques.

Further, one of the requirements for next generation RAT is energy efficiency; so the design of system information provisioning needs to address the energy efficiency requirement to minimize always ON periodic broadcast. Another aspect related to broadcasting of the system information is high signaling overhead in the context of next generation RAT operation in the higher frequency bands (above 6 GHz) where a DL beam sweeping operation is inevitable to reach the coverage area of the cell. Broadcasting all the system information on the coverage beams which are subject to the DL beam sweeping may lead to excessive signaling overhead. Therefore, another design criterion for system information provisioning needs to address the signaling overhead aspect.

Further, another aspect related to broadcasting of the system information using the DL beam sweeping is restrictive and inflexible scheduling. The transmission resources remaining after resources consumed by the system information may be only used for data scheduling for the user in the direction of the DL coverage beam. Therefore, if more time/frequency resources are consumed by the system information then user data scheduling becomes restrictive and inflexible. For the sake of illustration of disclosed methods for acquisition of system information by the UE it is assumed the air-interface of the next generation wireless cellular system would be based on Orthogonal Frequency Division Multiple-access (OFDMA) Radio Access Technology (RAT) in the DL and the UL. However the numerology (i.e. OFDM symbol duration, carrier spacing etc.) of next generation RAT can be different from the OFDMA numerology of the IMT-Advanced system.

SUMMARY

An object of the embodiments herein is to provide a method and system for provisioning system information (SI) in a wireless communication system.

According to an aspect of the present application, a method performed by a terminal in a wireless communication system is provided, with the method including acquiring a system information block (SIB) broadcasted from a first cell, the SIB includes a system configuration index associated with the SIB, a system information area identifier associated with the SIB and an indicator indicating area specific or cell specific for the SIB; storing the acquired SIB; upon performing a cell selection from the first cell to a second cell, acquiring an other SIB broadcasted from the second cell, the other SIB includes a system configuration index associated with the other SIB, a system information area identifier associated with the other SIB and an indicator indicating area specific or cell specific for the other SIB; and determining a validity of the stored SIB in the second cell by comparing the system configuration index associated with the other SIB, the system information area identifier associated with the other SIB and the indicator indicating area specific or cell specific for the other SIB with the system configuration index associated with the SIB, the system information area identifier associated with the SIB and the indicator indicating area specific or cell specific for the SIB.

According to another aspect of the present application, a terminal in a wireless communication system is provided, with the terminal including a transceiver and at least one processor which is configured to: acquire via the transceiver a system information block (SIB) broadcasted from a first cell, the SIB includes a system configuration index associated with the SIB, a system information area identifier associated with the SIB and an indicator indicating area specific or cell specific for the SIB, store the acquired SIB, upon performing a cell selection from the first cell to a second cell, acquire via the transceiver an other SIB broadcasted from the second cell, the other SIB includes a system configuration index associated with the other SIB, a system information area identifier associated with the other SIB and an indicator indicating area specific or cell specific for the other SIB, and determine a validity of the stored SIB in the second cell by comparing the system configuration index associated with the other SIB, the system information area identifier associated with the other SIB and the indicator indicating area specific or cell specific for the other SIB with the system configuration index associated with the SIB, the system information area identifier associated with the SIB and the indicator indicating area specific or cell specific for the SIB. is provided that

BRIEF DESCRIPTION OF THE DRAWINGS

The present disclosure is illustrated in the accompanying drawings, throughout which like reference letters indicate corresponding parts in the various figures. The embodiments herein will be better understood from the following description with reference to the drawings, in which:

The embodiments herein will be better understood from the following detailed description with reference to the drawings, in which:

FIGS. 5a to 5c are depicting a schematic illustration of a system information table and applicability of system information configuration according to a system configuration index, according to an embodiment as disclosed herein;

DETAILED DESCRIPTION

Figure 1:
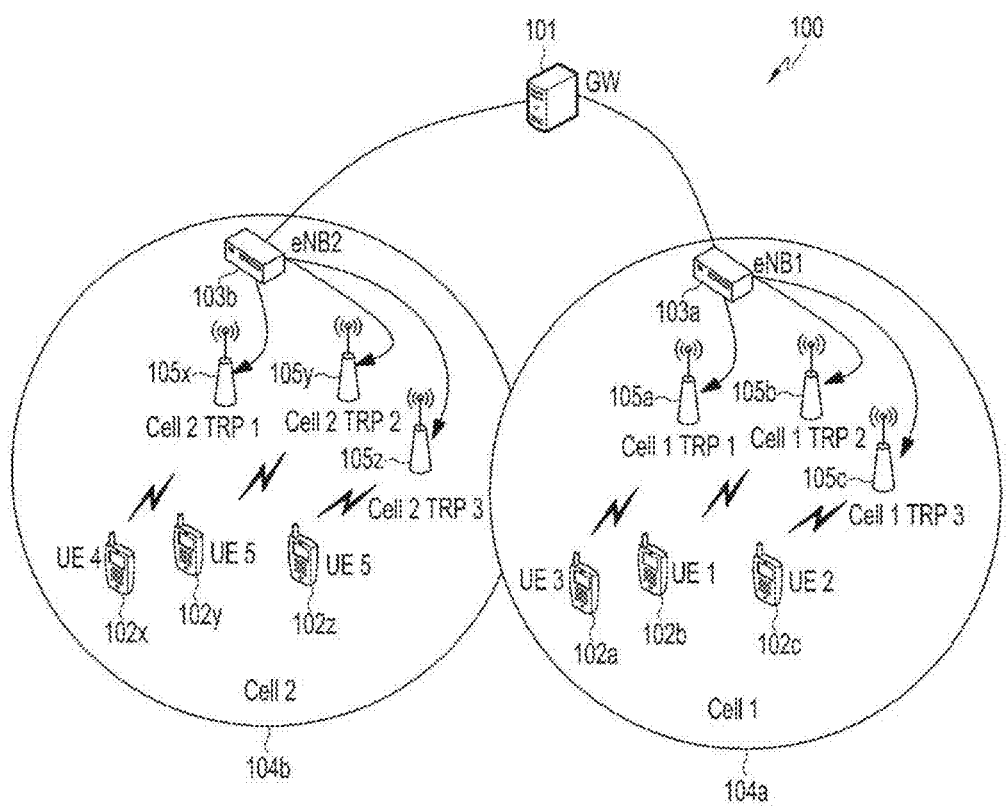
FIG. 1 is an example illustration of a Radio Access Network (RAN) deployment of next generation wireless system, according to an embodiment as disclosed herein.

Embodiments herein disclose a method for provisioning system information (SI) for a user equipment (UE) in a wireless communication system.

The method includes decoding a broadcast channel to acquire first system information periodically transmitted by a base station; applying at least one cell selection parameter indicated in the first system information to camp on a cell served by the base station; storing the first system information; accessing the camped cell based on at least one random access parameter indicated in the first system information; determining whether at least one of a system information block of second system information available in the camped cell is provided based on at least one of a periodic broadcast and an on-demand basis, wherein the on-demand basis to deliver the system information block of the second system information available in the camped cell is decided based on at least one of an indication and a flag included in the first system information for the system information block; and monitoring a paging channel to receive a paging message to determine whether at least one of the system information blocks available in the camped cell is expected to be updated.

In an embodiment, the first system information is periodically transmitted on at least a primary broadcast channel (PBCH) and a secondary broadcast channel (SBCH), wherein the first system information comprises at least a first master information block (MIB) and a second master information block.

In an embodiment, a system information request procedure is triggered on a resource to access the camped cell to indicate to the base station to transmit at least one system information block of the second system information after determining the corresponding system information blocks of the second system information is provided based on the on-demand basis if the at least one of the indication and the flag in the first system information for the system information block is not enabled.

In an embodiment, a system information request procedure is not triggered after determining all the system information blocks of the second system information available in the camped cell is provided through the periodic broadcast if the at least one of the indication and the flag in the first system information for the respective system information block is enabled.

In an embodiment, the method further comprises: monitoring respective system information windows indicated by scheduling information included in the first system information to acquire one or more system information blocks of the second system information available in the camped cell; and storing the one or more system information blocks of the second system information available in the camped cell acquired by the user equipment either through the periodic broadcast or by triggering the system information request procedure, wherein the stored system information blocks of the second system information are associated with at least a system information area identifier (SAID) and system information configuration index (SCI).

Embodiments herein disclose a method for provisioning SI by a base station in a wireless communication system. The method includes transmitting a broadcast channel to at least one user equipment (UE) in a wireless communication system, wherein the broadcast channel periodically transmits first system information comprising at least a first master information block (MIB) and a second master information block; providing second system information to at least one user equipment in the wireless communication system based on at least one of a periodic broadcast and an on-demand basis, wherein the on-demand delivery of at least one system information block of the second system information is based on system information request procedure triggered by at least one user equipment, and the on-demand basis to deliver the system information block of the second system information available in the camped cell is decided based on at least one of an indication and a flag included in the first system information for the system information block; and transmitting a paging message on a paging channel to indicate, to at least one user equipment, that at least one of the system information blocks available in the camped cell is expected to be updated.

In an embodiment, the first system information is periodically transmitted on at least a primary broadcast channel (PBCH) and a secondary broadcast channel (SBCH), wherein the first system information comprises at least a first master information block (MIB) and a second master information block.

In an embodiment, the first system information comprises a plurality of system configuration index (SCI) and a system information area identifier (SAID), wherein each system configuration index is associated with a configuration of respective system information block (SIB) available as second system information in the camped cell, and wherein the system information area identifier defines a system information area validity scope for the plurality of system configuration index.

In an embodiment, the first system information comprises at least a downlink (DL) system bandwidth information, system frame number (SFN), list of public land mobile network identifiers (list of PLMN-ID), tracking area code (TAC), global cell identifier, transmission reception point identifier (TRP-ID), TRP-Group ID, system information area identifier (SAID), a cell barred status, a configuration comprising resource for requesting one or more system information blocks of the second system information provided on-demand basis, scheduling information related to SI windows for reception of one or more SI blocks of the second system information, an enhanced physical downlink control channel (ePDCCH) configuration, cell selection parameters for camping, random access parameters, a plurality of indicators, and a plurality of system configuration index (SCI).

Embodiments herein disclose a user equipment (UE) for provisioning SI in the wireless communication system. The UE is configured to decode a broadcast channel to acquire first system information periodically transmitted by a base station; apply at least one cell selection parameter indicated in the first system information to camp on a cell served by the base station; store the first system information; access the camped cell based on at least one random access parameter indicated in the MSI; determine whether at least one of a system information block of second system information available in the camped cell is provided based on at least one of a periodic broadcast and an on-demand basis, wherein the on-demand basis to acquire the system information block of the second system information available in the camped cell is decided based on at least one of an indication and a flag included in the first system information for the system information block; and monitor a paging channel to receive a paging message to determine whether at least one of the system information blocks available in the camped cell is expected to be updated.

In an embodiment, the first system information comprises a plurality of system configuration index (SCI) and a system information area identifier (SAID), wherein each system configuration index is associated with a configuration of respective system information block (SIB) available as second system information in the camped cell, and wherein the system information area identifier defines a system information area validity scope for the plurality of system configuration index.

In an embodiment, the first system information comprises at least a downlink (DL) system bandwidth information, system frame number (SFN), list of public land mobile network identifiers (list of PLMN-ID), tracking area code (TAC), global cell identifier, transmission reception point identifier (TRP-ID), TRP-Group ID, system information area identifier (SAID), a cell barred status, a configuration comprising resource for requesting one or more system information blocks of second system information provided on-demand basis, scheduling information related to system information windows for reception of one or more system information blocks of second system information, an enhanced physical downlink control channel (ePDCCH) configuration, cell selection parameters for camping, random access parameters, a plurality of indicators, and a plurality of system configuration index (SCI).

In an embodiment, monitoring the paging channel comprises determining whether at least one of the system information blocks available in the camped cell is expected to be updated.

Embodiments herein disclose a base station for provisioning SI in a wireless communication system. The base station is configured to transmit a broadcast channel to at least one user equipment (UE) in a wireless communication system, wherein the broadcast channel periodically transmits first system information (MSI) comprising at least a first master information block (MIB) and a second master information block; and provide second system information to at least one user equipment in the wireless communication system based on at least one of a periodic broadcast and an on-demand basis, wherein the on-demand delivery of at least one system information block of the second system information is based on system information request procedure triggered by at least one user equipment, and the on-demand basis to deliver the corresponding the system information block of the second system information available in the camped cell is decided based on at least one of an indication and a flag included in the first system information for the system information block; and transmit a paging message on a paging channel to indicate, to at least one user equipment, that at least one of the system information blocks available in the camped cell is expected to be updated.

In an embodiment, at least the system information change indicator and one or more system information block types and associated system configuration index included in the paging message is transmitted in a current system modification interval indicating a configuration corresponding to at least one system information block is updated from the start of next system modification interval.

The method includes decoding a broadcast channel to acquire Minimum System Information (MSI) periodically transmitted by a base station. Further, the method includes storing the MSI and applying at least one cell selection parameter indicated in the MSI to camp on a cell served by the base station. Further, the method includes accessing the camped cell based on at least one random access parameter indicated in the MSI. Further, the method includes determining whether at least one of a SI block of Other System Information (OSI) available in the camped cell is provided based on at least one of the periodic broadcast and an on-demand basis. The on-demand basis to deliver the SI block of the OSI available in the camped cell is decided based on at least one of an indication and a flag included in the MSI for the SI block. Further, the method includes monitoring a paging channel to receive a paging message to determine whether at least one of the SI blocks available in the camped cell is expected to be updated.

In an embodiment, the MSI is periodically transmitted on at least one of a Primary Broadcast Channel (PBCH) and a Secondary Broadcast Channel (SBCH). The MSI comprises at least one of a first Master Information Block (MIB) and a second MIB.

In an embodiment, the first MIB is transmitted on the PBCH and the second MIB is transmitted on the SBCH, wherein scheduling information of the SBCH is indicated in the first MIB.

In an embodiment, the scheduling information included in the first MIB indicates at least one of periodicity of the second MIB transmitted on the SBCH and an absence of the second MIB when the second MIB is not transmitted on the SBCH.

In an embodiment, when the scheduling information included in the first MIB indicates the absence of the second MIB then the cell is considered as barred because the UE cannot acquire the full contents of the MSI.

In an embodiment, a SI request procedure is triggered on a resource to access the camped cell to indicate the base station to transmit at least one SI block of the OSI after determining the at least one of SI blocks of the OSI is provided based on the on-demand basis if the at least one of the indication and the flag in the MSI for the SI block is not enabled.

In an embodiment, a SI request procedure is not triggered after determining all the SI blocks of the OSI available in camped cell is provided through the periodic broadcast if the at least one of the indication and the flag in the MSI for the respective SIB blocks is enabled.

In an embodiment, the method further includes monitoring respective SI windows indicated by scheduling information included in the MSI to acquire one or more SI blocks of the OSI available in the camped cell. Further, the method includes storing the one or more SI blocks of the OSI available in the camped cell acquired by the UE either through the periodic broadcast or by triggering the SI request procedure wherein, the stored SI blocks of the OSI are associated with at least a System Information Area Identifier (SAID) and System Information Configuration Index (SCI).

In an embodiment, the MSI includes a plurality of System Configuration Index (SCI) and a System Information Area Identifier (SAID). Each SCI is associated with a configuration of respective SI block (SIB) available as OSI in the camped cell. The SAID defines a SI area validity scope for the plurality of SCI.

In an embodiment, the SAID and the plurality of SCI broadcasted in the MSI is at least one of a single identifier and separate identifiers conveying the configuration of the respective SI block (SIB) and SI area validity scope.

In an embodiment, the MSI comprises at least a downlink (DL) system bandwidth information, System Frame Number (SFN), list of Public Land Mobile Network Identifiers (list of PLMN-ID), Tracking Area Code (TAC), Global Cell Identifier, Transmission Reception Point Identifier (TRP-ID), TRP-Group ID, System Information Area Identifier (SAID), a cell barred status, a configuration comprising resource for requesting one or more SI blocks of OSI provided on-demand basis, scheduling information related to SI windows for reception of one or more SI blocks of OSI, an enhanced physical downlink control channel (ePDCCH) configuration, cell selection parameters for camping, random access parameters, a plurality of indicators, and a plurality of System Configuration Index (SCI).

In an embodiment, monitoring the paging channel includes determining whether at least one of the SI blocks available in the camped cell is expected to be updated.

In an embodiment, checking if at least one of a system information change indicator included in the paging message, a plurality of SCI associated with updated SI block included in the paging message, and a system information area identifier (SAID) included in the paging message.

In an embodiment, the update of configuration of at least one SI block is determined based on the presence of system information change indicator in the paging message, wherein the system information change indicator comprises at least one of a single bit indicating that at least one SI block available in the cell is expected to be updated, and a bitmap indicating which SI block available in the cell is expected to be updated.

In an embodiment, the update of configuration of at least one SI block is determined based on the presence of plurality of SCI in the paging message, wherein if the SCI associated with the SI block in the paging message is different from the SCI of the respective SI block acquired previously from the MSI in the camped cell.

In an embodiment, the update of configuration of at least one SI block is determined based on the presence of SAID in the paging message, wherein if the SAID in the paging message is different from the SAID acquired previously from the MSI in the camped cell.

In an embodiment, the at least one of the system information change indicator and plurality of SCI included in the paging message is transmitted in a current system modification interval indicating a configuration corresponding to at least one SI block is updated from the start of next system modification interval.

Embodiments herein disclose a method for provisioning SI by a base station in a wireless communication system. The method includes transmitting a broadcast channel to at least one UE in a wireless communication system. The broadcast channel periodically transmits the Minimum System Information (MSI) which includes at least the first MIB and the second MIB. Further, the method includes providing the Other System Information (OSI) to at least UE in the wireless communication system based on at least one of a periodic broadcast and an on-demand basis, wherein the on-demand delivery of at least one SI block of the Other System Information (OSI) is based on SI request procedure triggered by at least one UE. Further, the on-demand basis to deliver at least one SI block of the OSI available in the camped cell is decided based on at least one of an indication and a flag included in the MSI for the SI block. Further, the method includes transmitting a paging message on a paging channel to indicate to at least one UE that at least one of the SI blocks available in the camped cell is expected to be updated.

Embodiments herein disclose a user equipment (UE) for provisioning SI in the wireless communication system. The UE is configured to decode a broadcast channel to acquire the MSI periodically transmitted by a base station. Further, the UE is configured to store the MSI and apply at least one cell selection parameter indicated in the MSI to camp on a cell served by the base station. Further, the UE is configured to access the camped cell based on at least one random access parameter indicated in the MSI. Further, the UE is configured to determine whether at least one of a SI block of the Other System Information (OSI) available in the camped cell is provided based on at least one of the periodic broadcast and an on-demand basis. Further, the UE is configured to monitor a paging channel to receive a paging message to determine whether at least one of the SI blocks available in the camped cell is expected to be updated.

Embodiments herein disclose a base station for provisioning SI in a wireless communication system. The base station is configured to transmit a broadcast channel to at least one User Equipment (UE). The broadcast channel periodically transmits the Minimum System Information (MSI) which includes at least the first MIB and the second MIB. Further, the base station is configured to provide the OSI to at least one UE in the wireless communication system based on at least one of a periodic broadcast and an on-demand basis; wherein the on-demand delivery of at least one SI block of the OSI is based on SI request procedure triggered by at least one UE. Further, the base station is configured to decide the delivery through on-demand basis for at least one SI block of the OSI available in the camped cell based on at least one of an indication and a flag included in the MSI for the SI block. Further, the base station is configured to transmit a paging message on a paging channel to indicate to at least one UE that at least one of the SI blocks available in the camped cell is expected to be updated.

Embodiments herein disclose a system for provisioning the SI in a wireless communication system. The system includes a base station configured to transmit a broadcast channel to at least one UE. The UE is configured to decode a broadcast channel to acquire the MSI periodically transmitted by a base station. Further, the UE is configured to store the MSI and apply at least one cell selection parameter indicated in the MSI to camp on a cell served by the base station. Further, the UE is configured to access the camped cell based on at least one random access parameter indicated in the MSI. Further, the UE is configured to determine whether at least one of a SI block of Other System Information (OSI) available in the camped cell is provided based on at least one of the periodic broadcast and an on-demand basis. Further, the base station is configured to decide the delivery through on-demand basis for at least one SI block of the OSI available in the camped cell based on at least one of an indication and a flag included in the MSI for the SI block. Further, the UE is configured to monitor a paging channel to receive a paging message to determine whether at least one of the SI blocks available in the camped cell is expected to be updated.

Embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

Throughout the description, the terms base station, eNode-B (eNB), gNode-B (gNB), RAN and NW are used interchangeably. Throughout the invention the terms UE and mobile station are used interchangeably. Throughout the invention the terms changed SI, updated SI, and modified SI are used interchangeably.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly embodiment herein achieves a method for provisioning SI to a UE in a wireless communication system. The method includes decoding a broadcast channel to acquire Minimum System Information (MSI) periodically transmitted by a base station. Further, the method includes storing the MSI and applying at least one cell selection parameter indicated in the MSI to camp on a cell served by the base station. Further, the method includes accessing the camped cell based on at least one random access parameter indicated in the MSI. Further, the method includes determining whether at least one of a SI block of the Other System Information (OSI) available in the camped cell is provided based on at least one of the periodic broadcast and an on-demand basis. The on-demand basis to deliver the SI block of the OSI available in the camped cell is decided based on at least one of an indication and a flag included in the MSI for the SI block. Further, the method includes monitoring a paging channel to receive a paging message to determine whether at least one of the SI blocks available in the camped cell is expected to be updated.

In an embodiment, the minimum system information (MSI) broadcasted periodically comprises at least the DL system bandwidth. System Frame Number (SFN), list of Public Land Mobile Network Identifier (list of PLMN-ID), Tracking Area Code (TAC), Global Cell Identifier, Transmission Reception Point Identifier (TRP-ID), TRP-Group ID, System Information Area Identifier (Area-Id/SAID), Cell Barred Status (i.e. parameters for Access Control Barring (ACB)), a configuration comprising resource for requesting one or more SI blocks of Other System Information (OSI) delivered through on-demand basis, scheduling information related to System Information (SI) windows for reception of one or more SI blocks of OSI, ePDCCH configuration, parameters for camping (i.e. cell selection/cell re-selection), random access parameters, a plurality of indicators and plurality of System Configuration Index (SCI).

In an embodiment, the minimum system information is transmitted in at least one system information block called the master information block (MIB).

In an embodiment, the System Configuration Index or System Configuration Identifier (SCI) is an index/identifier which is associated with a SI block (SIB) comprising a set of system information parameters and corresponding parameter values which are provided by the network on UE request.

In an embodiment, the System Configuration Index or System Configuration Identifier (SCI) is an index/identifier associated with the configuration of a SI block (SIB) wherein, the configuration comprises a set of system information parameters and corresponding parameter values.

The plurality of indicators broadcasted on PBCH and/or SBCH comprises at least one or more of: an Other SI (OSI) broadcast indication/FLAG indicating whether the cell is broadcasting other system information (OSI), multiple SCI associated with configuration of each SI blocks (SIB) provided in other system information, System Information area identifier (Area-Id/SAID) which defines the SI area validity scope and points to the linking of Area-Id and SCI provided in other system information, a common value tag, i.e. a counter indicating at least one system information block configuration provided in other SI has changed or updated and one or more individual value tags, i.e. counter associated with change or update of configuration of corresponding SI block provided in other SI and a validity flag indicating whether the already acquired and stored system information is still valid.

In an embodiment, the Other SI (OSI) broadcast indication/FLAG transmitted in the minimum system information (MSI) indicates whether the cell is periodically broadcasting at least one SI block (SIB) of other system information (OSI) or providing at least one SI block (SIB) through on-demand basis.

In an embodiment, plurality of SCIs is broadcasted in minimum system information (MSI) on PBCH/SBCH wherein each SCI is associated with configuration of respective SI block provided in other system information.

In an embodiment, a System Information area identifier (Area-Id/SAID) is broadcasted in minimum system information (MSI) on PBCH/SBCH wherein the Area-Id/SAID points to the linking of Area-Id and plurality of SCI i.e., the Area-Id/SAID defines the SI area validity scope of the plurality of SCI.

In an embodiment, the stored SI blocks of the OSI are associated with at least a System Information Area Identifier (SAID) and System Information Configuration Index (SCI).

In an embodiment, a common value tag, i.e. a counter is broadcasted in minimum system information on PBCH/SBCH which indicates at least one system information block (SIB) provided in other SI has changed or updated.

In an embodiment, an individual value tag, i.e., counter is broadcasted in minimum system information on PBCH/SBCH wherein each individual value tag is associated with change or update of corresponding SI block (SIB) provided in other SI.

In an embodiment, a SIT invalidity flag is broadcasted in minimum system information on PBCH/SBCH which if set TRUE indicates the UE that already acquired and stored system information is not valid and UE need to clear all stored system information and acquire updated SIT.

In an embodiment, the SCI associated with each system information block (SIB) is included in the common part of the paging message.

In an embodiment, the SCI associated with each system information block is included in the common part of the paging message when the corresponding SI block is expected to be updated or changed or modified.

In an embodiment, the SCI associated with each system information block and the corresponding value tag is included in the common part of the paging message.

In an embodiment, the System Information Area Identifier (Area-Id/SAID) is included in the common part of the paging message.

In an embodiment, both Area-Id/SAID and SCI associated with each system information block is included in the common part of the paging message.

In an embodiment, the SI block type of the SI-block is included in the common part of the paging message.

In an embodiment, the SI block type and the associated SCI is included in the common part of the paging message.

In an embodiment, at least one of: system information change indication, one or more SCI associated with system information block (SIB), one or more SI block types and Area-Id/SAID is included in the paging message when the corresponding SI block is expected to be updated or changed or modified.

In an embodiment, a system information change indicator included in the common part of the paging message is transmitted in current system modification interval indicating the configuration associated with one or more system information block will be changed or updated or modified from the start of the next system modification interval.

In an embodiment, at least one of: system information change indication, Area-Id/SAID and one or more SCIs associated with system information is included in (e)PDCCH indicating the paging message i.e. included in DCI of (e)PDCCH masked/addressed with P-RNTI.

Next generation of wireless cellular operation is expected to be deployed in higher frequency above 6 GHz (e.g. 10 GHz~100 GHz, also called mmWave and/or cmWave) due to availability of large amount of spectrum bandwidths. The physical layer of wireless cellular system in both downlink (DL) and uplink (UL) operating in mmWave/cmWave would be based on new air-interface different from that of LTE-A air-interface because the radio characteristics is different for mmWave/cmWave bands. The next generation wireless system deployed in mmWave/cmWave system is expected to employ DL beam sweeping on broadcast information to provide cell coverage to the UE which would result in excessive signaling overhead. The present disclosure covers system information acquisition aspects by user equipment (UE) in such future wireless system with the design requirement to minimize broadcast control and reduce broadcast signaling overhead.

Referring now to the drawings, and more particularly to FIGS. 1 through 10b, there are shown preferred embodiments.

FIG. 1 is an example illustration of a deployment of Radio Access Network (RAN) of next generation wireless system 100, according to an embodiment as disclosed herein.

In an embodiment, the next generation wireless system 100 includes a gateway (GW) 101, a set of UE's 102a, 102b, 102c, 102x, 102y, and 102z (hereafter, the label of the UE is 102), a set of 5G eNBs 103a, 103b (hereafter, the label of the 5G eNB is 103), a set of cells 104a, 104b (hereafter, the label of the cell is 104), and a set of Transmission Reception Points (TRPs) 105a, 105b, 105x, and 105y (hereafter, the label of the TRP is 105).

The UEs 102a-102c and 102x-102z may be dispersed throughout the next generation wireless system, and each UE 102 may be stationary or in mobility. The UE 102 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UE 102 can be, for example, but not limited to a cellular phone, a smart phone, a Personal Digital Assistant (PDA), a wireless modem, a wireless communication device, a handheld device, a tablet computer, a laptop computer, a wireless local loop (WLL) station, a Universal Serial Bus (USB) dongle, a wireless router, etc.

The 5G eNB 103 may also include or be referred to by those skilled in the art as a base station, a base transceiver station, a radio base station, an access point, a radio transceiver, a NodeB (eNB or gNB), or some other suitable terminology.

The gateway 101 can be connected to the 5G eNB 103 for handling the frequency carrier(s) in a cell coverage area. One 5G eNB 103 may be connected to more than one GW 101. Within the coverage of 5G eNB1 and 5G eNB2 103a and 103b, the plurality of UE's 102 support multiple RAT functionalities like (GSM, UMTS, LTE) and also next generation RAT functionalities (NR/5G) are served by one or more cell(s) 104. Regardless of the UE support type, each UE 102 can access at least one carrier based on next generation RAT (NR/5G).

In an embodiment, the 5G eNB 103 is configured to transmit a broadcast channel to at least one of the UE 102. The UE 102 is configured to decode the broadcast channel to acquire the MSI periodically transmitted by the 5G eNB 103. Further, the UE 102 is configured to store the MSI and apply at least one cell selection parameter indicated in the MSI to camp on the cell 104 served by the 5G eNB 103. Further, the UE 102 is configured to access the camped cell 104 based on at least one random access parameter indicated in the MSI. Further, the UE 102 is configured to determine whether at least one of a SI block of Other System Information (OSI) available in the camped cell 104 is provided based on at least one of the periodic broadcast and an on-demand basis.

Further, the next generation wireless cellular system includes the cell 104a consists of a set of Transmission Reception Points (TRPs) 105. A fronthaul between 5G eNB 103a node and the TRPs 105 can be ideal or non-ideal. The TRPs 105 of one 5G cell 104a controlled by the 5G eNB 103 will operate to provide DL coverage beams. Further, it seems reasonable to assume all TRPs belonging to the same cell are "time synchronized" i.e. same radio frame and System Frame Number (SFN) timing. However, in some implementation TRPs may not be time synchronized. The radio frame duration of IMT-Advanced is 10 ms and the SFN range is 0-1023. The numerology of next generation RAT is assumed such that the IMT-Advanced radio frame is either multiple of radio frame of next generation RAT or radio frame of next generation RAT is exactly 10 ms. Therefore, the SFN range of next generation RAT is either 0-1023 or multiple of IMT-Advanced SFN range. This is needed to support coexistence of next generation RAT and IMT-Advanced RAT. This is also needed to support non-standalone deployment of next generation wireless system where the IMT-Advanced RAT acts as the mobility and RRC connection anchor. It is expected that the initial deployment of next generation wireless system operating in mmWave/cmWave bands would operate as non-standalone system to provide additional radio resources to the UE 102 which would be connected to IMT-Advanced or previous generation system for coverage purpose. With the assumption that next generation wireless system would be added as a capacity layer to existing IMT-Advanced deployments then from the initial standardization phase perspective the RAN architecture would be based on mechanisms similar to Carrier Aggregation (CA) or Dual-Connectivity (DC) framework specified by 3rd Generation Partnership Project (3GPP).

The maximum number of DL coverage beams 'p' will typically depend on frequency used; i.e. can be larger in higher frequency bands due to smaller antenna separation at the TRPs 105 of the 5G eNB 103. The cell 104 of the next generation wireless system is identified by a physical Cell Identifier (i.e., PCI). The UE 102 can obtain the PCI from the Synchronization Signal (SS) transmitted by the 5G cell 104 of the next generation RAT. The cell 104 of the next generation wireless system is uniquely identified by a global Cell Identifier (i.e. Global Cell-ID). The UE 102 can obtain the Global Cell-Id from the minimum system information broadcasted periodically on the PBCH by the 5G cell 104.

The UE 102 which supports legacy RAT, IMT-Advanced RAT and next generation RAT (i.e. NR/5G/IMT2020) may or may not be aware of the TRPs 105 of the next generation wireless system. The TRPs operate together to provide beams to the UE 102 and notion of the TRP 105 may be visible to the UE 102. Therefore, there is a "TRP Identifier (TRP-Id)" provided to the UE 102 over the radio of next generation RAT.

Further, the UE 102a is aware of the cell 104a of the 5G eNB 103, the TRP 105 and beams served by the respective TRP 105. The UE 102 shall detect and decode the Synchronization Signal and PBCH to determine the PCI and TRP-Id and also decode the Beam Index Sequence to determine a "Beam Identifier" (Beam-Id). Further, two types of the DL beams are considered: 1) Coverage Beams and 2) Dedicated Beams.

The coverage beams transmitted by the TRPs 105 under the control of 5G eNB 103 provide the coverage for the cell 104 of next generation system with a fixed set of directed coverage beams, also called as "grid of beams". The coverage beams cover a relatively wide area and can thus only support relatively low data rates. For example in the cell 104a there could be less than 10 DL coverage beams and more than 10 dedicated beams transmitted by each TRP 105. As an example each DL coverage beam from the respective TRP 105 could cover 30-60 degree sector angle such that gird of coverage beams cover 100-250 m radius circular area. Each coverage beam is identified by a Beam-Id. The coverage beams transmits the Synchronization Signal (SS), the PBCH and the reference signals for beam signal strength measurements. These reference signals are generically referred as the Beam Reference Signal (BRS) and used for Radio Resource Management (RRM) measurements. Coverage beams are used for transmitting DL common channel signaling e.g. RACH response. The coverage beams carry control channel transmissions like enhanced Physical Downlink Control Channel (ePDCCH) and user data Physical Downlink Shared Channel (PDSCH) can also be transmitted on coverage beams when dedicated beams to the UE 102 have been lost. For demodulation purpose when ePDCCH/PDSCH is transmitted on the coverage beam then Demodulation Reference Signal (DMRS) is also transmitted. The dedicated transmissions towards the UE 102 (ePDCCH/PDSCH) may potentially use even more directed and sharp beams (e.g. UE specific pre-coding) on so called "Dedicated Beams". The coverage area of dedicated beams would be much smaller in terms of beam width compared to coverage beams (e.g. ½, ¼ or ⅛th of coverage beam area).

Further, the dedicated beams are managed based on the UE measurement on Channel-State Information-Reference Signal (CSI-RS) and the UE 102 provides the CSI feedback at PHY or MAC layer. This is referred as beam management. To demodulate ePDCCH/PDSCH carried on the dedicated beams, the DMRS is also transmitted on the dedicated beam. Since the UE 102 just see DMRS kind of reference signals coming from the cell 104 of the next generation system the notion of coverage beam and dedicated beam is transparent to the UE 102 for PDSCH reception point of view. However, notion of coverage beam is known to the UE 102 for reception of synchronization signal and BRS measurement. Therefore, when TRPs of 5G eNB 103a detects the UE 102 has lost dedicated beams based on CSI-RS measurement feedback and the UE 102 is scheduled data on coverage beam then UE 102 will not be aware that whether the transmission is coming from the coverage beam. To the UE 102, this looks like any other transmission coming from the dedicated beam. The cell edge bitrates on the coverage beams will be much lower than cell edge bitrates achievable by dedicated beams. The UE transmission in the UL may also be carried on the UL beams. However, the number of UL beams is expected to be less compared to the number of DL beams considering the UE size and number of antenna's at the UE 102.

The 5G cell parameters of the next generation RAT (i.e., system information) which are cell specific comprises of: DL/UL bandwidth, TDD configuration, PRACH configuration, PDSCH configuration, Physical Uplink Control Channel (PUCCH) configuration, PUSCH configuration, Sounding Reference Signal (SRS) configuration, UL power control configuration, (i.e. common radio resource configuration) and MAC configuration, RLC configuration, PDCP configuration (i.e. user plane configuration or dedicated radio resource configuration) etc.

The system information containing the L1/L2 configuration (i.e. both common radio resource configuration and dedicated radio resource configuration) in general is called the radio resource configuration information which needs to be provided to the UE 102 for communication with the 5G eNB 102. In addition the DL beam mobility measurement configuration which includes the CSI-RS configuration including the CSI-RS processes that points to the CSI-RS resource configuration including the Non-Zero Power (NZP), Zero Power (ZP) and Interference Measurement Resource (IMR) resources and the reporting configuration needs to be provided to the UE 102 for beam mobility or beam management purpose.

Based on the CSI-RS configuration, the UE 102 in connected mode should monitor the NZP and IMR resources to perform CSI measurements that include at least Channel Quality Indicator (CQI), Rank Indicator (RI), Precoding Matrix Index (PMI), CSI-RS RSRP measurements on the resources configured for the UE 102. There is also need to provide the UE 102 with intra-frequency configuration, inter-frequency configuration and inter-RAT configuration to support idle mode mobility. The terms PRACH, Physical Downlink Shared Channel (PDSCH), Physical Uplink Control Channel (PUCCH), Physical Uplink Shared Channel (PUSCH), and SRS for the physical channels of next generation RAT or IMT 2020 system are used for simplicity so that someone with ordinary skills of the IMT-Advanced system can correlate with terms used in IMT-Advanced system.

The next generation wireless system needs to provide the UE 102 with the cell specific parameters for access the cell, the (L1/L2) configuration i.e., radio resource configuration (i.e. both common and dedicated) and other configurations for idle mode mobility. Traditionally in legacy wireless system such parameters are periodically broadcasted in the cell coverage area in the form of one or more System Information Blocks (SIBs) in addition to the Master Information Block (MIB). On acquiring the MIB and SIBs related to cell access and idle mode mobility the UE can camp on a cell and then start initial access on the camped cell. Table 1 shows the MIB/SIB broadcasted in LTE and the purpose each SIB serve.

TABLE 1

| MIB/SIB | Main purpose |
| --- | --- |
| MIB | Cell access |
| SIB 1 | Cell access |
| SIB 2 | Radio Resource Configuration |
| SIB 3 | Cell reselection |
| SIB 4 | Cell reselection intra-frequency |
| SIB 5 | Cell reselection inter-frequency |
| SIB 6 | Inter-RAT reselection UMTS |
| SIB 7 | Inter-RAT reselection GERAN |
| SIB 8 | Inter-RAT reselection CMDA2000 |
| SIB 9 | Home eNB name |
| SIB 10 | ETWS |
| SIB 11 | ETWS |
| SIB 12 | CMAS |
| SIB 13 | MBSFN |
| SIB 14 | EAB |
| SIB 15 | MBMS SAI list |
| SIB 16 | GPS/UTC time |
| SIB 17 | WLAN |
| SIB 18 | D2D Communication |
| SIB 19 | D2D discovery |

Figure 2A:
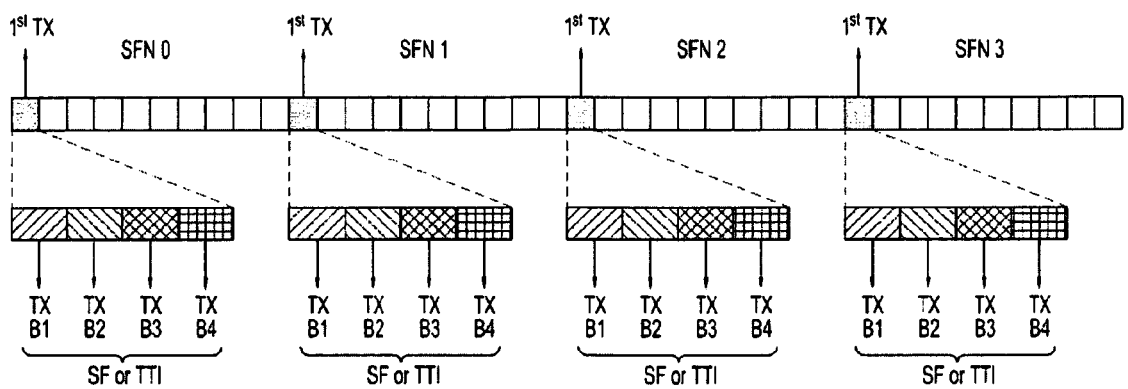
FIG. 2a is a schematic illustration of MIB transmission with same periodicity as in a LTE (i.e. 40 ms) and repetition of every radio frame using 4 DL coverage beams, according to prior art.
Figure 2B:
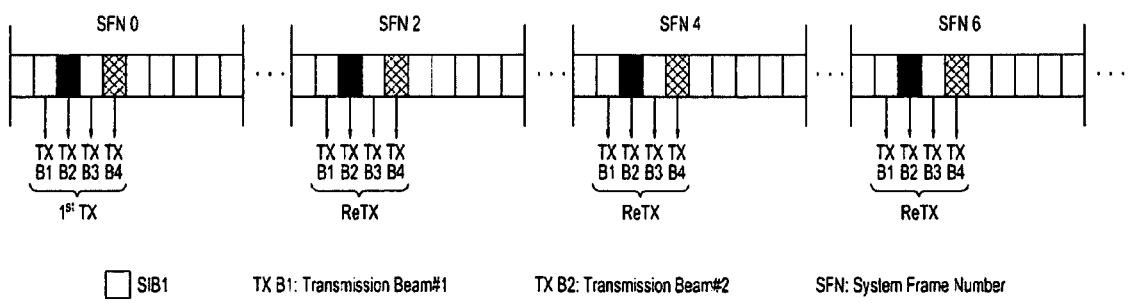
FIG. 2b is a schematic illustration of a SIB 1 transmission with same periodicity as in LTE (i.e. 80 ms) and repetition in an alternate radio frame using 4 DL coverage beams, according to prior art.

Consider for example that there are 4 DL coverage beams. MIB transmission with same periodicity as in LTE (i.e. 40 ms) and repetition every radio frame using 4 DL coverage beams is shown in FIG. 2*a*. In a subframe MIB is transmitted using distinct DL coverage beam in distinct set of OFDM symbols. SIB 1 transmission with same periodicity as in LTE (i.e. 80 ms) and repetition in alternate radio frame using 4 DL coverage beams is shown in FIG. 2*b*. In each radio frame for SIB 1 transmission, PDCCH indicating PDSCH resources for SIB1 and PDSCH carrying SIB1 is transmitted multiple times using distinct DL coverage beams in distinct subframes.

In an embodiment, the mmWave/cmWave band is considered common scenario for deployment of next generation RAT and hence the procedures are described taking the radio characteristics in those bands. However, in practical deployments, it is possible to apply the air-interface of next generation wireless cellular system even below 6 GHz or 10 GHz band, therefore the applicability of the next generation RAT and the procedure disclosed in the present disclosure should not be considered strictly limited to mmWave/cmWave bands. Since the radio characteristics is different for frequencies in the mmWave/cmWave bands compared to frequencies in sub 6 GHz bands, it is also expected next generation wireless cellular system would have native support for beamforming techniques for both broadcast and unicast transmissions towards UE 102 to overcome short propagation distances of radio signals at mmWave/cmWave frequencies.

FIG. 2*a* is a schematic illustration of MIB transmission with same periodicity as in a LTE (i.e. 40 ms) and repetition every radio frame using 4 DL coverage beams. FIG. 2*b* is a schematic illustration of a SIB 1 transmission with same periodicity as in LTE (i.e. 80 ms) and repetition in alternate radio frame using 4 DL coverage beams.

The FIG. 2*a* and FIG. 2*b* depict that the overhead (time/frequency resources) of transmission of just MIB and SIB1 using beam forming is P times more than transmission of MIB/SIB1 without beam forming. 'P' which is the number of DL transmission beams. The transmission resources, remaining after resources consumed by system information (i.e., MIB/SIB1), may be only used for the data scheduling for the user of the UE 102 in the direction of the DL transmission beam. Therefore, if more time/frequency resources are consumed by the system information due to the beam sweeping then, the user data scheduling becomes restrictive and inflexible. In case of the SIB1 message, the PDCCH overhead also increases by P times as the PDCCH is also transmitted using the beamforming. The resource constraint and the signaling overhead problem is also applicable for other SI messages. For the SI messages, the SI window size also increases by P times leading to increase the UE 102 wakeup time.

In the system 100, where there is no beamforming (typically at low frequencies), the other issue is energy efficiency. According to release 13 specification, 19 SIBs are supported. Only few SIBs are needed for the basic LTE operation and other SIBs are for specific feature (e.g. Interworking with WLAN, D2D, MBMS, etc.) or specific RATs (GERAN, UTRA, CDMA2000). These SIBs are periodically broadcasted and unnecessary in following scenarios: i) If all the UEs 102*a*-102*c* in the cell 104*a* have already read the required system information and no new UE is entering the cell 104*a* at periodicity at which system information is transmitted then periodic broadcast of system information in that cell 104*a* is unnecessary and leads to wastage of resources and energy consumption; ii) if there is no UE in the cell 104*a* interested in the specific service, then periodic broadcast of the service specific system information in that cell 104*a* is unnecessary and leads to wastage of resources and energy consumption. For example, if there is no UE in the cell 104a interested in the D2D service, then the cell 104a broadcasting SIB 18/SIB 19 is unnecessary.

One of the requirements for the next generation RAT is energy efficiency; so the design of the system information provisioning needs to address the energy efficiency requirement to minimize always ON periodic broadcast. Another aspect related to broadcasting of the system information is high signaling overhead in the context of the next generation RAT operation in the higher frequency bands (above 10 GHz) where the DL beam sweeping operation is inevitable to reach the coverage area of the cell 104. Broadcasting all the SIBs on the coverage beams which are subject to the DL beam sweeping may lead to excessive signaling overhead and resource restriction. Therefore another design criterion for the system information provisioning needs to address the signaling overhead aspect. There can be several mechanisms to reduce the system overhead. For example, in order to reduce system overhead, essential system information such as SFN, system BW, cell access parameters etc. can be broadcasted periodically on the PBCH whereas the other system information (OSI) can be either dedicatedly signaled or can be broadcasted based on the request from the UE 102.

Figure 3:
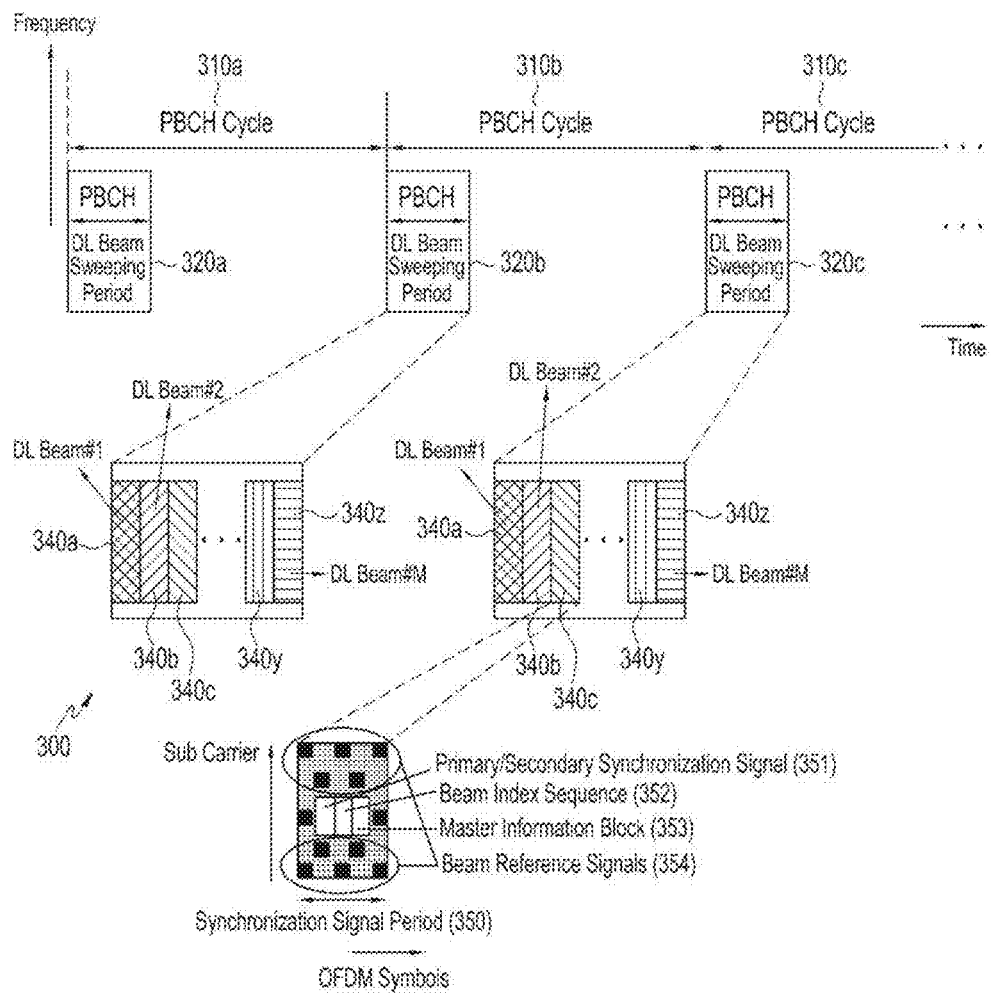
FIG. 3 is an example scenario in which a Primary Broadcast Channel (PBCH) is broadcasted from a cell of next generation wireless system, according to an embodiment as disclosed herein.

FIG. 3 is an example scenario 300 in which Primary Broadcast Channel (PBCH) is broadcasted from the cell 104 of the next generation wireless system 100, according to an embodiment as disclosed herein.

For a standalone mode of operation, a default PBCH cycle which is frequency agnostic can be specified in the 3GPP specifications. As an example the default PBCH cycle (310a, 310b, 310c so on and so forth) can be specified as 20 or 40 ms. The PBCH transmission is subject to the DL beam sweeping over the plurality of DL coverage beams in order to reach UEs 102a-102c in entire cell coverage area. The PBCH carries the physical Synchronization Signal (SS) i.e. primary and secondary SS, the Master Information Block (MIB) and Beam reference signals (BRS) distributed in the frequency domain. The PBCH is blindly detected by the UE 102 during each synchronization signal period (350). The DL beam sweeping period (320a, 320b, 320c so on and so forth) i.e. one burst comprising the PBCH aligns with the start of the radio frame of the cell 104 since the PBCH period includes the physical synchronization signals. During the DL beam sweeping period (320a, 320b, 320c, etc.), i.e. during the burst the plurality of DL coverage beams (340a, 340b, 340c . . . 340y, 340z) comprising the block containing PSS/SSS, MIB and BRS are transmitted consecutively in time in different directions to provide coverage to the UEs 102a-10c in the area covered by sweeping the beams. The PBCH is transmitted during the synchronization signal period (350) which may or may not cover all the OFDM symbols within the Transmission Time Interval (TTI) of the next generation RAT depending on the exact physical layer design.

The synchronization signal period (350) i.e. the block includes the plurality of OFDM symbols of the next generation RAT and cover the minimum bandwidth consisting of plurality of subcarriers of the next generation RAT required for the transmission of at least the synchronization signal (351), beam index sequence (352), Master Information Block (MIB) (353) and beam reference signals (BRS) (354). The synchronization signal (351) includes at least the primary synchronization signal (i.e., PSS), the secondary synchronization signal (i.e., SSS) and the beam index sequence (352). The block i.e. PSS/SSS (351), the beam index sequence (352) and the MIB (353) are transmitted on the plurality of OFDM symbols and the plurality of subcarriers during the PBCH period or the synchronization signal period (350) i.e. burst subject to the beam forming logic associated with the DL beam index #1 (340a). The block containing the PSS/SSS (351), MIB (353), beam index sequence (352) and BRS (354) can be transmitted as a single burst (320a) or set of bursts (320aa, 320aaa so on and so forth). Therefore the PBCH cycle (310a, 310b, 310c so on and so forth) represent the periodicity of the PBCH or the periodicity of SS burst set. Within the PBCH cycle (310a) the MIB (353) transmission can be repeated several times. Apart from the default PBCH cycle the NW can also provide configurable PBCH cycle, however all cells on the same frequency have the same PBCH cycle. The beam index sequence (352) indicates the DL beam index #1. In the next synchronization period (350), the PSS/SSS (351), the beam index sequence (352) indicating the DL beam index #2, and the MIB (353) are transmitted on the plurality of OFDM symbols and the plurality of subcarriers subject to the beam forming logic associated with DL beam index #2 (340b). This is referred as DL beam sweeping on the PBCH, where the PSS/SSS (351), the beam index sequence (352) indicating the DL beam index #M and the MIB (353) are transmitted on the plurality of OFDM symbols and the plurality of subcarriers in the mth PBCH period or the synchronization period (350) subject to the beam forming logic associated with DL beam index #M (340z). Based on blindly decoding the PSS/SSS (351) and the beam index sequence (352), the UE 102 determines the Physical Cell Identity (PCI) or Cell-Id and the timing compensation to be applied to determine the radio frame boundary of the cell 104 transmitting the synchronization signal. The beam reference signals i.e., BRS (354) are reference signals transmitted on the plurality of OFDM symbols and the plurality of subcarriers excluding the resources occupied by the PSS/SSS (351) and the beam index sequence (352).

Further, the resources used for transmitting the BRS (354) on the DL beam index #m depends on the PCI of the cell 104 and the DL beam index. The BRS (354) is transmitted during the synchronization period (350) subject to the corresponding beam forming logic associated with the DL beam index #m. In the FIG.3, the first beam during the DL beam sweeping period is depicted the DL beam index #1 and subsequent beams in time as DL beam index #2 so on and so forth. Such a depiction should not be considered as a limiting scenario because the starting beam can be any beam uniquely identified by the beam index sequence subject to maintaining the beam sequence and the number of beams same during the DL beam sweeping period. In an example, the starting beam can be DL beam index #11 followed by DL beam index #12 while keeping the number of beams during the DL beam sweeping period equal to M.

After decoding the PSS/SSS (351) and beam index sequence (352), the UE 203 come to know the PCI and the DL beam index; hence the resources where it can perform measurements at the physical layer on the BRS. These measurements indicate the estimate of signal strength of beam index #m and reported to the higher layer for the cell mobility evaluations. Generically these measurements are termed as BRS Reference Signal Received Power (BRS_RSRP) and BRS Reference Signal Received Quality (BRS_RSRQ) providing an estimate of signal strength on the received beam from the cell 104 detected by the UE 102. For standalone mode of operation where the UE 102 needs to camp on the cell 104 of next generation RAT, the measurements on the BRS i.e., BRS_RSRP/BRS_RSRQ are used for an idle mode mobility during the cell selection and/or the cell re-selection.

Before camping on the cell 104 of next generation RAT, the UE 102 blindly decodes the MIB (353) which contains at least the most essential or most important parameters i.e. minimum system information (MSI): the DL system bandwidth, System Frame Number (SFN), list of PLMN-ID, Tracking Area Code (TAC), Global Cell-ID, TRP-ID, TRP-Group ID, Area-Id/SAID, Cell Barred Status (i.e. parameters for Access Control Barring (ACB)), a configuration comprising resource for requesting one or more SI blocks of OSI for on-demand basis, scheduling information related to SI windows for reception of one or more SI blocks of OSI, ePDCCH configuration, parameters for camping (i.e. cell selection/cell re-selection), random access parameters, the plurality of indicators and the plurality of system configuration indices or identifiers (SCI). The MSI can be transmitted in at least one block i.e. MIB (353) or if the MIB size is constrained by physical layer design then the MSI is distributed in a first MIB (353) and a second MIB i.e. MIB #2 also referred as SIB 1. The plurality of indicators may include broadcast indicator/FLAG, a common value tag i.e., counter associated with version of system information or individual value tag. i.e., counter associated with version of each system information block and SIT invalidity FLAG which indicates whether the stored SIT is valid or not. There can also be a timer or a counter (specified in terms of seconds or radio frame) associated with the broadcast indicator/FLAG when the FLAG is set to TRUE to indicate how long the network will broadcast the other system information with reference to the beginning of system modification interval.

On blindly decoding the PBCH, the UE 102 determines the radio frame boundary, the PCI, the SFN, the DL system bandwidth, the best DL beam index, the BRS resources for measurements, and the configuration for requesting and reception of other system information. The other system information is provided by the 5G eNB 103 upon the UE 102 request if the Other SI broadcast indication/FLAG transmitted in the minimum system information (MSI) is not enabled i.e. set to FLASE. It may not be possible to accommodate all the most essential or most important parameters i.e. the MSI in the MIB (353). This depends on the coverage requirement and physical layer design of the MIB (353). If it is not possible to accommodate all the most essential or most important parameters i.e. the MSI in one MIB then the parameters are distributed in two blocks i.e. MIB #1 and MIB #2. In such scenario MIB #1 (353) is transmitted on the PBCH while MIB #2 is transmitted on the Secondary Broadcast Channel (SBCH). The SBCH can be Physical Downlink Shared Channel (PDSCH). The MIB #2 is also referred as a System Information Block Type1 (SIB1). In such scenario the MSI comprises the first Master Information Block (MIB #1) and the second Master Information Block (MIB #2) also referred as SIB1. The MIB #1 transmitted on the PBCH is of fixed size while the MIB #2 i.e., SIB1 transmitted on the SBCH/PDSCH is of variable size.

Similar to the default PBCH cycle, the default SBCH cycle which is frequency agnostic can be specified in the 3GPP specifications. Since the PBCH cycle (310*a*) is configurable per frequency the SBCH cycle can also be configured per frequency. For example if the PBCH cycle (310*a*, 310*b*, 310*c* so on and so forth) is 20 ms then the SBCH cycle can be specified/configured as 40 or 80 ms or some other value. The SBCH cycle can also be indicated in the PBCH (i.e. the scheduling information of MIB #2 (SIB1) is included in the first MIB (MIB #1). The scheduling information included in the first MIB (MIB #1) indicates at least one of periodicity of the second MIB, namely, MIB #2/SIB1 transmitted on the SBCH and an absence of the second MIB (MIB #2/SIB1) when the second MIB (MIB #2/SIB1) is not transmitted on the SBCH. The scheduling information included in the first MIB also refers to the resource information to receive the PDCCH for the PDSCH on which the second MIB is scheduled. In an example, assume the scheduling information related to MIB #2/SIB1 indicated in MIB #1 as two bits which would be represented with code-points 00, 01, 10 and 11. In an example, the code-points 01, 10 and 11 indicate the SBCH cycle or MIB #2/SIB1 periodicity as 80 ms, 160 ms and 320 ms respectively. The code-point 00 indicates the absence of MIB #2/SIB1 i.e. the cell does not broadcast the MIB #2/SIB1 on the SBCH. When the scheduling information included in the first MIB (MIB #1) indicates the absence of the second MIB (MIB #2/SIB1) then the Cell 104 is considered as barred by the UE 102 because the UE 102 cannot obtain the full contents of the MSI. Apart from the scheduling information the first MIB includes a cell barred indicator, wherein if the cell barred indicator is set TRUE, then the cell 104 is considered as barred by the UE 102 regardless of the scheduling information indicating the presence of the second MIB. In case of beamforming, the PBCH and the SBCH transmissions are subject to the DL beam sweeping over the plurality of DL coverage beams in order to reach the UEs 102*a*-102*c* and 102*x*-102*z* in entire cell coverage area. A time offset between the PBCH and the SBCH can either be specified as default offset or can be indicated in the MIB #1 transmitted on the PBCH when the MIB and SIB1 periodicity is same.

After determining the SFN, the best DL beam index, the SBCH cycle and the SBCH Offset, the UE 102 can decode the SBCH on the determined best DL beam index to acquire the MIB #2. The MIB #2 includes further parameters concerning camping and cell access. The SBCH is decoded by the UE 102 during the SBCH period similar to the PBCH period. The DL beam sweeping period during which the SBCH is transmitted contains the parameters for the cell camping and cell access and optionally BRS. During the DL beam sweeping period of the SBCH, the plurality of DL coverage beams are transmitted consecutively in time in different directions to provide coverage to the UEs 102*a*-102*c* and 102*x*-102*z* in the area covered by sweeping the beams. The number of beams used for the PBCH and SBCH transmission is same. The MIB #2 transmitted during the SBCH period may or may not cover all the OFDM symbols within the TTI of next generation RAT. The SBCH may be addressed on the ePDCCH by the SI-RNTI. The SBCH period consist of the plurality of OFDM symbols and the plurality of subcarriers of next generation such that the MIB #2 may occur in the minimum bandwidth or some other frequency resources of the entire DL system bandwidth. The MIB #2 may contain at least: the Tracking Area Code (TAC), the list of Public Land Mobile Network Identifiers (list of PLMN-ID), Global Cell Identifier, Transmission Reception Point Identifier (TRP-ID), TRP-Group ID, System Information Area Identifier (SAID), a cell barred status, a configuration comprising resource for requesting one or more SI blocks of OSI delivered through the on-demand basis, scheduling information related to SI windows for reception of one or more SI blocks of OSI, the ePDCCH configuration, the parameters for camping (i.e. cell selection/cell re-selection), the random access parameters and the plurality of SCI etc.

In an embodiment, the minimum system information (MSI) is broadcasted on at least one of the PBCH and the SBCH, wherein the MSI comprises at least one of a first Master Information Block (MIB #1) and a second MIB (MIB #2) referred as System Information Block Type1 (SIB1).

In an embodiment, the first MIB (MIB #1) is broadcasted on the PBCH and the second MIB (MIB #2), namely, SIB1 is broadcasted on the SBCH, wherein scheduling information of the SBCH i.e. MIB #2/SIB1 is indicated in the first MIB (MIB #1).

In an embodiment, the scheduling information included in the first MIB (MIB #1) indicates at least one of periodicity of the second MIB (MIB #2), namely, SIB1 transmitted on the SBCH and an absence of the second MIB (MIB #2/SIB1) when the second MIB (MIB #2/SIB1) is not transmitted on the SBCH.

In an embodiment, if the scheduling information included in the first MIB (MIB #1) indicates the absence of the second MIB (MIB #2/SIB1) then, the cell is considered as barred by the UE because the UE cannot obtain the full contents of the minimum system information (MSI).

The requirement to limit broadcast information size in the next generation wireless system employing beamforming can be made possible if a large majority of parameters is not directly visible on the periodic broadcast but only provided on the UE 102 request. These include the L1/L2 configuration, mobility measurement and reporting configuration and specific service configuration like D2D service, MBMS service etc. In an embodiment, the System Configuration Index or System Configuration Identifier (SCI) is an index/identifier which is associated with SI block comprising the set of system information parameters and corresponding parameter values which are provided by the network on the UE request.

In an embodiment, the System Configuration Index or System Configuration Identifier (SCI) is an index/identifier associated with the configuration of a SI block, wherein the configuration comprises a set of system information parameters and corresponding parameter values.

In standalone mode of operation of the next generation wireless system, the MIB #2 is required to provide the at least system information to enable the UE 102 to perform the initial random access and send the request and receive the response to receive the requested system information parameters.

In the present disclosure, the system information provisioned by the on-demand basis or based on the UE SI request procedure is referred as "Other system information" (OSI). The eNB 103 network may provide the other system information (OSI) to the UE 102 either through the broadcast or via the dedicated signaling. When the eNB 103 receives the SI request from the UE 102 for the delivery of the OSI through on-demand basis, if the broadcast option is chosen by the network then the requested OSI is transmitted in the SI windows according to the scheduling information for the OSI indicated in the MSI. Certain system information included in the other system information it might be more efficient to provide the information by broadcast (e.g. ETWS, CMAS) since many UEs have to obtain the information. However certain configurations like the measurement configuration and reporting configuration is UE-specific may be provided in dedicated manner.

In an embodiment, the UE monitors respective SI windows for the OSI indicated by the scheduling information included in the MSI to obtain one or more SI blocks of the OSI available in the camped cell after triggering the SI request for on-demand delivery.

Based on these assumptions, referring to the LTE MIB/SIBs listed in Table 1 it can be determined which information is relevant to be periodically broadcasted in the MIB #1 and the MIB #2 on the PBCH and the SBCH respectively and which information can be provided upon the UE 102 request as Other System Information.

On analysis of Table 1, it seems good to exclude SIBs 9, 10, 11, 12 to be covered by the MIB #1 and the MIB #2 since this information can be provided to the UE 102 with dedicated signaling after initial random access in next generation RAT. It may also seem reasonable to exclude SIBs 13, 15, 18 and 19 since MBMS and D2D are services which are applicable to few UEs 102 which are interested in the service. So, SIBs 13, 15, 18 and 19 can be provided to the UE 102 with dedicated signaling if MBMS and D2D are intended to be provided by next generation RAT. Therefore, it seems reasonable to focus the analysis on essential SIBs: i.e., access related MIB/SIBs (MIB, SIBs1, 2, 14 and mobility related SIBs 3, 4, 5, 6, 7, 8 to determine which parameter is relevant for next generation RAT and then determine whether it can be broadcasted separately in MIB #1 and MIB #2 because the parameter changes dynamically or it can be provisioned as part of Other system information on UE request.

A number of broadcast parameters seem not so suitable to be covered by Other System information. This is especially true for the parameters where the values of these parameters will potentially change dynamically. This concerns e.g. SFN, TAC, Cell identifier, TRP-Id, TRP-Group ID, Area-Id, access control parameters, SCI etc. These parameters are therefore broadcasted periodically in the MIB #1 or the MIB #2 on the PBCH or the SBCH. Further, the PLMN identity and the parameters for camping would be needed by the UE 102 to decide whether to camp on the cell 104 if the UE 102 meets the cell selection criterion and then start the procedure for requesting Other System information on the camped cell 104. However, if the PLMN identity is covered by other system information then the UE 102 knows whether the cell 104 meeting the cell selection criterion belongs to the UE's 104 primary PLMN only after requesting the other system information. Therefore the primary PLMN should be broadcasted periodically on the PBCH/SBCH.

Further referring to Table 1, apart from the white list and blacklist that exist in SIB3, SIB4 and SIB5 none of the parameters therein seem location specific, so can be covered as part of other system information. In SIB6 and SIB7 there is no whitelist signaled so as a result none of the information in SIB6 seems location specific, so that this information can be covered as part of other system information. In SIB8 the neighbor cell lists may have same problem as whitelist in SIB4 and the barring parameters in SIB8 might require special handling due to frequent update and hence can be covered by MIB #1 or MIB #2. Table 2 is high level summary of which system information parameters can be covered by MIB #1/MIB #2 and which parameters can be covered by Other System Information. The system information covered by MIB #1/MIB #2 is referred as "Minimum System Information".

TABLE 2

| MIB/SIB | Main purpose | Covered by MIB#1/MIB#2 | Covered by Other System Information |
|---|---|---|---|
| MIB | Cell access | Yes | No |
| SIB 1 | Cell access allowed | Yes (at least partly) | Yes (at least partly) |
| SIB 2 | Radio Resource Config | Partly Yes (configuration related | Most L1/L2 configuration |

TABLE 2-continued

| MIB/SIB | Main purpose | Covered by MIB#1/MIB#2 | Covered by Other System Information |
|---|---|---|---|
| | | to sending request and receiving response) | |
| SIB 3 | Cell reselection | No | Required by IDLE mode UE for mobility purpose |
| SIB 4 | Cell reselection intra-freq | No | Depending on support e.g. cell/TRP specific offsets in 5G. Cell specific offsets (or TRP) would concern very localized information |
| SIB 5 | Cell reselection inter-freq | No | IDLE mode UE needs to know whether in the 5G area it is, any stored inter-freq reselection information is still valid. |
| SIB 6 | Inter-RAT reselection UMTS | No | IDLE mode UE needs to know whether in the 5G area it is, any stored inter-RAT reselection information is still valid. Depends on 5G ⇔ 3G mobility need to be supported |
| SIB 7 | Inter-RAT reselection GERAN | No | IDLE mode UE needs to know whether in the 5G area it is, any stored GERAN reselection information is still valid. Depends on 5G ⇔ 2G mobility need to be supported |
| SIB 8 | Inter-RAT reselection CMDA2000 | No | IDLE mode UE needs to know whether in the 5G area it is, any stored CDMA2000 reselection information is still valid. Depends on 5G ⇔ CDMA mobility need to be supported |
| SIB 9 | Home eNB name | No | Can be provided with dedicated signaling as other system info. |
| SIB10/ SIB11/ SIB12 | ETWS/CMAS | No | Can be provided with broadcast signaling in stand-alone system as other system info |
| SIB13/ SIB15 | MBSFN/MBMS SAI list | No | Service specific information can be provided with dedicated signaling |
| SIB 14 | EAB | Yes | Relevant to know whether RACH is allowed |
| SIB 16 | GPS/UTC time | No | Information required for positioning can be provided as other system information |
| SIB 17 | WLAN | No | Service specific information can be provided with dedicated signaling |
| SIB 18 | D2D Communication | No | Service specific information can be provided with dedicated signaling |
| SIB 19 | D2D discovery | No | |

Figure 4A:
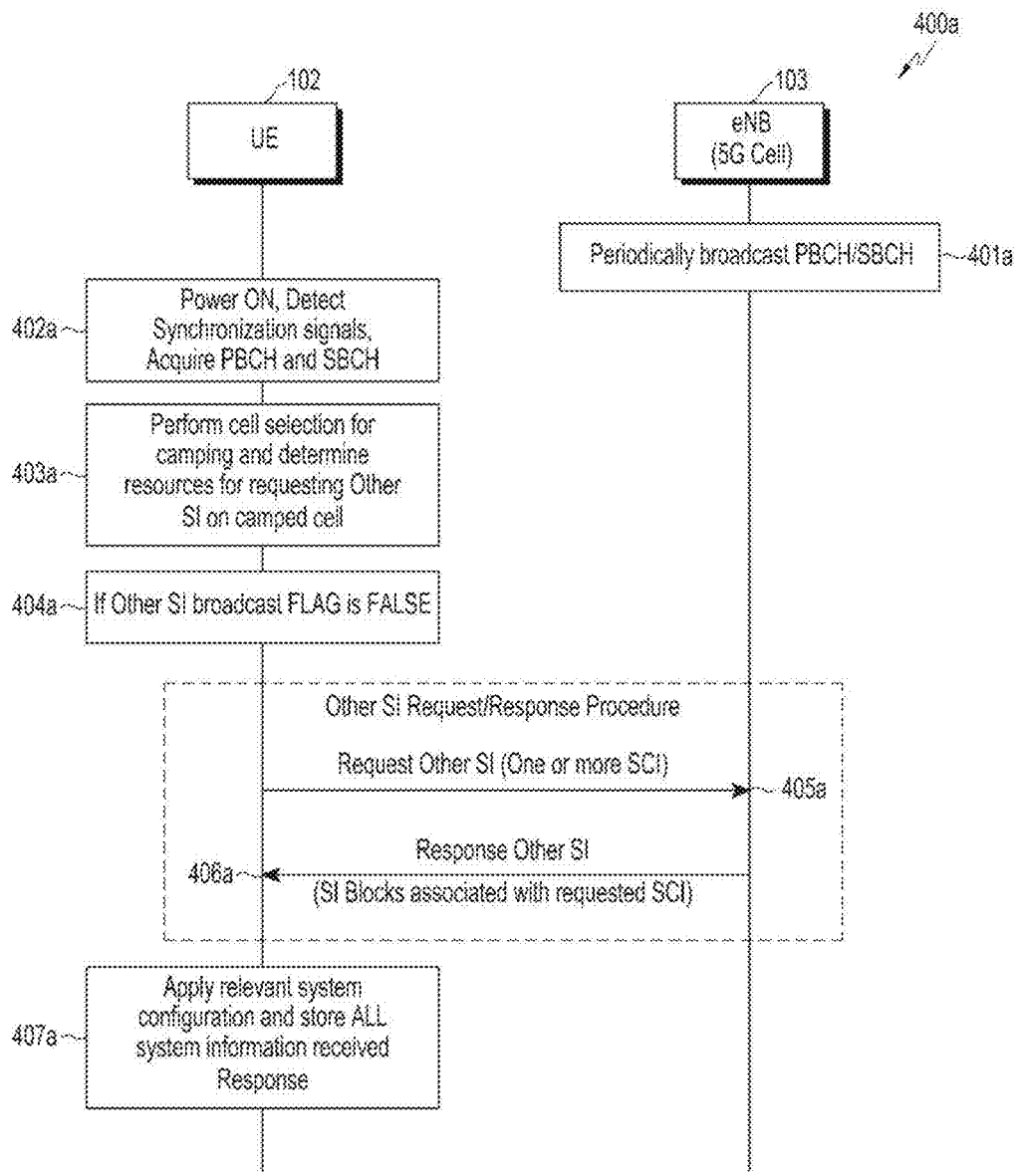
FIG. 4a is a sequential flow diagram illustrating step by step procedure for acquiring the SI by a UE in the next generation wireless system based on an on-demand basis, according to an embodiment as disclosed herein.

FIG. 4a is a sequential flow diagram 400a illustrating step by step procedure for provisioning the SI to the UE 102 in the next generation wireless system based on the on-demand basis, according to an embodiment as disclosed herein.

At step 401a of the FIG. 4a, the 5G eNB 103 periodically broadcast the minimum system information (i.e. MIB #1/MIB #2) on the PBCH/SBCH.

In an embodiment, the minimum system information broadcasted periodically includes at least one of the DL system bandwidth, System Frame Number (SFN), the list of PLMN-ID, the Tracking Area Code (TAC), the Global Cell-ID, the TRP-ID, the Cell Barred Status (i.e. parameters for Access Control Barring (ACB)), the configuration comprising the resource for requesting one or more SI blocks of OSI delivered through on-demand basis, the scheduling information related to the SI windows for reception of one or more SI blocks of OSI, the ePDCCH configuration, parameters for camping (i.e. cell selection/cell re-selection), the random access parameters, the plurality of indicators and the plurality of SCI.

In an embodiment, the minimum system information is transmitted in at least one system information block called the master information block (MIB).

In an embodiment, the minimum system information (MSI) is broadcasted on the at least one of the PBCH and the SBCH, wherein the MSI comprises at least one of the MIB #1 and the MIB #2 (i.e., SIB1).

In an embodiment, the System Configuration Index or System Configuration Identifier (SCI) is an index/identifier which is associated with SI block comprising a set of system information parameters and corresponding parameter values which are provided by the network on the UE request.

In an embodiment, the System Configuration Index or System Configuration Identifier (SCI) is an index/identifier associated with the configuration of the SI block, where the configuration comprises the set of system information parameters and corresponding parameter values.

The plurality of indicators broadcasted on the PBCH includes at least: an Other SI broadcast indication/FLAG indicating whether the cell is broadcasting other system information or providing the OSI using the on-demand basis, multiple SCI associated with SI blocks provided in other system information, System Information area identifier (i.e., Area-Id/SAID) which points to the linking of Area-Id and SCI provided in other system information, the common value tag i.e., the counter indicating at least one system information block provided in other SI has changed or updated or modified and one or more individual value tags i.e., counter associated with change or update or modify of corresponding SI block provided in other SI and the validity flag indicating whether the already acquired and stored system information is still valid. Details about the plurality of indicators mentioned above are provided in the present disclosure after describing the FIGS. 4a and 4b.

At step 402a, after the UE 102 powers ON, the radio circuitry starts scanning the radio frequency to detect synchronization signals transmitted every PBCH cycle. In deployments where the radio frequency belongs to mmWave/cmWave bands the PBCH is subjected to beamforming techniques including the beam sweeping operation. After detecting the synchronization signals and the beam index sequence, the UE 102 blindly decodes the PBCH on which minimum system information is broadcasted.

At step 403a, the UE 102 camps on the cell 104 based on at least the cell access parameters, the cell selection and the PLMN selection parameters and the cell barring parameters included in the minimum system information. The minimum system information is either included in one Master information block (MIB) or distributed over two blocks i.e. MIB #1 and MIB #2/SIB1.

If distributed over the MIB #1 and the MIB #2/SIB1 then the MIB #1 is broadcasted on the PBCH and the MIB #2/SIB1 is broadcasted on the SBCH. The SBCH cycle can also be indicated in PBCH i.e., the scheduling information of the MIB #2 (i.e., SIB1) is included in the first MIB (MIB #1). The scheduling information included in the first MIB (MIB #1) indicates at least one of periodicity of the second MIB, namely, MIB #2/SIB1 transmitted on the SBCH and an absence of the second MIB (MIB3 #2/SIB1) when the second MIB (MIB3 #2/SIB1) is not transmitted on the SBCH. The UE stores the MSI acquired from MIB #1 and MIB #2.

Further, at step 403a, the UE 102 determines the resources to access the camped cell 104 based on the configuration parameters for sending SI request acquired from the minimum system information transmitted by the camped cell 104. The configuration parameter for sending the SI request comprises a RACH preamble or resource. The configuration parameter for sending the SI request can also be indicated by the random access parameters included in MSI. In the minimum SI, the eNB 103 also broadcasts one or more SCI. Each SCI is associated to the configuration corresponding to the SI block i.e. the set of system information parameters and corresponding parameter values applicable for that SI block provided as the Other SI.

Since the UE 102 has powered ON in step 402a, the UE 102 does not have any stored system information so UE 102 does not know the meaning of the one or more SCIs acquired from the MSI. Before initiating the SI request for acquiring the system information parameters associated with the one or more SCI values acquired from the MSI, the UE 102 checks the status of Other SI broadcast indicator/FLAG acquired from the minimum system information at step 404a. The broadcast indicator can be for each system information block or for the set of system information blocks. A bit map can be used to indicate broadcast indicator wherein each bit in the bitmap is a broadcast indicator for the particular system information block or the set of system information blocks. The broadcast indicator can be the common indicator for all the system information blocks.

Figure 4B:
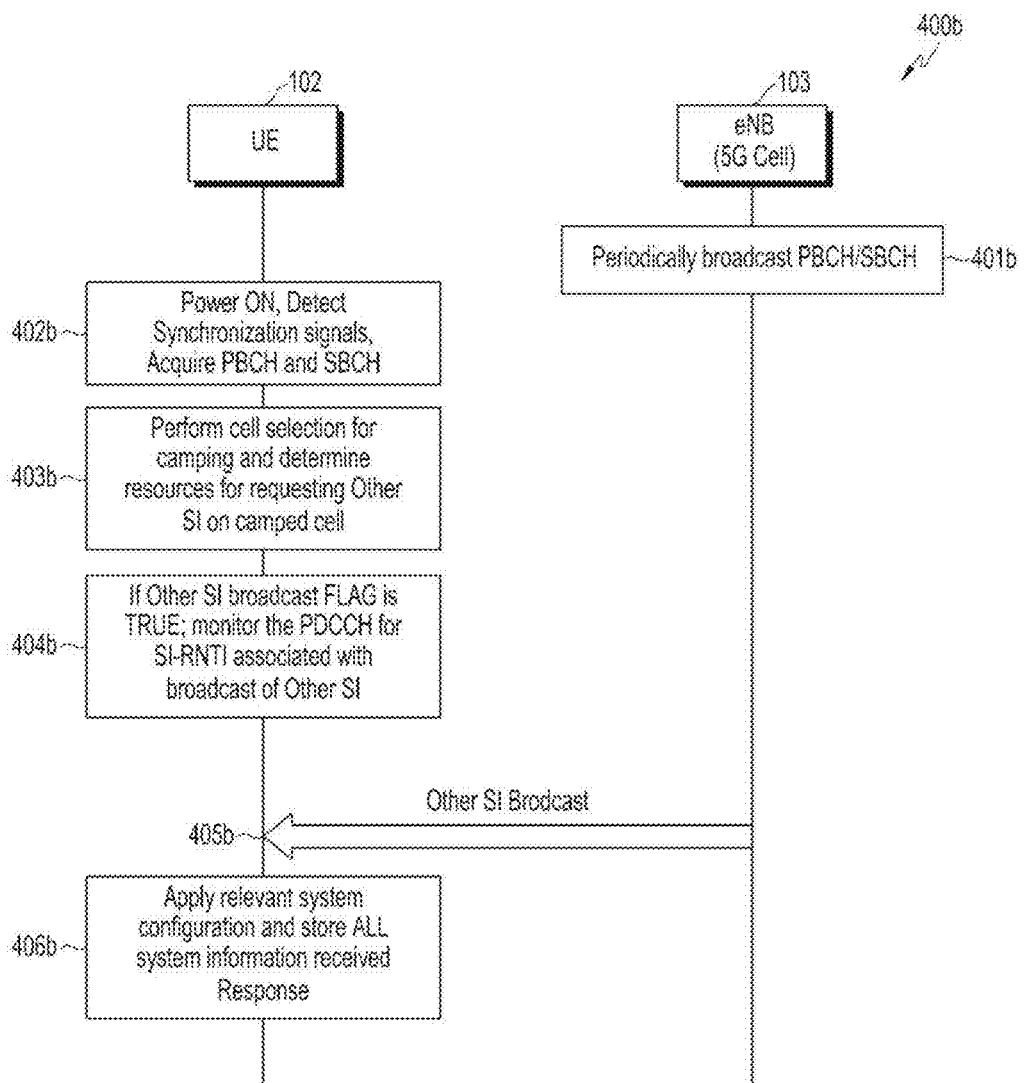
FIG. 4b is a sequential flow diagram illustrating step by step procedure for acquiring the SI by the UE which is periodically broadcasted from the cell in the next generation wireless system, according to an embodiment as disclosed herein.

For example, if the FLAG is set to FALSE meaning that the network is not broadcasting the Other SI (or the system information block or set of system information blocks is delivered through on-demand basis) then the UE 102 is required to initiate the procedure to request Other SI. The indicator/FLAG can be termed as Other SI broadcast indicator or On-demand SI indicator. If the indicator is termed as Other SI broadcast indicator/FLAG then setting the FLAG as FALSE indicates Other SI blocks are transmitted on the UE request. Alternately, if the indicator is termed as On-demand SI indicator/FLAG then setting the FLAG as TRUE indicates Other SI blocks are transmitted on the UE request. The procedures or steps in the FIG. 4a and the FIG. 4b are explained and embodiments formulated considering the term as Other SI broadcast indicator/FLAG and should not be considered as the limiting case to realize the on-demand Other SI delivery concept.

At step 405a, based on the configuration parameters and the resources configured for cell access, the UE 102 sends the SI request for Other SI i.e. one or more SI blocks. The request-response procedure as shown in the FIG. 4a may be a 2-step procedure or may involve more than two steps (e.g., 4-steps). In the simplest form the request would be in the form transmitting a preamble on the PRACH resource or some form of physical layer signal. The configuration parameter in the MSI for sending SI request comprises the RACH preamble or the PRACH resource or some form of well-defined physical layer signal. The eNB 103 either detects the transmitted preamble or performs energy detection to identify the UE 102 has sent the request for the Other SI. If the request-response is 2-step procedure then at step 406a the eNB 103 provides the other system information to the UE 102 else if the procedure involves more than 2-steps then eNB 103 provides the uplink grant to the UE 102. The eNB 103 either broadcasts the requested other system information temporarily or provides the UE 102 other system information in a unicast manner (i.e. dedicated UE-specific signaling manner). When the network receives the request from the UE 102 for the on-demand basis of the delivery of OSI, if the broadcast option is chosen by the network then the requested OSI is transmitted in the system information (SI) windows according to the scheduling information for the OSI indicated in the MSI. After sending the SI request, the network may respond back with acknowledgement for the receipt of the SI request. Upon receiving the acknowledgement, the UE 102 monitors respective SI windows for the OSI indicated by the scheduling information included in the MSI to obtain one or more SI blocks of the OSI available in the camped cell 104. If the acknowledgement is not received then the UE 102 may re-transmit the SI request.

At step 407a, after acquiring the other system information, the UE 102 applies the relevant configuration parameters according to one or more SCI acquired from the MSI. If the Other system information comprises the set of system information parameters and corresponding parameter values associated with the SCI other than the SCI broadcasted by the camped cell then the UE 102 stores the configuration parameters as the configuration list associated with the corresponding SCI.

Further at step 407a, the UE stores the one or more SI blocks of the OSI available in the camped cell acquired by the UE by triggering the request procedure; wherein the stored SI blocks of the OSI are associated with at least a System Information Area Identifier (SAID) and System Information Configuration Index (SCI).

FIG. 4b is a sequential flow diagram 400b illustrating step by step procedure for provisioning the SI to a UE 102 in the next generation wireless system based on periodic broadcast information, according to an embodiment as disclosed herein;

The operations and procedures of the steps 401b to 403b are similar or substantially similar to the steps 401a to 403a.

If at step 404b, as depicted in the FIG. 4b, the UE 102 detects the FLAG is set to TRUE (i.e. Other SI broadcast indicator) meaning that the network is periodically broadcasting the Other SI then UE 102 is not required to initiate the SI request procedure to request Other SI. Further, the UE 102 then monitors the PDCCH during respective SI windows for the OSI indicated by the scheduling information included in the MSI to check if the other system information is addressed with SI-RNTI.

According to steps 405b and 406b of the FIG. 4b, after acquiring the other system information, the UE 102 applies the relevant configuration parameters according to one or more SCI acquired from the MSI. If the Other system information comprises the set of system information parameters and corresponding parameter values associated with the SCI other than the SCI broadcasted by the camped cell 104 then the UE 102 stores the configuration parameters as the configuration list associated with the corresponding SCI. Further at step 406b, the UE stores the one or more SI blocks of the OSI available in the camped cell acquired by the UE from periodic broadcast; wherein the stored SI blocks of the OSI are associated with at least a System Information Area Identifier (SAID) and System Information Configuration Index (SCI).

In an embodiment, the Other SI broadcast indication/FLAG transmitted in the minimum system information indicates whether the cell is broadcasting other system information or the OSI blocks are transmitted through the on-demand basis.

In an embodiment, multiple SCI are broadcasted in the minimum system information on the PBCH/SBCH wherein each SCI is associated with the configuration of SI blocks provided as other system information.

In an embodiment, the system information area identifier (Area-Id/SAID) is broadcasted in the minimum system information on the PBCH/SBCH wherein the Area-Id/SAID points to the linking of the Area-Id and the SCI provided in other system information.

The system information area identifier (Area-Id/SAID) is broadcasted in the minimum system information on the PBCH/SBCH wherein the Area-Id/SAID defines the SI area validity scope for the plurality of SCI.

In an embodiment, the UE stores the one or more SI blocks of the OSI available in the camped cell acquired by the UE either by triggering the request procedure or from periodic broadcast; wherein the stored SI blocks of the OSI are associated with at least a System Information Area Identifier (SAID) and System Information Configuration Index (SCI).

In an embodiment, the common value tag i.e. the counter is broadcasted in the minimum system information on the PBCH/SBCH which indicates at least one system information block provided in other SI has changed or updated.

In an embodiment, the individual value tag i.e. the counter is broadcasted in the minimum system information on the PBCH/SBCH wherein each individual value tag is associated with change or update of corresponding SI block provided in other SI.

In an embodiment, the SIT invalidity flag is broadcasted in the minimum system information on the PBCH/SBCH which if set TRUE indicates the UE 102 that already acquired and stored system information is not valid and the UE 102 need to clear all stored system information and acquire updated SIT.

In an embodiment, the SCI associated with each system information block is included in the common part of the paging message.

In an embodiment, the SCI associated with each system information block is included in the common part of the paging message when the corresponding SI block is updated or changed or modified.

In an embodiment, the SCI associated with each system information block and the corresponding value tag is included in the common part of the paging message.

In an embodiment, the Area-Id/SAID is included in the common part of the paging message.

In an embodiment, the update or change of configuration of at least one SI block is determined based on the presence of SAID, wherein if the SAID in the paging message is different from the SAID obtained previously from the MSI in the camped cell.

In an embodiment, the SI block type of the SI-block is included in the common part of the paging message.

In an embodiment, the SI block type and the associated SCI is included in the common part of the paging message.

In an embodiment, both Area-Id/SAID and SCI associated with each system information block is included in the common part of the paging message.

In an embodiment, the update or change of configuration of at least one SI block is determined based on the presence of plurality of SCI; wherein if the SCI associated with the SI block in the paging message is different from the SCI of the respective SI block obtained previously from the MSI in the camped cell.

In an embodiment, at least one of: system information change indication, one or more SCI associated with system information block (SIB), one or more SI block types and Area-Id/SAID is included in the paging message when the corresponding SI block is expected to be updated or changed or modified.

In an embodiment, the system information change indicator included in the common part of the paging message is transmitted in current system modification interval indicating the configuration associated with one or more system information block will be changed or updated from the start of the next system modification interval.

In an embodiment, the update or change of configuration of at least one SI block is determined based on the presence of system information change indicator in the paging message, where the system information change indicator comprises either the single bit indicating that at least one SI block available in the cell is updated or changed or a bitmap indicating which SI block available in the cell is updated or changed.

In an embodiment, the at least one of: system information change indication, Area-Id/SAID and one or more SCIs associated with system information blocks is included in (e)PDCCH indicating the paging message i.e. included in DCI of (e)PDCCH masked/addressed with P-RNTI.

In an embodiment, the update or change of configuration of at least one SI block is determined based on the presence at least one SCI and SAID, wherein if the SCI associated with at least one SI block and SAID in the MSI is different from the SCI of the corresponding SI block and SAID from previously stored system information.

Figure 5B:
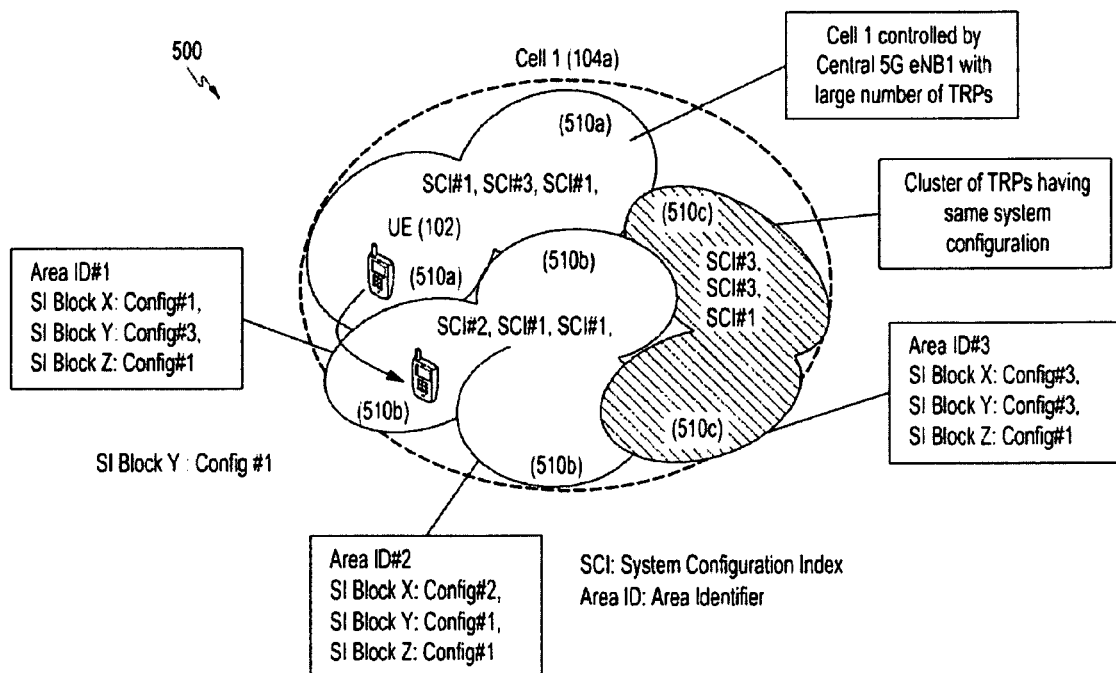
Figure 5C:
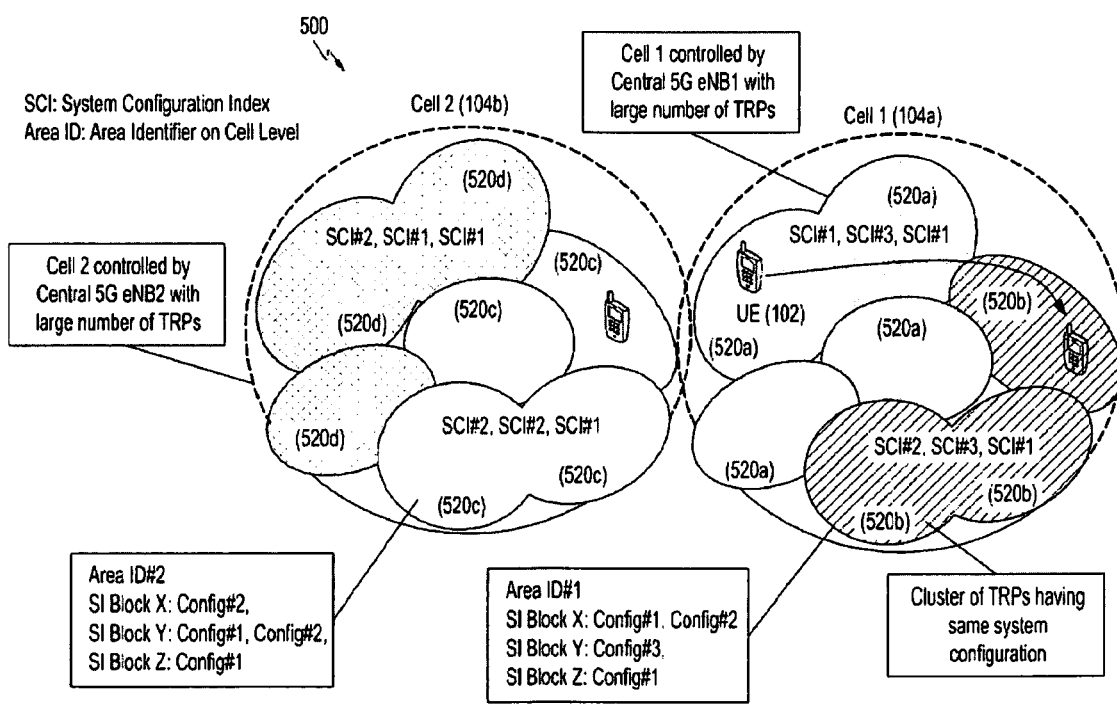

FIGS. 5*a* to 5*c* is a schematic illustration 500 of the system information table and applicability of the system information configuration according to the system configuration index, according to an embodiment as disclosed herein.

The FIG. 5*a* and FIG. 5*b* are example illustration of a general concept of System Information Table and applicability of the system information configuration from the stored system information according to the system configuration index. The Other system information provided to the UE 102 based on the SI request procedure or the periodic broadcast of the OSI comprises multiple blocks of the system information or multiple parts of the system information transmitted in the SI windows. Each system information block or the system information part is identified by a unique identifier so that the UE 102 can distinguish each system information block Type. For e.g. System Information Block X (SIB X), System Information Block Y (SIB Y), System Information Block Z (SIB Z) so on and so forth represents the SIB Type. As depicted in the FIG. 5*a*, there can be one or more configuration/version for each system information block/part wherein each configuration/version associated with a particular system information block/part is identified by the System configuration index or the system configuration identifier (SCI).

In an example, System Information Block/Part X (SIB X) comprising parameter A, parameter B and parameter C has three configurations/versions namely Config 1, Config 2 and Config 3 identified by SCI #1, SCI #2 and SC1 #3 respectively. Each configuration/version of the SIB X takes different combination of values for parameters A, B and C. The System Information Block/Part Y (SIB Y) comprising parameter D and parameter E also has three configurations/ versions namely Config 1, Config 2 and Config 3 identified by SCI #1, SCI #2 and SC1 #3 respectively so on and so forth. Multiple configurations/versions of each system information block/part representing different combination of parameter values along with the associated SCI are provided as Other System Information in the form of list. The list of configurations/versions for the system information blocks/parts of different types is provided as the other system information is generically referred as System Information Table (SIT). The SIT is valid within the PLMN on which the UE 102 has registered. In addition to configuration list, the SIT can also include Area-Id/SAID wherein the Area-Id/SAID is linked with the SCI of each system information block type. For e.g., as shown in the FIG. 5a the Area-Id 1/SAID #1 is linked with SCI #1 of SIB X, SCI #3 of SIB Y and SCI #1 of SIB Z. Similarly Area-Id 2/SAID #2 is linked with SCI #2 of SIB X, SCI #1 of SIB Y and SCI #1 of SIB Z. In the representation in the FIG. 5a, a list of SCIs for each system information block type is provided for each Area-Id/SAID. Alternatively the list of one or more Area-Ids/SAID can be included for each SCI of each system information block type. For e.g. {Area-Id 1, Area-Id 2, Area-Id 3} can be linked with SCI #1 of SIB Z. Similarly {Area-Id 1, Area-Id 3} can be linked with SCI #3 of SIB Y whereas {Area-Id 1} is linked with SCI #1 of SIB X so on and so forth. A NULL Area-Id or absence of Area-Id/SAID may mean that SCI is valid in entire PLMN.

The SIT depicted in the FIG. 5a is one example to represent the SIT and should not be treated as a restriction to represent the SIT. In an embodiment, the SIT received may contain configuration/version list only valid in a specific area according to the included Area-Id/SAID and not the entire PLMN. In an embodiment, only one Area-Id/SAID may be included in the SIT which indicates that all the configuration/version list and the associated SCI included in the SIT is applicable in the area specified by the included Area-Id/SAID. Alternately the area in which the SIT is applicable is the area corresponding to cell/TRP/RRA from which the UE 102 has acquired the SIT either through request-response procedure (i.e. on-demand basis) or acquired from broadcast of other system information. The SIT depicted in the FIG. 5a is one example of the stored system information wherein the UE stores the one or more SI blocks of the OSI available in the camped cell acquired by the UE either by triggering the request procedure or from periodic broadcast; wherein the stored SI blocks of the OSI are associated with at least a System Information Area Identifier (SAID) and System Information Configuration Index (SCI).

The Area-Id/SAID can be one of: the physical Cell-Id (PCI), the TRP-ID, TRP-Group ID or RRA-ID or central unit identifier (CU-ID). The RRA corresponds to group of the cell 104 in which paging can be initiated by the RAN itself. The TRP-Group is a cluster or set of TRPs in which the system information configuration can be same. The central unit (CU) is the eNB controller which controls several TRPs within the coverage area of the Cell served by the eNB 103.

In an embodiment, the MSI includes the plurality of SCI and the SAID, wherein each SCI is associated with the configuration of respective SI block (SIB) available as OSI in the camped cell, and wherein the SAID defines SI area validity scope for the applicability of the plurality of SCI.

In an embodiment, the SAID and the plurality of SCI broadcasted in the MSI can be either a single Identifier or can be separate identifiers conveying both the configuration of the respective SI block (SIB) and the area scope for the validity and applicability.

The configurations associated with SI block applicable in different parts of the network can be provided to UE upon request or broadcasted based on network implementation such that SI block provided in one cell can be also applicable and valid for other cells. The SCI associated with each SI block represents the configuration corresponding to the SI block used in the cell. The SCI need to broadcast in the minimum SI (MSI) so that when UE performs cell re-selection and if UE has stored configuration of SI block corresponding to SCI, UE do not need to re-acquire or request that SI block. UE re-acquires or requests for a SI block only when it does not have the configuration of SI block corresponding to SCI of that SI block or the stored configuration (SIT) is invalid. It is logical that the plurality of SCI is broadcast in MIB #2 (i.e. SIB1) and MIB #1 because list of SCI associated with SI blocks available in cell needs to be signaled and MIB #1 has size restriction.

The configuration corresponding to the SI block either change due to the UE mobility from one area to another area (spatial domain) or within the same area the configuration is updated in time (time domain). For indicating to the UE 102 the change/update in configuration the SCI can be used. However there are some similarities and some subtle differences between the SCI and the system information value tag in the way it is indicated to the UE 102. For the spatial domain, when the configuration corresponding to the SI block acquired in one cell 104a is also applicable/valid in another cell 104b then the value tag or the SCI is broadcasted in the MIB #2 (i.e. SIB1) is the same in all cells i.e. 104a and 104b belonging to the SI validity area indicated by the Area-Id/SAID. This means the value tag is either cell-specific if the SI validity area is one cell or the value tag is area-specific if the SI validity area is more than one cell. The same is applicable if the SCI is used.

In current LTE system, the system information value tag is the cell-specific and each cell handles the value tag independently. This means in the LTE it is possible that the value tag broadcasted in two different cells i.e. 104a and 104b is same but the configuration corresponding to the SI block can be different. In next generation wireless system (NR/5G system) for the case where the value tag is the area-specific some co-ordination is required to broadcast the same value tag in the MIB #2 (i.e. SIB1) of the cells 104a and 104b belonging to the SI validity area. Such co-ordination can be left to network implementation e.g. based on operation and maintenance (O&M) management. The same is applicable if the SCI is used. In LTE, the UE 102 considers the stored system information to be invalid after 3 hours/24 hours from the moment it was successfully confirmed as valid or based on configured parameter SI-Validity Time. In NR/5G system, it can be assumed that the SI block configuration associated with value tag is valid for a certain period similar to the LTE validity time concept. The same is applicable if the SCI is used. In the LTE system, when the configuration is updated in the time domain within the same cell the value tag is simply incremented. In such an action it is assumed there is no mapping between the value tag and the associated configuration and hence simple incrementing works because reuse of value tag within the cell happens after range wrap-around of the value tag. This handling has a dis-advantage that if sometime later if some previous configuration is re-applied in the cell 104, a different value tag is used compared to the value tag previously used. If the validity period of the previous value tag has not expired the UE 102 still re-acquires the same configuration simply because the value tag has changed. The value tag applicability for the SI update in the NR/5G system is not same like the LTE principle for the SI update handling and validity. If the SCI is used then it slightly differs because there is explicit mapping maintained by the network between the SCI and the associated SI block configuration. Therefore, if some previous configuration is re-applied in the cell 104, the same SCI is broadcasted because of the explicit mapping. This is an advantage because the UE 102 does not have to re-acquire the configuration as opposed to when value tag is used. For the value tag applicability on the area-specific level some co-ordination is anyhow needed so the explicit mapping may be also applied to the value tag approach deviating from the LTE principle. The different SI block configurations used in the current LTE networks are not invariably large i.e. only a few parameters of the SI block configuration changes while majority of the parameters remains the same (current LTE value tag is 5 bits). Therefore the SCI range need not be very large and in most cases similar to the value tag range.

Based on the above comparison of the value tag and the SCI, the current value tag concept in the LTE is not directly applicable for NR/5G system at least for the case where the value tag is an area-specific. Some modifications would be required to the value tag handling i.e. co-ordination amongst the cells 104a and 104b of same SI validity area, simple increment of value tag for time domain update leads to unnecessary re-acquisition etc. If these modifications are done then there is no difference between the system information value tag and the SCI handling. It would then be merely a terminology naming difference. In order not to confuse with the value tag concept of the LTE because it will not be the same in NR/5G system, the System information Configuration Index (SCI) terminology for the SI validity handling in the spatial and time domain is more appropriate.

FIG. 5b depicts a schematic illustration of a system information table and applicability of system information configuration according to a system configuration index when the UE moves within the same cell i.e. TRP switching occurs.

As depicted in the FIG. 5b, the UE 102 acquires one of: the SCI associated with each system information block or the Area-Id/SAID or both Area-Id/SAID and the SCI associated with each system information block from the minimum system information broadcasted from the camped cell 104a served by TRP 105a covering the area 510a. The SCI broadcasted in the minimum system information from the TRP 105a covering the area 510a corresponds to SCI #1 of SIB X, SCI #3 of SIB Y and SCI #1 of SIB Z respectively Instead of transmitting multiple SCI an alternative approach is to broadcast the Area-Id/SAID in the minimum system information. If the UE 102 has already acquired OSI and stored the system information then the UE 102 refers to the configuration list in the SIT acquired previously using the request-response procedure (i.e., on-demand basis) or from broadcast to check if the SCIs acquired from the MSI are present in the SIT.

In an embodiment, the UE checks if the Area-Id/SAID acquired from the MSI is present in the linking information of the Area-Id/SAID and the SCI in the stored system information. The Area-Id 1 is linked with the SCI #1 of SIB X, SCI #3 of SIB Y and SCI #1 of SIB Z in the SIT. The SIB X parameters and values identified by SCI #1, SIB Y parameters and values identified by SCI #3 and SIB Z parameters and values identified by SCI #1 from the configuration list is applied when the UE 102 is in the coverage area 510a as depicted in the FIG. 5b. If the UE 102 has just powered ON in the area 510a and acquired the MSI broadcasted on PBCH/SBCH by the cell 104a, then the UE 102 follows the procedure depicted in the FIG. 4a or the FIG. 4a to acquire the Other system information (i.e. SIT).

Further, the acquired SIT is applicable not only in the coverage area of the serving TRP 105a but also neighboring TRPs. The neighboring TRPs may belong to the serving cell or neighbor cell which implies acquired SIT is applicable in neighboring cells unless there is a notification for change or update of one or more system information block/parts of the SIT. During mobility assume the UE 102 moves from the coverage area 510a to coverage area 510b served by another TRP controlled by the eNB 103 other than the TRP serving coverage 510a. Even though the coverage area 510b belongs to the same cell 104a which also includes coverage area 510a, it is possible that cluster or set of TRPs serving coverage 510a have some parts of system information different from the cluster or set of TRPs serving coverage 510b. The cluster or set of TRPs can have same TRP-Group ID. In an example, the RACH configuration could be different in coverage areas 510a and 510b even though they belong to the same cell 104a controlled by the same eNB 103a.

The UE 102 now acquires one of: the SCI associated with each system information block or the Area-Id/SAID or both Area-Id/SAID and the SCI associated with each system information block from the minimum system information broadcasted from the TRP 105b serving the coverage area 510b. Further, the UE 102 identifies that, in the coverage area 510b, the SCI for SIB X and SIB Y has changed to SCI #2 from SCI #1 and to SCI #1 from SCI #3 compared to coverage area 510a whereas the SCI for SIB Z has remained unchanged. Alternatively, the UE 102 identifies that Area-Id/SAID has changed to Area-Id 2 from Area-Id 1 while moving from the coverage area 510a to the coverage area 510b. The SIB X parameters and the values identified by SCI #2, SIB Y parameters and values identified by SCI #1 and SIB Z parameters and values identified by SCI #1 from the configuration list is applied when the UE 102 is in coverage area 510b as depicted in the FIG. 5b.

Similarly when the UE 102 moves from the coverage area 510b to the coverage area 510c, the SCI associated with SIB X and SIB Y change from SCI #2 to SCI #3 and SCI #1 to SCI #3 respectively whereas the SCI associated with SIB Z remains unchanged. The UE 102 refers to the stored SIT table and apply the SIB X parameters and values identified by SCI #3, SIB Y parameters and values identified by SCI #3 and SIB Z parameters and values identified by SCI #1 from the configuration list (if the validity timer for respective SCI has not expired) when the UE 102 is in the coverage area 510c as depicted in FIG. 5b. The Area-Id/SAID is depicted on TRP level in the FIG. 5b where the Area-Id can be the TRP-Group ID.

One problem while moving from the coverage area 510a to the coverage area 510b and then to coverage area 510c within the same cell 104a is that, the UE 102 needs to acquire the MSI (i.e. decode PBCH/SBCH) upon every TRP change within the same cell to determine if the SCI has changed or the Area-Id/SAID has changed. This is possible if the TRP-ID is visible to the UE. This could be a big burden from the UE power consumption point of view. Further, if the TRP is transparent to the UE then TRP switching and change of coverage area from 510a to 510b to 510s within the same cell is not identified by the UE. Such problem when the TRP is transparent and the burden when the TRP-ID is visible can be avoided if the paging message transmitted by the TRPs 105 controlled by the eNB1 103*a* of the cell 104*a* also include the SCI of the system information blocks in the paging message. The UE 102 in the idle/inactive mode has to anyway check for the paging message every paging cycle to determine if there is a page for it from the network. The paging message has a page record for several UEs 102*a*-102*c* and 102*x*-102*z* indicating network terminated calls for those UEs 102*a*-102*c* and 102*x*-102*z*. There can be the common part within the paging message outside the paging record for individual UEs 102 wherein the common part includes SCI of the system information blocks or the Area-Id/SAID.

Upon decoding the common part of the paging message, the UE 102 can determine if the SCI of any of the SIB has changed compared to the SCI values previously acquired from the MSI or previous opportunity of the paging cycle. The paging message may include only the SCI for the SIBs which are expected to be updated; wherein the SI block type is also included along with the associated SCI. If there is change in the SCI values associated with one or more system information blocks then the UE 102 can refer to the stored system information to check if the configuration associated with the SCI acquired from paging message is available and if available can apply the appropriate configuration (provided the validity timer has not expired) associated with the SCI value read from the paging message. If not available in the stored system information then the UE 102 can perform the request-response procedure depicted in the FIG. 4*a* or FIG. 4*b*.

In an embodiment, the concept of applicability of the system information configuration from the configuration list according to the SCI acquired from the MSI is possible during cell re-selection i.e. moving from Cell 104*a* to Cell 104*b*. The concept of applicability of the system information configuration from the configuration list is not restricted to the TRP switching/change within same cell but can also be generically applied for TRP change across different cells or during cell re-selection where different cells are served by different central eNBs 103. FIG. 5*c* depicts a schematic illustration of a system information table and applicability of system information configuration according to a system configuration index when the UE moves from one cell to another cell i.e. Cell re-selection.

If the linking of Area-Id/SAID is restricted to only one SCI of each SIB then from a wireless network operator perspective it can become too restrictive. It can also require careful network planning on behalf of the network operator. Further, multiple configurations/versions of the system information block (i.e. more than one SCI of same system information block) are provided for the Area-Id/SAID. Such an approach can provide some simplification and flexibility for the wireless network provider for planning the SCI within the PLMN. For example Area-Id 1 is linked with SIB X (SCI #1, SCI #2), SIB Y (SCI #3) and SIB Z (SCI #1) as shown in FIG. 5*c*. Similarly Area-Id 2 is linked with SIB X (SCI #2), SIB Y (SCI #1, SCI #2) and SIB Z (SCI #1) so on and so forth. Such representation would be useful if the Area-Id/SAID indicates the area covered on the cell level or group of cells. As an example the Area-Id/SAID is depicted on the cell level in the FIG. 5*c*, where the Area-Id/SAID can be for example the cell ID.

However, the illustration in FIG. 5*c* for the Area-Id/SAID on the cell level should not be considered as the limiting case. The cell 104*a* consists of several TRPs 105*a*, 105*b*, so on and so forth and the cell 104*b* consists of several TRPs 105*c*, 105*d*, so on and so forth where the cluster or the set of TRPs have same system configuration. On the cell level i.e., Area-Id level different SCI associated with the system information block can be used in different TRP cluster within the cell 104*a* and cell 104*b*. As depicted in the FIG. 5*c*, within cell 1 104*a* the coverage area 520*a* and coverage area 520*b* have the same SCI for SIB Y and SIB Z (i.e. SCI #3 for SIB Y and SCI #1 for SIB Z) whereas SCI #1 for SIB X is used in the coverage area 520*a* while SCI #2 for SIB X is used in coverage area 520*b*.

Similarly within the cell 2 104*b*, the coverage area 520*c* and coverage area 520*d* have the same SCI for SIB X and SIB Z (i.e. SCI #2 for SIB X and SCI #1 for SIB Z) whereas SCI #1 for SIB Y is used in the coverage area 520*c* while SCI #2 for SIB Y is used in coverage 520*d*. In the scenario depicted in the FIG. 5*c* after acquiring the Area-Id/SAID from the MSI, the UE 102 cannot determine which configuration of the SIB X (SCI #1 or SCI #2) has to be applied just on the basis of Area-Id/SAID. The UE 102 also need to read the SCI value associated with the SIB X transmitted in the MSI by the serving cell along with the Area-Id and then to refer to the stored system information (i.e. SIT) where linking information in the SIT is used to determine the appropriate configuration of the respective system information blocks to be applied. While applying the system configuration from the SIT the UE checks if the validity timer associated with the SCI has not expired.

As depicted in the FIG. 5*c*, the UE 102 acquires both the Area-Id/SAID and the SCI associated with each system information block from the minimum system information broadcasted from the camped cell 104*a* served by the TRP 105*a* covering the area 520*a*. The UE 102 determines the Area-Id 1 and SCI #1 for SIB X, SCI #3 for SIB Y and SCI #1 for SIB Z from the MSI. Even though in the stored system information i.e. SIT the Area-Id 1 is linked with both SCI #1 and SCI #2 of SIB X, the UE 102 can determine it has to apply configuration associated with SCI #1 for SIB X, configuration associated with SCI #3 for SIB Y and configuration associated with SCI #1 for SIB Z when served by the TRP 105*a* within the coverage area 520*a* of the cell 1 104*a*. When the UE 102 moves to the coverage area 520*b* of the cell 1 104*a*, the Area-Id/SAID does not change so if the UE 102 relies only on the Area-Id/SAID then it will continue to apply configuration associated with SCI #1 for SIB X which is an incorrect configuration. However, if the UE 102 reads both the Area-Id/SAID and SCI of each system information block from paging message (within the same cell UE is not required to read the MSI again) then it can determine even though Area-Id is same, SCI of SIB Y and SCI of SIB Z has not changed but SCI of SIB X has changed to SCI #2 from SCI #1 when the UE 102 moves from coverage area 520*a* to coverage area 520*b*. The UE 102 then refers to the linking information in the SIT and applies configuration associated with SCI #2 for SIB X, configuration associated with SCI #3 for SIB Y and configuration associated with SCI #1 for SIB Z from the stored system information (i.e. SIT) when served by the TRP 105*b* within the coverage area 520*b* of the cell 1 104*a*.

In another situation, when the UE 102 moves from coverage area 520*a* of cell 1 104*a* to the coverage area 520*c* of the cell 2 104*b*, i.e. cell re-selection scenario the UE can determine the Area-Id/SAID has changed. During cell re-selection there is requirement that the UE 102 acquires the MSI broadcasted on PBCH/SBCH of the re-selected cell i.e. Cell 2 104*b*. On the basis of only the Area-Id/SAID, the UE 102 can determine that the system configuration may have changed while moving from the cell 1 104*a* to the cell 2 104*b*. However, based only on the Area-Id/SAID, since the applicability and validity of SCI is within the scope of Area-Id/SAID the UE simply has to re-acquire all the SIB X, SIB Y and SIB Z configuration associated with SCI #2 for SIB X, SCI #2 for SIB Y and SCI #1 for SIB Z. However, if the stored system information i.e. SIT has valid configurations for Area-Id 2 then the UE 102 can determine it has to apply configuration associated with the SCI #2 for SIB X and configuration associated with SCI #1 for SIB Z but cannot determine whether to apply configuration associated with SCI #1 or SCI #2 for SIB Y. Therefore, the UE 102 is required to read both the Area-Id/SAID and SCI of each system information block from the MSI transmitted by TRP 105 *c* serving coverage area 520 *c* within Cell 2 104*b* to determine the appropriate configuration associated with the SCI of the respective SI block to be applied from the SIT. In coverage area 520*c*, the UE 102 determines the Area-Id 2 and SCI #2 for SIB X, SCI #1 for SIB Y and SCI #1 for SIB Z from the acquired MSI transmitted by the TRP 105*c* of cell 2 104*b*. Referring to the linking information in SIT, the UE 102 can determine it needs to apply configuration associated with SCI #2 for SIB X, configuration associated with SCI #1 for SIB Y and configuration associated with SCI #1 for SIB Z from the stored SIT when served by the TRP 105*c* within the coverage area 520*c* of the cell 2 104*b*.

The applicability and validity scope of the SCI is either cell-specific or area-specific. There are two options to define the scope of SCI:

Option1: Single Index for each SI block, and

Option2: Separate explicit System information Area ID (SAID).

The SAID can be common for all area-specific SI blocks and therefore the list of area-specific SCI can be signaled along with the SAID in the MSI. Alternatively, the SAID together with area-specific SCI is signaled separately for each SI block when the SAID is not common for all area-specific SI blocks.

From the network perspective, the scope of SCI is area-specific so that the UE 102 should know the area scope but there is no benefit for the UE 102 to know the SAID. What matters to the UE 102 is to unambiguously determine whether the SCI is unique and whether it is valid. In option 1, the uniqueness of the SCI can be guaranteed by appending the area identifier (Area-Id) in front of the SCI forming the single index for each SI block. For e.g. assume the area identifier (Area-Id) to be 10 bits and the SCI as 10 bits then the single index is 20 bits. This is similar to the 28 bits cell identity transmitted in the SIB1 in the LTE where the cell identity unambiguously identifies the cell within the PLMN. How the 28 bits are distributed for the eNB ID and Cell ID cannot be differentiated by the UE 102. Therefore just like cell identity there seems no need to have a hard split for the Area identifier (Area-Id) and the SCI with the Single Index approach. Instead how the split is between the Area identifier (Area-Id) and the SCI is known to the operator which provides the flexibility to ensure that the SCI is unique within the PLMN. Broadcasting in MIB #2 (i.e. SIB1) the longer Single Index for each SI block is not preferable from signaling overhead point of view.

In option 2, in addition to the list of SCI corresponding to each SI block available in the cell an explicit System Information Area-Id (SAID) common for all area-specific SI blocks is broadcasted in the MIB #2 (i.e. SIB1). The UE 102 needs to check both the Area-Id/SAID and the SCI to determine whether the SCI is unique and whether it is valid. For a particular SIB if the Area-Id/SAID changes for the UE 102 moving from one area to another area, the UE 102 needs to re-acquire new system information applicable for the new area. For a particular SI block if the Area-Id/SAID does not change from moving one area to another area but the SCI associated with that SI block changes while for other SI blocks it does not change then the UE 102 re-acquires only those SI blocks for which the SCI has changed.

In the alternate option 2, the SCI and the System Information Area-Id are signaled separately for each SI block. In this approach the area scope of the SCI for each SI block can be different. In terms of signaling overhead both the Single Index (option1) and explicit Area-ID/SAID plus SCI for each SI block have similar performance while the common Area-Id/SAID plus list of SCI approach is better. In terms of UE complexity to determine whether to re-acquire the SI block or not optional is single step procedure while Option2 is a two-step procedure.

The format of System information Area ID (SAID) to define the scope of SCI can be Single Index, explicit Area-Id/SAID or can be based on list of Cell ID or PCI. For the list of Cell ID or PCI approach the UE 102 needs to be provided through the UE-specific signaling the list when the UE 102 is in connected state. Providing the list on broadcast in MIB #2 (i.e. SIB1) is not efficient from overhead point of view. If the UE 102 moves to the area where the Cell ID in MIB #2 (i.e. SIB1) or decoded PCI does not belong to the list of Cell ID/PCI then the UE 102 needs to re-acquire system information but the UE 102 is required to move to connected state to acquire the list of Cell ID/PCI applicable for the new area.

In LTE, every cell broadcasts its own System Information. The value tag concept is used for validating the stored SI in the LTE system. The UE 102 deletes any stored SI after 3/24 hours from the moment it was confirmed to be valid. However, the UE 102 is not mandated to store SI other than the camped cell and storing SI of previously visited cells is up to UE implementation. For NR/5G system, the UE 102 can be provided with the configuration list corresponding to each SI block (i.e. more than one version of the SI block configuration). The UE stores more than one version of SI block configuration and the associated SCI and Area-Id/SAID. Upon checking the SCI broadcasted in MSI or received in paging message, the UE 102 applies the appropriate SI block configuration from stored SI or SIT. This minimizes the re-acquisition if valid stored SI block configuration is present. It can be argued that storing multiple version of SI block configuration increases the storage requirement at the UE 102 to store the configuration list. These are not valid concerns and can be handled based on validity timer associated with the SCI, where the corresponding configuration is deleted upon expiry of the validity timer. Further, it is network decision whether to provide the UE 102 with the single SI block configuration or the list of configuration for some SI blocks. If the network decides broadcast mechanism then normally network provides the single SI block configuration. If the network decides unicast then depending on the UE storage capability network can provide the SI block configuration list only to those UEs 102*a*-102*c* and 102*x*-102*z*. This avoids mandating all UEs 102*a*-102*c* and 102*x*-102*z* for additional large storage capability. Therefore, the UE 102 is not mandated to store SI other than the camped cell similar to LTE. Storing acquired SI of previously visited cells is up to the UE implementation. It is network decision to provide SI block configuration list (i.e. one or more version of the SI block configuration) based on the UE storage capability.

Figure 6A:
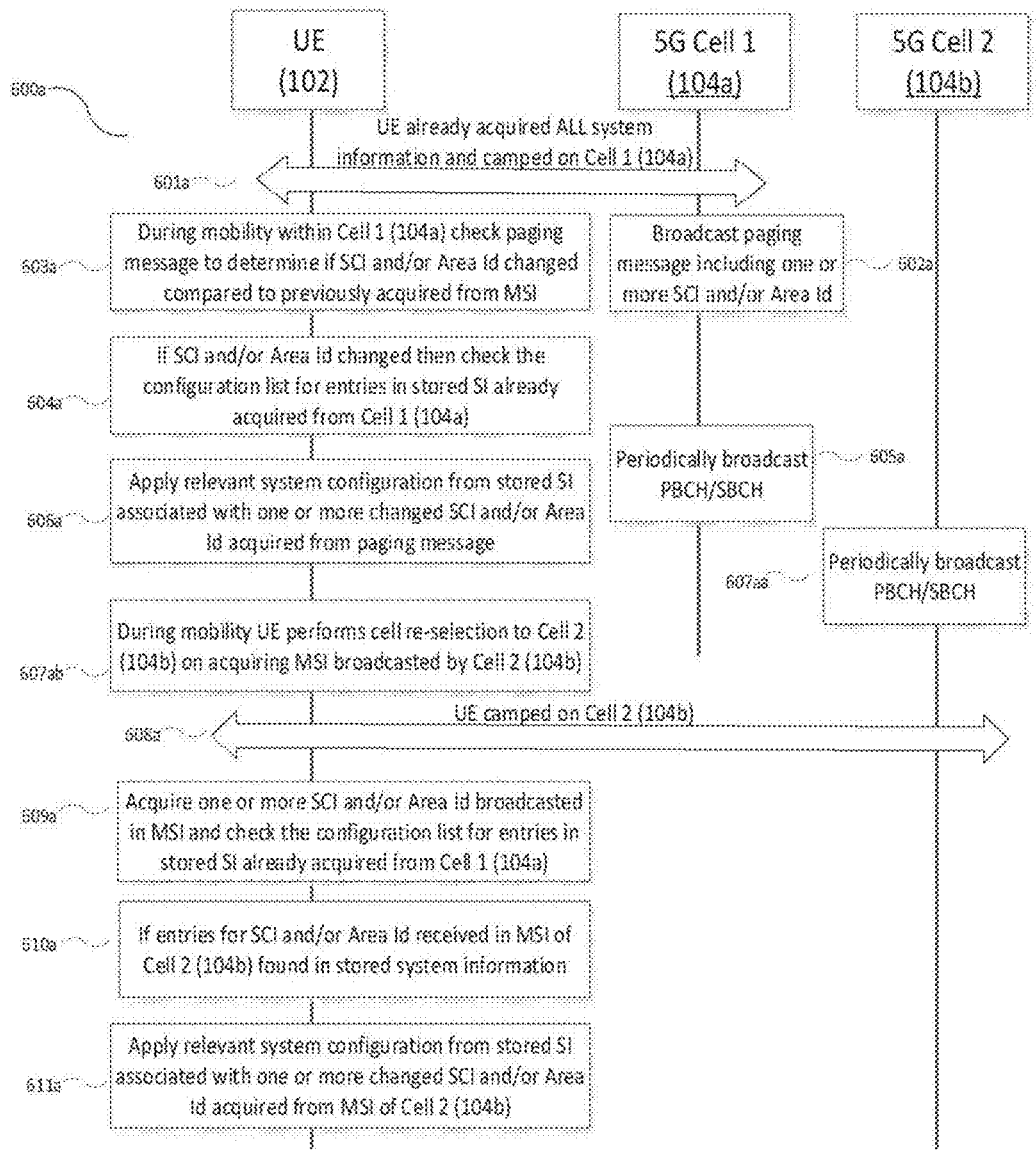
FIG. 6a is a schematic illustration of a procedure for applying the system information configuration according to the system configuration index (SCI) acquired from a MSI during a cell re-selection or a according to the SCI acquired from paging message during TRP switching within the same cell when the acquired SCI and/or Area-Id is present in a SIT, according to an embodiment as disclosed herein.

FIG. 6*a* is an example illustration of a step by step procedures for applicability of the system information configuration according to the system configuration index acquired from the paging message or the MSI during the mobility within the camped cell or cell re-selection or TRP switching when the acquired SCI or Area-Id/SAID is present in stored system information i.e. SIT, according to an embodiment as disclosed herein.

Figure 6B:
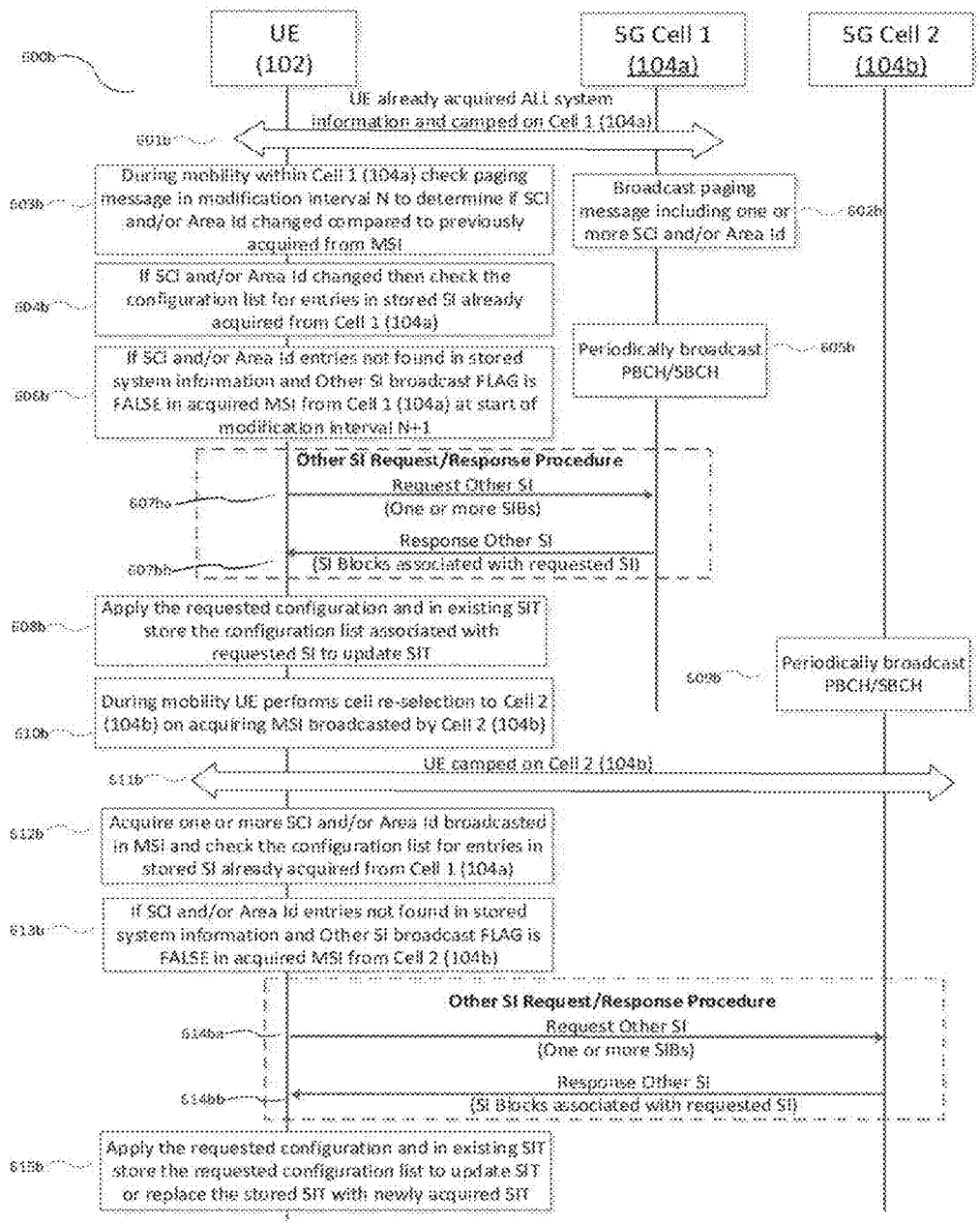
FIGS. 6b and 6c are illustrating step by step procedures for the system information configuration according to the system configuration index acquired from a paging message or the MSI during the TRP switching within the same cell or during the cell re-selection when the acquired SCI and/or Area-Id is not present in SIT, according to an embodiment as disclosed herein.
Figure 6C:
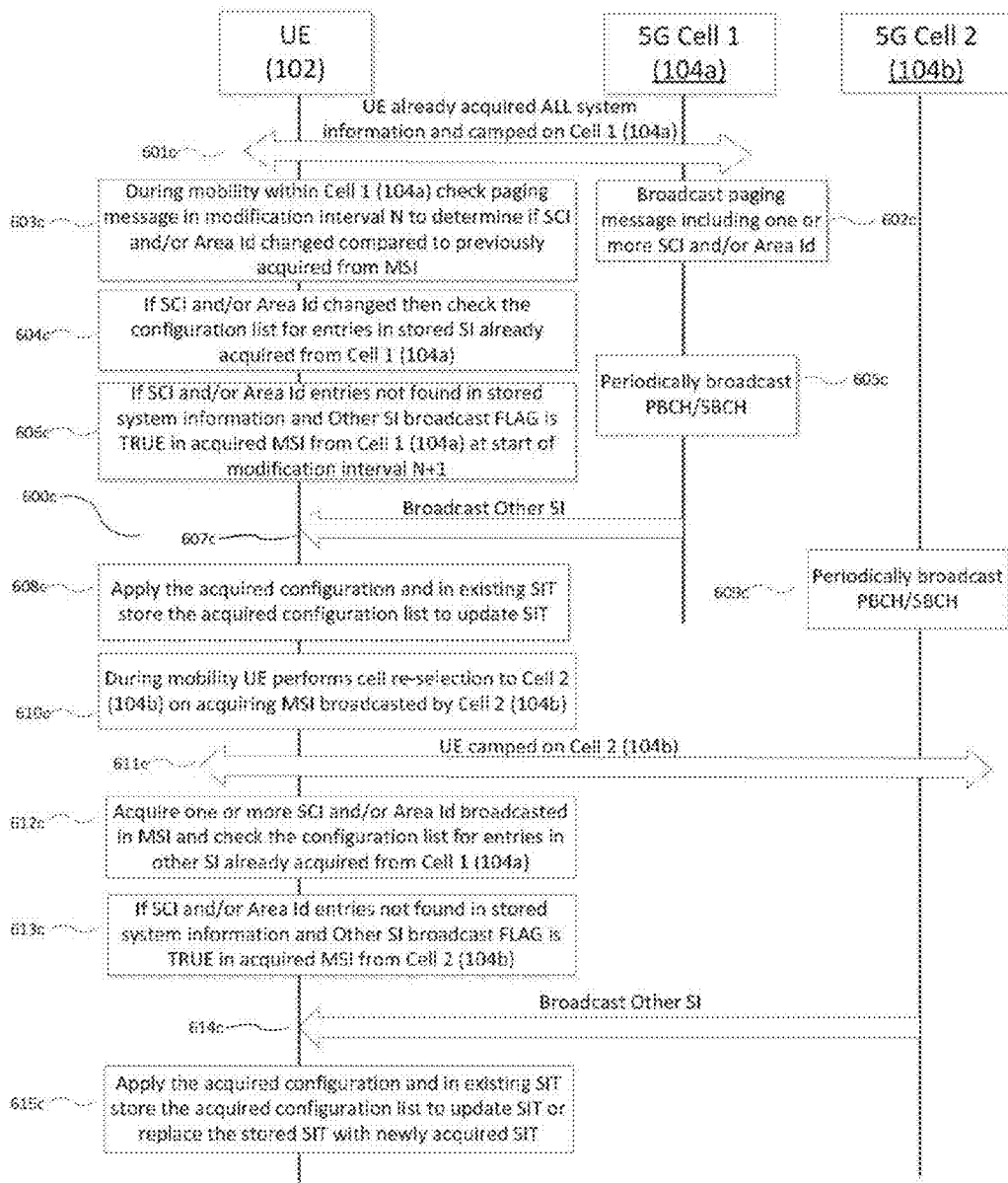

FIGS. 6*b* and 6*c* illustrate an example scenario of the step by step procedures for applicability of the system information configuration according to the system configuration index acquired from paging message or the MSI during mobility within the camped cell or the TRP switching or cell re-selection when the acquired SCI and/or Area-Id/SAID is not present in stored system information i.e. SIT, according to an embodiment as disclosed herein.

The procedure 600*a* for applicability of the system information configuration according to the system configuration index acquired from the paging message or the MSI during mobility within the camped cell 104 or TRP switching or cell re-selection when the acquired SCI and/or Area-Id/SAID is present in the stored system information i.e. SIT is depicted in FIG. 6*a*.

At step 601*a*, the UE 102 is camped to the cell 1 104*a* and has acquired the minimum system information (MSI) broadcasted in the MIB #1 and the MIB #3 (i.e. SIB1) from the cell 1 104*a* and also acquired the other system information (OSI) from the cell 1 104*a* using the either the SI request procedure or from periodic broadcast. Based on the plurality of SCI values and/or Area-Id/SAID acquired from the MSI of the Cell 104*a*, the UE 102 has applied the corresponding configuration of SI blocks (SIBs) by referring to the configuration list in the other system information (OSI). The UE 102 stores all acquired system information available in the camped cell 104*a*. During mobility within the Cell 1 104*a* there is possibility of TRP change or TRP switching which may result in different configuration for one or more system information blocks.

At step 602*a*, the different TRPs of Cell 1 104*a* controlled by the central eNB 103*a* transmitting the paging message comprising at least the SCI associated with each SIB, Area-Id/SAID and paging records for one or more UEs 102.

At step 603*a*, the UE 102 monitors the paging opportunity according to the configured paging cycle and checks the paging message for the SCI or Area-Id/SAID. If the SCI associated with the SIB received in the paging message is different from the SCI for respective SIB previously acquired from MSI in step 601*a*, then the UE 102 determines the system configuration has changed for those respective SIB. Alternatively, if the Area-Id/SAID received in the paging message is different from the Area-Id/SAID previously acquired from the MSI in the step 601*a*, then the UE 102 determines the system configuration has changed for some SIB. In some situations the Area-Id/SAID may not change but the SCI associated with SIB may change or SCI associated with some SIB may not change but Area-Id/SAID can change. The paging message can include only SCI associated with those SIBs for the corresponding configuration is expected to be updated or changed or modified in the cell 1 104*a*. In this case the SI block type and the associated SCI is included in the paging message.

If there is change in the SCI and/or the Area-Id/SAID, at step 604*a*, the UE 102 refers to the configuration list or linking information of the Area-Id/SAID and the SCI in the stored SIT. If the configuration of the SIB associated with the changed SCI acquired from the paging message is available in the SIT then the UE 102 disables the previous configuration and applies the new configuration from the SIT for the changed SCI at step 606*a* provided the validity timer has not expired for new configuration. For unchanged SCI acquired from the paging message it is safe to disable the previous configuration and apply the new configuration from the SIT for the unchanged SCI as well. However this is not necessary because for unchanged SCI the associated configuration corresponding to the SIB is not changed or not updated. By monitoring or reading the paging message every paging cycle, the UE 102 is not required to decode the MSI upon every TRP change within the same cell to determine if there is change in system information configuration. Further, when the UE 102 is not moving i.e. stationary in the cell 1 104*a* by monitoring or reading the paging message every paging cycle the UE 102 is not required to decode the MSI to determine if there is change in the system information configuration i.e. time domain update of system information. From the UE perspective, the UE 102 monitors the PDCCH/ePDCCH during the paging opportunity every paging cycle to check if paging message is transmitted by the serving cell. For example paging message may not be transmitted every paging opportunity because there may not be page record for any UE. Whenever the paging message is transmitted by the TRP 105 of the serving cell, the paging message includes the SCI associated with each changed or updated SIB and/or Area-Id. The SCI and/or Area-Id transmitted in the paging message at step 602*a* is same as the SCI and/or Area-Id broadcasted in the MSI by the TRP 105 of the serving cell at step 605*a*. The paging message can also be transmitted during the paging opportunity by the TRP 105 of the serving cell even though there is no paging record for the individual UE 102. This is possible when the configuration of some SIB(s) is expected to be changed in system modification interval N+1 then paging message including the system information change indication is transmitted at step 602*a* in every paging opportunity during system modification interval N. The inclusion of system information change indication is explained in details in the description of the FIG. 7*a*, the FIG. 7*b* and the FIG. 7*c*.

At the start of system modification interval N+1, the TRPs of the cell 1 104*a* is periodically broadcasting the respective MSI on PBCH/SBCH at step 605*a*. The SCI and/or Area-Id broadcasted in the MSI by the TRP 105 of the serving cell i.e. cell 1 104*a* at step 605*a* is same as the SCI and/or Area-Id received by the UE 102 in the paging message during system information modification interval N at step 602.

Further, the UE 102 which was camped to the cell 1 104*a* served by one or more TRPs controlled by the eNB 103*a* may experience poor signal quality from the cell 1 104*a* due to mobility towards the cell edge. The UE 102 can detect synchronization signals from one or more TRPs 105 controlled by the eNB 103*b* serving the Cell 2 104*b* and upon synchronization signal detection can perform signal strength comparison of cell 1 104*a* quality and cell 2 104*b* quality based on either beam reference signals (BRS) or some reference signals.

The TRPs 105 of the cell 2 104*b* is periodically broadcasting the respective MSI on the PBCH/SBCH at step 607*aa*. If signal quality of the cell 2 104*b* is better than that of the cell 1 104*a* then the UE 102 acquires the MSI from the cell 2 104*b* at step 607*ab*. Further, the UE 102 performs the cell-reselection according to a threshold criterion also called as cell re-selection criterion and camps to the cell 2 104*b* at step 608*a*. Upon cell re-selection from Cell 1 104*a* to Cell 2 104*b* the UE 102 is required to decode the PBCH/SBCH transmitted by TRP 105 of Cell 2 104*b* to acquire the MSI. If the SCI associated with one or more SIB acquired from the MSI broadcasted by the cell 2 104*b* is different from the SCI for respective SIB previously acquired from the MSI in step 601*a*, then the UE 102 determines the system configuration has changed for those respective SIB at step 609a i.e. spatial domain change of system information. Alternatively, if the Area-Id/SAID acquired from the MSI broadcasted by the cell 2 104b is different from the Area-Id/SAID previously acquired from the MSI in step 601a, then the UE 102 determines the system configuration has changed for some SIB i.e. spatial domain change of system information. At step 610a, the UE 102 refers to the configuration list or linking information of Area-Id/SAID and SCI in the stored SIT. At step 611a, if the configuration of the SIB associated with changed SCI and Area-Id/SAID acquired from the MSI of the cell 2 104b is available in the SIT then UE 102 disables the previous configuration and applies the new configuration from the SIT for the changed SCI provided the validity timer has not expired for new configuration. For unchanged SCI and Area-Id/SAID, the SCI acquired from the MSI broadcasted by the cell 2 104b it is safe to disable the previous configuration and apply the new configuration from the SIT for the unchanged SCI as well. However this not necessary because for unchanged SCI the associated configuration corresponding to the SIB is not changed if the Area-Id/SAID is also not changed.

In some situations after TRP switching or cell-reselection the SCI acquired from paging message or MSI broadcasted by the re-selected cell may not have corresponding configurations in the stored system information (i.e. SIT). In some other situations, the SIT may become invalid if the validity timer for all SIBs has expired. In some other situations the SIT is valid in a specific area according to Area-Id/SAID included in the SIT and not the entire PLMN. In such situations after cell-reselection the Area-Id/SAID acquired from MSI broadcasted by the re-selected cell (i.e., Cell 2 104b) can be different than the stored Area-Id/SAID of the previously camped cell (i.e., Cell 1 104a) where the Area-Id/SAID included in the MSI acquired from previously camped cell (i.e., cell 104a). In such situations the SI validity area has changed then the UE 102 needs to either trigger the SI request procedure to obtain the other system information (i.e. SIT) or acquire the OSI from broadcast if the broadcast indicator/FLAG included in the MSI is enabled.

The procedures 600b and 600c for applicability of the system information configuration according to the system configuration index acquired from the paging message or the MSI during the mobility within the camped cell or the TRP switching or the cell re-selection when the acquired SCI and/or Area-Id/SAID is not present in stored system information i.e. SIT, is depicted in FIGS. 6b and 6c according to the embodiment herein. All the steps in FIG. 6b and FIG. 6c are same as FIG. 6a up to step 605a and therefore the description of these steps is omitted while describing the steps of FIG. 6b and FIG. 6c. At steps 606b and 606c of the FIGS. 6b and 6c, the difference compared to FIG. 6a is the relevant system configuration associated with one or more changed SCI and/or Area-Id acquired from the paging message is not found in the stored system information i.e. SIT. Therefore, the UE 102 is required to re-acquire the updated or changed configuration of one or more SIBs from the start of modification interval N+1. The UE 102 checks the status of the broadcast indicator/FLAG transmitted in the MSI by the cell 1 104a at step 606b and step 606c. All the steps in FIG. 6b and FIG. 6c are same except the steps after checking the status of broadcast indicator/FLAG included in the acquired MSI. The FIG. 6b depicts the situation where the broadcast indicator/FLAG included in the acquired MSI is FALSE (i.e. the other system information is not periodically broadcasted). In this case the UE 102 needs to perform the SI request procedure and acquire the requested SI.

At step 607ba, the UE 102 triggers the SI request procedure to acquire the configuration associated with the changed SCI and/or changed Area-Id from the TRP of the cell 1 104a for the time domain update of system information scenario or the TRP change scenario within the same cell (i.e. cell 104a). For the cell change scenario (i.e. cell re-selection scenario), the UE 102 needs to trigger the SI request procedure at step 614ba to acquire the configuration associated with the changed SCI and/or changed Area-Id from the TRP of the cell 2 104b. Upon receiving the UE SI request at step 607ba in the cell 1 104a or at step 614ba in the cell 2 104b the network can either broadcast at step 607bb/614bb the updated system information requested by the UE 102 in the respective SI windows according to the scheduling information included in the MSI or respond at step 607bb/614bb with the requested SI with dedicated signaling.

At step 606c in the FIG. 6c depicts the situation where the broadcast indicator/FLAG included in the acquired MSI is TRUE (i.e. the other system information is periodically broadcasted). In such case the UE 102 does not need to trigger the SI request procedure. Instead the new configuration is acquired by the UE 102 from the start of modification interval N+1 from the broadcast done at step 607c during the respective SI windows according to the scheduling information included in the MSI. The updated or changed other system information is acquired by the UE 102 from the broadcast done by the TRP of camped cell at step 607c for the time domain update of system information scenario or the TRP change scenario within the same cell (i.e. cell 104a). For the cell re-selection scenario from the cell 1 104a to the cell 2 104b respectively the changed other system information is acquired by the UE 102 from the broadcast done by the TRP 105 of the reselected cell i.e. cell 2 104b at step 614c. After acquiring the updated or changed system information the UE 102 apply the acquired configuration and store the acquired configuration to update the stored SI at steps 608b/608c and 615b/615c in both FIGS. 6b and 6c.

In scenarios where the stored system information i.e. SIT is valid within the specific area as indicated by Area-Id/SAID in SIT, the UE 102 needs to check the Area-Id/SAID included in the paging message or Area-Id/SAID broadcasted in the MSI and if the acquired Area-Id/SAID does not match with Area-Id/SAID in the stored system information i.e. SIT then the UE needs to follow either the SI request procedure to request changed configuration list of the system information (i.e. SIT) or acquire fresh SIT valid for the acquired Area-Id/SAID from the respective SI window broadcast.

Figure 7A:
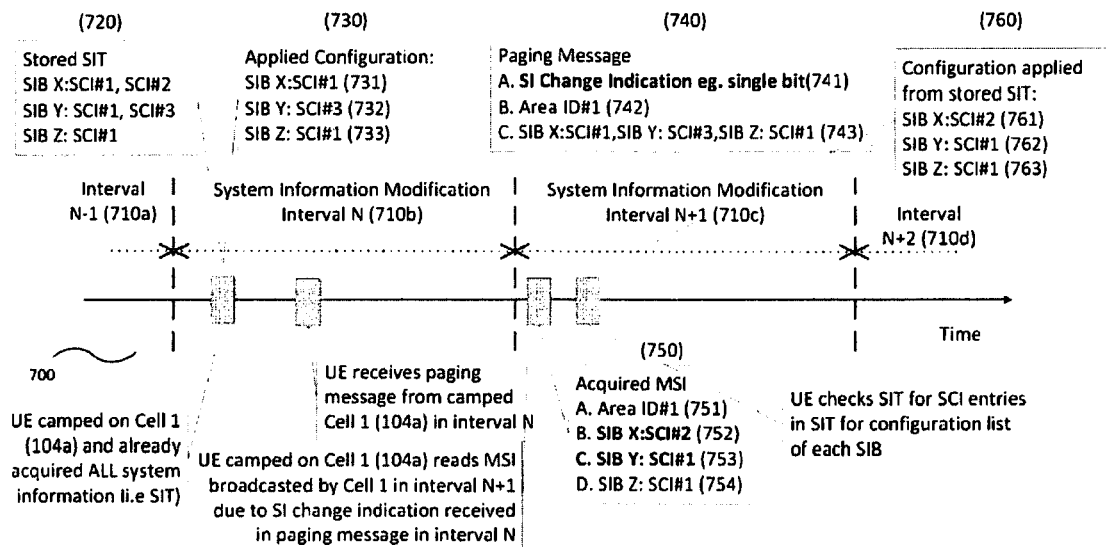
FIGS. 7a and 7b are illustrating an example scenario in which update of the system information configuration according to the system information change indication included in a paging message is explained, according to an embodiment as disclosed herein.
Figure 7B:
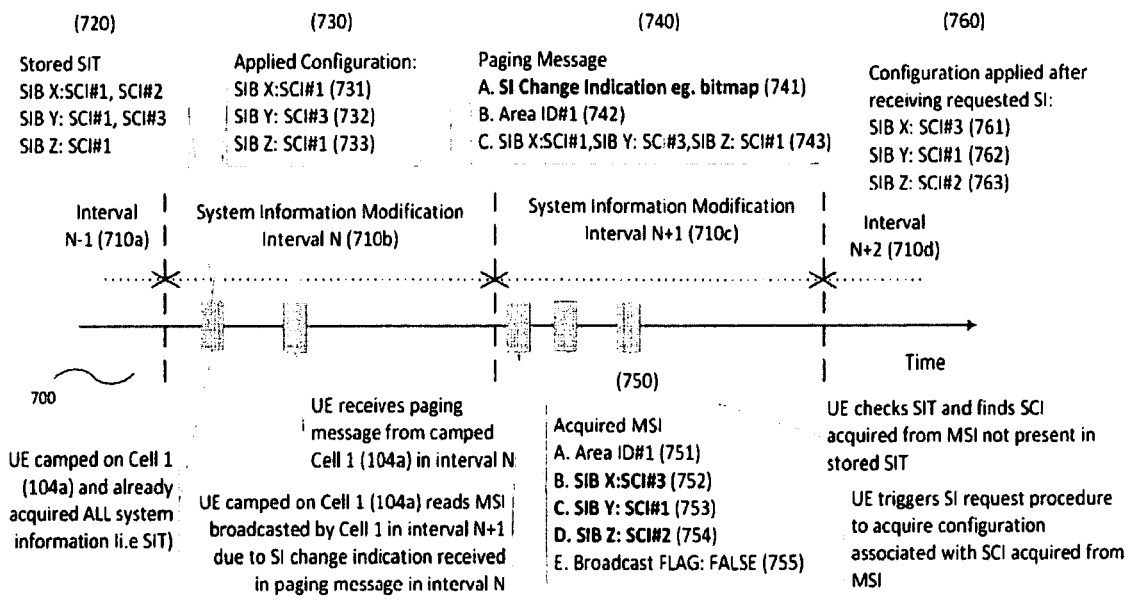

FIGS. 7a and 7b are illustrating a generic design 700 for change in the system information configuration according to the system information change indication included in a paging message, according to an embodiment as disclosed herein;

In an embodiment, the UE checks if either the system information change indicator is included in the paging message or the plurality of SCI associated with each updated SI block is included in the paging message and/or the system information area identifier (Area-Id/SAID) is included in the paging message then, the UE determines whether one or more SI blocks (SIBs) available in the camped cell is updated or changed or modified. The SIT provided to the UE 102 in the form of other system information (OSI) includes the list of configurations/versions associated with each SIB and the corresponding SCI. The configuration list in the SIT is valid either in the entire PLMN or in the specific area according to the Area-Id/SAID included in the SIT.

Upon successfully acquiring the configuration list, the UE 102 starts validity timer and the stored system information (SIT) is valid until the expiry of the validity timer. In some situations it should be possible to update the stored system information i.e. SIT with new configuration/version list wherein the UE 102 which had already acquired the SIT needs to update the stored system information i.e. SIT and apply the updated configuration applicable in the coverage area where it is camped. Such update of configuration list is possible if the SCI associated with each configuration of the SIB is unique and valid either in the PLMN or within the specific area scope i.e. SI validity area defined according to the Area-Id/SAID. This would result in large range of SCI (hundreds of SCI values) associated with each SIB if large number of configuration is defined or extensions to existing configuration are done. It is possible to use the same SCI for two different configurations of the same SIB within the scope of PLMN if the two configurations are not used at the same time. It is possible to use the same SCI for two different configurations of the same SIB within the PLMN if the area validity of the SCI associated with the two configurations is defined by the Area-Id/SAID. From UE perspective, the configuration of the SIB associated with the SCI if stored in the UE 102 is valid for some period like 12 hours or 24 hours i.e. SI validity timer. After such validity period it is possible to associate the same SCI with the different configuration of the SIB.

If the SCI range is small (few tens of SCI value) then the SCI range becomes rather restrictive to cover all the different configurations associated with the corresponding SIB. In such scenario it is not possible to have unique SCI to associate to the corresponding configuration of the SIB. This will then result that the same SCI can be associated with more than one configuration of the SIB within the scope of PLMN. In such situations when the same SCI is used for different configurations of the SIB within the scope of PLMN then the Area-Id/SAID defines the unique scope of the SCI. The system information change indicator included in the paging message is not sufficient to handle the update of the configuration of the SIB associated with that SCI. Apart from the system information change indicator in the paging message, the changed SCI or value tag i.e., counter associated with version of configuration of corresponding SIB is transmitted in the paging message or the MSI. The UE upon receiving the system information change indicator in the paging message decodes the MSI in the beginning of next modification interval where the Area-Id/SAID associated with the SIB remains same but the SCI or value tag is changed. Alternately, the UE upon receiving the system information change indicator, SI block type and associated SCI in the paging message to determine the corresponding configuration of that SI block is expected to be updated. For changed Area-Id/SAID acquired from MSI for which the SCI or value tag has remained unchanged the UE 102 is required to acquire the new configuration for the respective SIBs. This mechanism is explained in details in the FIG. 8.

The update or change or modification of the configuration of one or more SI blocks (SIBs) is determined based on the presence of system information change indicator in the paging message, wherein the system information change indicator can be the single bit indicating that at least one SI block (SIB) available in the cell 104 is updated or changed or modified. The paging message includes the single bit indicator for SI update as well as the SI block type to indicate which SI block available in the camped cell is expected to be updated or changed or modified. The update or change or modification of configuration of one or more SI blocks (SIBs) is determined based on the presence of the system information change indicator in the paging message. The system information change indicator can be the bitmap indicating which SI blocks (SIBs) available in the cell 104 is updated or changed or modified. The bitmap in the paging message is equal in length to the number of SI blocks (SIBs) available in the camped cell excluding the MIB #1 and MIB #2 (i.e. SIB1). When the system information change indicator is the single bit then the UE 102 is required to read the MSI at the start of the next modification period to acquire the plurality of SCI and determine which SCI are changed compared to the SCI previously acquired in the camped cell. When the system information change indicator is the bitmap then the UE 102 is still required to read the MSI at the start of the next modification period to acquire the changed SCI corresponding to bit in the bitmap for which associated SI block (SIB) configuration is updated or changed or modified.

When the system information change indicator is the bitmap and the changed SCI corresponding to bit in the bitmap for which associated SI block (SIB) configuration is expected to be updated or changed or modified is included in the paging message then the UE 102 is not required to read the MSI at the start of the next modification period.

When the system information change indicator is a single bit and the changed SCI associated to the SI block type is included in the paging message for which the corresponding SI block (SIB) configuration is expected to be updated or changed or modified then the UE 102 is not required to read the MSI at the start of the next modification period.

In an embodiment, the update or change or modification of configuration/version of one or more SI blocks (SIBs) is determined based on the presence of plurality of SCI. If the SCI associated with the SI block (SIB) in the paging message is different from the SCI of the respective SI block (SIB) obtained previously from the MSI in the camped cell.

In an embodiment, the update or change or modification of configuration/version of one or more SI blocks (SIBs) is determined based on the presence of system information change indicator. The system information change indicator is either a single bit indicating that at least one SI block available in the cell is updated/changed/modified or the bitmap indicating which SI block (SIB) available in the camped cell is updated/changed/modified.

In an embodiment, the update or change or modification of configuration/version of one or more SI blocks (SIBs) is determined based on the presence of system information change indicator and one or more SI block types for which associated SCI is also included. If the SCI associated with the SI block type included in the paging message is not same as the SCI of the respective SI block type obtained previously from the MSI in the camped cell and corresponding SIB configuration is not available in stored system information, then the UE acquires the updated SIB blocks configuration broadcasted from the start of next modification interval without re-acquiring the MSI.

In an embodiment, the update or change or modification of configuration/version of one or more SI blocks (SIBs) is determined based on the presence of system information change indicator and plurality of SCI. If the SCI associated with the SI block (SIB) in the paging message is same as the SCI of the respective SI block (SIB) obtained previously from the MSI in the camped cell, then the changed SCI associated with SIB blocks updated or modified or changed is broadcasted in the MSI from the start of next modification interval.

In an embodiment, the update or change or modification of configuration/version of one more SI blocks (SIBs) is determined based on the presence of Area-Id/SAID, if the Area-Id/SAID in the paging message is different from the Area-Id/SAID obtained previously from the MSI in the camped cell.

Referring to the FIG. 7a and FIG. 7b, the system modification interval N−1 (710a), N (710b), N+1 (710c) and N+2 (710d) can be on the order of several tens of seconds to few hundreds of seconds. The system modification interval can be defined in terms integer multiples of the paging cycle or the idle/inactive mode discontinuous reception (DRX) cycle (i.e. based on something called as modification co-efficient). Since the paging cycle is the UE specific and different UEs may be configured with different paging cycles it is still possible to align the system modification interval for different UEs based on appropriate configuration of the modification co-efficient for each UE. The UE 102 which is camped to the cell 1 104a controlled by the eNB 1 103a acquires in the modification interval N 710b the other system information (OSI) i.e. SI blocks (SIBs) from the TRP 105 serving the UE 102 in the camped cell (i.e., cell 1 104a). The UE 102 stores the acquired other system information i.e. SIT 720 which includes one or more configuration/version list for each SIB and the associated SCI. The stored system information i.e. SIT 720, is shown for brevity which depicts only the SCI associated with each SIB. However stored system information i.e. SIT 720 can be similar to the detailed SIT structure depicted in the FIG. 5a which includes the configuration/version list for each SIB and the associated SCI and also the Area-Id/SAID.

FIG. 7a illustrates the example scenario, after receiving system information change indication in the paging message when the changed SCI and/or Area-Id acquired from the MSI are available in the stored SIT 720. During the system information modification N 710b, the UE 102 is camped to the cell 1 104a after reading the MSI broadcasted by the TRP 105 belonging to the Cell 1 104a. In the acquired MSI, the UE 102 reads the SCI associated with each SIB and/or Area-Id/SAID. The UE 102 applies the configuration 730 referring to the stored SIT 720 according to SCI and/or Area-Id/SAID from acquired MSI in interval N 710b. The applied configuration 730 for example refers to SCI #1 for SIB X 731, SCI #3 for SIB Y 732 and SCI #1 for SIB Z 733. After applying the configuration, the UE 102 performs idle/inactive mode operations like monitoring the PDCCH/ePDCCH during the paging opportunity every paging cycle to check if paging message is transmitted by the camped cell i.e., cell 1 104a.

The paging message may not be transmitted every paging opportunity because there may not be page record for any UE. Whenever the paging message is transmitted by the TRP of the serving cell during modification interval N 710b, the paging message 740 may include at least the SCI associated with each SIB and/or Area-Id/SAID and paging record for one or more UEs 102. The SCI associated with each SIB and/or Area-Id/SAID transmitted in the paging message 740 during the interval N 710b is same as the SCI and/or Area-Id/SAID broadcasted in the MSI by the TRP 105 of the serving cell during interval N 710b. The paging message can be transmitted during each paging opportunity by the TRP of serving cell in modification interval N 710b even though there is no paging record for an individual UE. This is possible when the configuration/version of some SIB(s) applicable in the Cell 1 104a is expected to be changed or updated in system modification interval N+1 710c i.e. time domain update of system information. The paging message 740 including the Area-Id #1 742, the SCI #1 for SIB X, SCI #3 for SIB Y and SCI #1 for SIB Z 743 and also the system information change indication i.e. a single bit 741 is transmitted in every paging opportunity during system modification interval N 710b. The update or change or modification of configuration of one or more SI blocks (SIBs) is determined based on the presence of system information change indicator in the paging message, wherein the system information change indicator can be a single bit indicating that at least one SI block (SIB) available in the cell is updated or changed or modified.

During the paging opportunities in the modification interval N 710b, the UE 102 monitors the PDCCH/ePDCCH which is addressed with P-RNTI indicating the presence and resource where the paging message can be decoded. On decoding the paging message 740, the UE 102 detects the system information change indication 741 indicating the UE 102 that it shall read the MSI transmitted by the TRP 105 of camped cell (i.e., cell 1 104a) at the beginning of system modification interval N+1 710c to determine which configuration corresponding to the SIB has changed or updated or modified. If the UE 102 is still camped to the cell 1 104a, the UE 102 acquires the MSI 750 broadcasted by TRP 105 of the cell 1 104a from the start of the modification interval N+1 710c. The acquired MSI 750 during interval N+1 710c refers to Area-Id #1 751, SCI #2 for SIB X 752, SCI #1 for SIB Y 753 and SCI #1 for SIB Z 754. The UE 102 determines that even though the Area-Id/SAID has not changed in the acquired MSI 750 in interval N+1 710c compared to the MSI acquired in interval N 710b the SCI associated with SIB X and SIB Y have changed while the SCI associated with SIB Z remains same. In the acquired MSI 750 in interval N+1 710c compared to the MSI acquired in interval N 710b SIB X SCI is changed to SCI #2 752 from SCI #1 731 and SIB Y SCI is changed to SCI #1 753 from SCI #3 732 while SIB Z SCI remains unchanged as SCI #1 754/733.

Since the SCI of SIB X and SIB Y has changed, the UE 102 needs to re-acquire and apply new configuration associated with SIB X and SIB Y. The UE 102 then refers to the stored information i.e. SIT 720 to check the configuration list if the configurations associated with SCI #2 752 for SIB X and SCI #1 753 for SIB Y are available. Since the required configurations associated with SIB X and SIB Y based on SCI values acquired from the MSI 750 are available in the stored system information i.e. SIT 720 and the validity timer for the respective configuration is not expired; there is no need for the UE 102 to perform the re-acquisition of the new configuration. The UE 102 disables the previous configuration for the SIB X, SIB Y and SIB Z and applies the new configuration 760 from the stored system information i.e. SIT 720 according to SCI #2 761 for SIB X, SCI #1 762 for SIB Y and SCI #1 763 for SIB Z respectively. During the modification interval N+1 710c if any paging message is transmitted then the paging message would include Area-Id #1 and SCI #2 for SIB X, SCI #1 for SIB Y and SCI #1 for SIB Z respectively which is same as that transmitted in the MSI 750.

FIG. 7b illustrates the example scenario, after receiving the system information, the change indication in the paging message, when changed SCI and/or Area-Id acquired from MSI, are not available in stored SIT 720. The paging message can also be transmitted during each paging opportunity by the TRP of serving cell in modification interval N 710b even though there is no paging record for an individual UE. This is possible when the configuration/version of some SIB(s) applicable in the cell 1 104*a* is expected to be changed or updated in system modification interval N+1 710*c* i.e. time domain update of system information. The paging message 740 including the Area-Id #1 742, the SCI #1 for SIB X, SCI #3 for SIB Y and SCI #1 for SIB Z 743 and also the system information change indication i.e. a bitmap 741 is transmitted in every paging opportunity during system modification interval N 710*b*. The update or change or modification of configuration of one or more SI blocks (SIBs) is determined based on the presence of system information change indicator in the paging message. The system information change indicator can be the bitmap indicating which SI block (SIB) available in the camped cell 104 is updated/changed/modified. The bitmap included in the paging message 740 received in the modification interval N 710*b* indicates that configuration corresponding to SIB X, SIB Y and SIB Z is expected to be updated or changed or modified in modification interval N+1 710*c*. In FIG. 7*b*, the acquired MSI 750 during interval N+1 710*c* refers to Area-Id #1 751, SCI #3 for SIB X 752, SCI #1 for SIB Y 753 and SCI #2 for SIB Z 754. The UE 102 determines that even though the Area-Id has not changed in the acquired MSI 750 in interval N+1 710*c* compared to the MSI acquired in interval N 710*b* the SCI associated with SIB X, SIB Y and SIB Z have changed. In the acquired MSI 750 in interval N+1 710*c* compared to the MSI acquired in interval N 710*b* SIB X SCI is changed to SCI #3 752 from SCI #1 731, SIB Y SCI is changed to SCI #1 753 from SCI #3 732 and SIB Z SCI is changed to SCI #2 754 from SCI #1 733. Since SCI of SIB X, SIB Y and SIB Z has changed the UE 102 needs to re-acquire and apply new configuration associated with SIB X, SIB Y and SIB Z.

Further, the UE 102 then refers to the stored system information i.e. stored SIT 720 to check the configuration list if the configurations associated with SCI #3 752 for SIB X, SCI #1 753 for SIB Y and SCI #2 754 for SIB Z are available. Since the required configurations associated with SIB X and SIB Z based on SCI values acquired from MSI 750 are not available in the stored system information i.e. SIT 720, the UE 102 shall acquire the new configurations. In the acquired MSI 750 since the broadcast indicator/FLAG 755 is FALSE (i.e. the other system information is not periodically broadcasted), the UE 102 shall trigger the SI request procedure to acquire the new configuration corresponding to the SIB X and the SIB Z. The UE 102 performs the SI request-response procedure as depicted in FIG. 4*a* to acquire the configuration of SIB X associated with SCI #3 752 and configuration of SIB Z associated with SCI #2 754. The configuration of SIB Y associated with SCI #1 753 is available in the stored system information i.e. SIT 720 and the validity timer for the SIB Y configuration has not expired; so that there is no need to request the configuration of SIB Y. After acquiring the new configuration of SIB X and SIB Z through request-response procedure, the UE 102 stores the new configurations along with the associated SCI in the configuration list present in the SIT 720.

Further, the UE 102 disables the previous configuration for SIB X, SIB Y and SIB Z and applies the new configuration 760 from the updated SIT 720 according to SCI #3 761 for SIB X, SCI #1 762 for SIB Y and SCI #2 763 for SIB Z respectively. During the modification interval N+1 710*c* if any paging message is transmitted then the paging message would include Area-Id #1 and SCI #3 for SIB X, SCI #1 for SIB Y and SCI #2 for SIB Z respectively which is same as that transmitted in the MSI 750. In the FIGS. 7*a* and 7*b* it is optional to transmit the Area-Id and/or SCI associated with each SIB available in the camped cell in the paging message when the paging message includes the system information change indication in modification interval N 710*b*. However it is required that the UE 102 reads the MSI from the start of modification interval N+1 710*c* to determine the changed SCI. Such a UE requirement to re-acquire the MSI from the start of modification interval N+1 710*c* can be avoided by the alternative proposed in FIG. 7*c*.

Figure 7C:
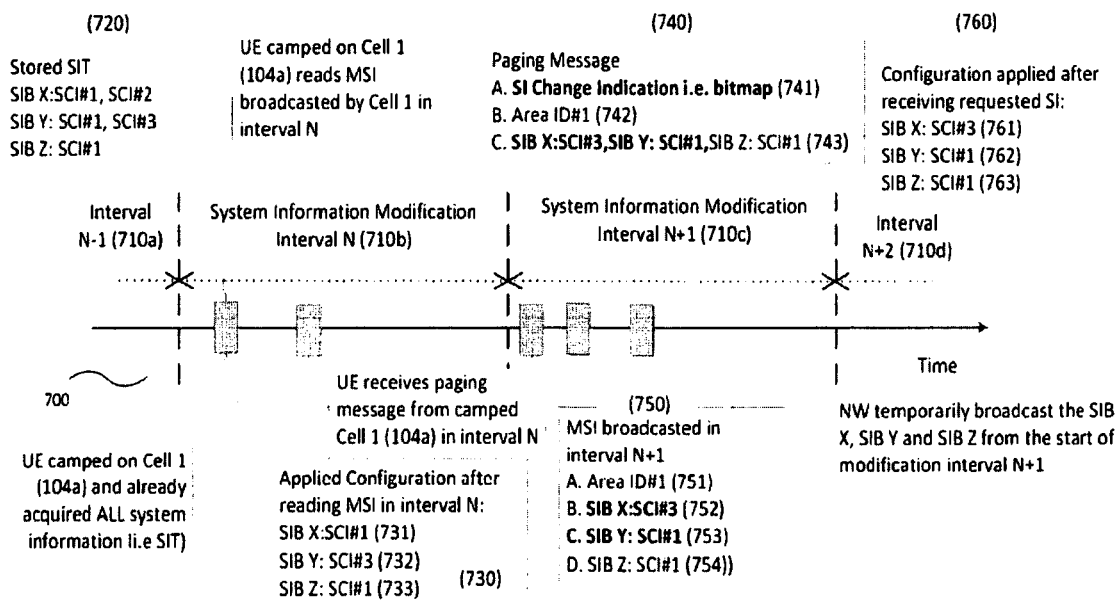
FIG. 7c illustrates an example scenario in which the system information change indication along with changed SCI and/or Area-Id is included in paging message, according to an embodiment as disclosed herein.

FIG. 7*c* illustrates the scenario where the system information change indication along with changed SCI and/or Area-Id is included in paging message. During the system information modification N 710*b*, the UE 102 is camped to the cell 1 104*a* after reading the MSI broadcasted by the TRP belonging to the cell 1 104*a*. In the acquired MSI, the UE 102 reads the SCI associated with each SIB and/or Area-Id/SAID. Further, the UE 102 applies the configuration 730 referring to the stored SIT 720 according to SCI and/or Area-Id/SAID from the acquired MSI in interval N 710*b*. The applied configuration 730 for example refers to SCI #1 for SIB X 731, SCI #3 for SIB Y 732 and SCI #1 for SIB Z 733. After applying the configuration, the UE 102 performs the idle/inactive mode operations like monitoring the PDCCH/ePDCCH during the paging opportunity every paging cycle to check if paging message is transmitted by the camped cell i.e., cell 1 104*a*.

The paging message is transmitted during each paging opportunity by the TRP of serving cell in the modification interval N 710*b* even though there is no paging record for an individual UE. This is possible when the configuration/version of some SIB(s) applicable in the cell 1 104*a* is expected to be changed or updated in system modification interval N+1 710*c* i.e. time domain update of system information. The paging message 740 including the Area-Id #1 742, the SCI #3 for SIB X, SCI #1 for SIB Y and SCI #1 for SIB Z 743 and also the system information change indication i.e. a bitmap 741 is transmitted in every paging opportunity during system modification interval N 710*b*. The update or change or modification of configuration of respective SI blocks (SIBs) is determined based on the bit status of the corresponding bit in the bitmap of system information change indication and the plurality of changed SCI in the paging message. For e.g., the length of the bitmap is equal to the number of available SIBs in the camped cell excluding the MIB #1 and MIB #2 (SIB1) wherein the bit status as '1' indicates the corresponding SIB is expected to be changed/updated/modified and the bit status as '0' indicates the corresponding SIB remains unchanged.

Further, the SCI associated with the SI block indicated by the bit status in bitmap included in the paging message is different from the SCI of the respective SI block obtained previously from the MSI in the camped cell 104. The acquired paging message 740 during interval N 710*b* refers to Area-Id #1 742, SCI #3 for SIB X, SCI #1 for SIB Y and SCI #1 for SIB Z 743 and the system information change indication 741. Further, the UE 102 determines that even though the Area-Id has not changed in the received paging 740 in interval N 710*b* compared to the MSI 730 acquired in interval N 710*b* the SCI associated with SIB X and SIB Y have changed while the SCI for SIB Z remains changed. In the acquired MSI 730 in interval N 710*b* compared to the received paging message in interval N 710*b* SIB X SCI is changed to SCI #3 743 from SCI #1 731, SIB Y SCI is changed to SCI #1 743 from SCI #3 732 and SIB Z SCI remains unchanged to SCI #1 743 and 733. In this case when in the paging message 740 during interval N 710*b* the system information change indication is the bitmap and the changed SCI corresponds to bit status in the bitmap for which associated SI block (SIB) configuration is expected to be updated or changed or modified then the UE 102 is not required to read the MSI 750 at the start of the next modification interval N+1 710c. Further, the UE 102 simply assumes the Cell 1 104a would temporarily broadcast the updated SIBs i.e. SIB X and SIB Y in the respective SI windows from the start of the modification interval N+1 710c to re-acquire the updated SIBs if not present in the stored system information i.e. SIT 720.

Figure 8:
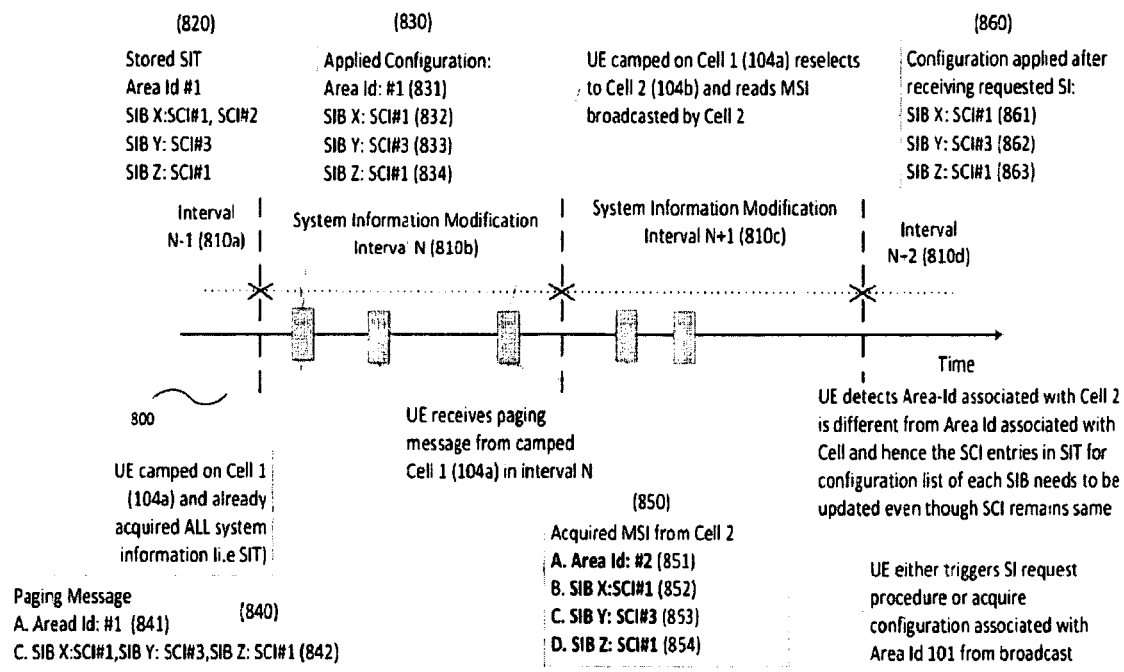
FIG. 8 illustrates an example scenario in which change in the system information configuration according to the system information area identifier (Area-Id/SAID) included in the MSI is explained, according to an embodiment as disclosed herein.

FIG. 8 is a generic design (800) for change in system information configuration according to the Area-Id/SAID included in the MSI, according to the embodiment herein. The system information modification interval N−1 810a, N 810b, N+1 810c and N+2 810d can be on the order of several tens of seconds to few hundreds of seconds. The UE 102 which is camped to the cell 1 104a controlled by the eNB 1 103a acquires the other system information (OSI) from the TRP 105 serving the UE 102 in modification interval N 810b. Further, the UE 102 stores the acquired other system information (OSI) i.e. SIT 820, which includes one or more configuration/version list for each SIB and the associated SCI. The SIT 820 is shown for brevity which depicts only the SCI associated with each SIB. However, the SIT 820 can be similar to the detailed SIT structure depicted in FIG.5a which includes the configuration list for each SIB and the associated SCI and also the Area-Id/SAID. When the network uses the same SCI for different configurations/version of the SIB within the scope of the area-Id/SAID then the UE 102 is not required to maintain in the stored SIT all configurations/versions of that SIB associated with that SCI. In the SIT 820, the UE maintains the configurations of each SIB associated with respective SCI corresponding to Area-Id #1. On determining the configuration needs to be updated based on Area-Id/SAID change, the UE 102 upon acquiring the new configuration replaces the old configuration with the new configuration in the SIT associated with the same SCI for the SIB corresponding to the new Area-Id/SAID.

Further, the UE 102 is camped to the cell 1 104a after reading the MSI broadcasted by the TRP 105 belonging to the cell 1 104a. In the acquired MSI, the UE 102 reads the SCI associated with each SIB and/or Area-Id/SAID. Further, the UE 102 applies the configuration referring to the stored system information i.e. SIT 820 according to SCI and/or Area-Id/SAID #1 from acquired MSI in interval N 810b. The applied configuration 830 refers to the SCI #1 for SIB X 832, SCI #3 for SIB Y 833 and SCI #1 for SIB Z 834 corresponding to Area-Id/SAID #1 831. The Area-Id/SAID #1 831 is common for the configuration of all SIBs. This should not be considered a restriction wherein it is possible to specific Area-Id/SAID for the configuration of the particular SIB. After applying the configuration, the UE 102 performs the idle/inactive mode operations like monitoring the PDCCH/ePDCCH during the paging opportunity every paging cycle to check if the paging message is transmitted by the camped cell i.e., cell 1 104a. Whenever the paging message is transmitted by the TRP 105 of the serving cell during modification interval N 810b, the paging message 840 includes at least the SCI associated with each SIB and/or Area-Id/SAID and paging record for one or more UEs 102a-102c. The SCI associated with each SIB and/or Area-Id/SAID transmitted in the paging message 840 during the interval N 810b is same as the SCI and/or Area-Id/SAID broadcasted in MSI by the TRP 105 of the serving cell i.e. cell 1 104a during interval N 810b. The paging message 840 including the Area-Id #1 841, the SCI #1 for SIB X, SCI #3 for SIB Y and SCI #1 for SIB Z 842 may be transmitted in every paging opportunity during the system modification interval N 810b.

During the modification interval N 810b, the UE 102 which was camped to the cell 1 104a served by one or more TRPs 105 controlled by the eNB 103a may experience poor signal quality from the cell 1 104a due to mobility towards the cell edge. The UE 102 may detect synchronization signals from one or more TRPs controlled by the eNB 103b the serving cell 2 104b and upon synchronization signal detection can perform signal strength comparison of the cell 1 104a quality and the cell 2 104b quality based on either beam reference signals (BRS) or some reference signals. The TRPs of the cell 2 104b is periodically broadcasting the respective MSI 850. If the signal quality of the cell 2 104b is better than that of cell 1 104a then the UE 102 performs cell-reselection according to a threshold criterion also called as cell re-selection criterion and camps to the cell 2 104b. The acquired MSI 850 from the cell 2 104b during interval N 810b refers to Area-Id #2 851, SCI #1 for SIB X 852, SCI #2 for SIB Y 853 and SCI #1 for SIB Z 854. Further, the UE 102 determines that even though the SCI associated with SIB X, SIB Y and SIB Z has not changed in the acquired MSI 850 from the cell 2 104b compared to the MSI 830 acquired from the cell 1 104a the Area-Id/SAID associated with SIB X, SIB Y and SIB Z has changed to Area-Id #2 851 compared to the Area-Id #1 831 of cell 1 104a i.e. spatial domain change of system information.

Since the Area-Id/SAID has changed the configurations associated with SIB X, SIB Y and SIB Z based on the SCI values acquired from the MSI 850 need to be updated in the SIT 820. The UE 102 shall therefore acquire the new configurations according to Area-Id/SAID #2 851 associated with SIB X, SIB Y and SIB Z for the same SCI value. In the acquired MSI 850 if the broadcast indicator/FLAG is FALSE then the UE 102 shall trigger the SI request procedure else if the broadcast indicator/FLAG is TRUE then the UE 102 acquire the new configuration from the SI windows of the respective SIBs. The UE 102 triggers the SI request procedure as depicted in FIG.4a to acquire the updated configuration of SIB X associated with SCI #1 852, updated configuration of SIB Y associated with SCI #3 853 and updated configuration of SIB Z associated with SCI #1 854 if the broadcast indicator/FLAG is FALSE. After acquiring the new configuration either through SI request-response procedure or from periodic broadcast, the UE 102 replaces the old configurations with the new configurations corresponding to Area-Id #2 along with the associated SCI in the configuration list present in the SIT 820. Further, the UE 102 disables the previous configuration for SIB X, SIB Y and SIB Z and applies the new configuration 860 from the updated SIT 820 according to SCI #1 861 for SIB X, SCI #3 862 for SIB Y and SCI #1 863 for SIB Z respectively. During the modification interval N+1 810c if any paging message is transmitted then the paging message would include Area-Id #2 and SCI #1 for SIB X, SCI #3 for SIB Y and SCI #1 for SIB Z respectively which is same as that transmitted in the MSI 850. It is also possible that the Area-Id/SAID associated with the configuration can also be included in the paging message.

In some situations where it is required that the network decides to update large number of configurations of the corresponding SIB then some modification is needed for the procedure depicted in FIG. 7b and FIG. 8 for updating the SIT. The network can include the system information change indication in paging message in modification interval N whereas in the MSI broadcasted in modification interval N+1 includes the SIT invalidity FLAG which is set to TRUE indicating the UE 102 to clear all the stored system information (i.e. SIT) and acquire new configuration according to the SCI in acquired in the MSI. Further, the network can then provide the configuration corresponding to the SCI broadcasted in the MSI and additional configuration list and associated SCI for which major updated have been performed at the network side.

Figure 9A:
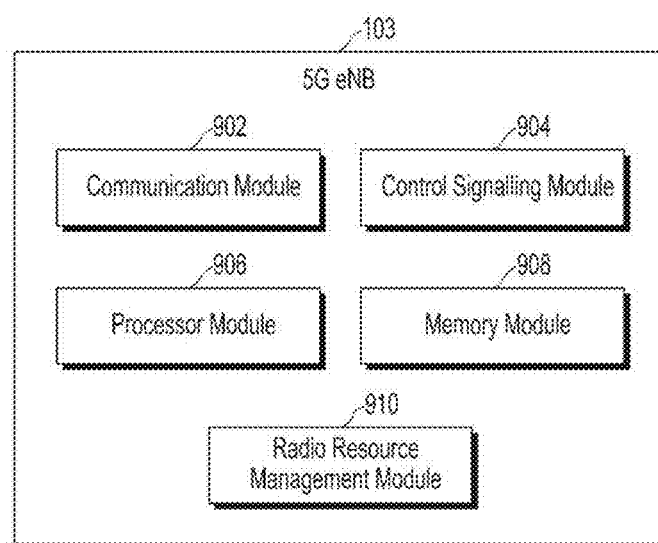
FIG. 9a is a block diagram illustrating various modules of a 5G eNB, according to an embodiment as disclosed herein.

FIG.9*a* is a block diagram illustrating various modules of the 5G eNB 103, according to the embodiments as disclosed herein. In an embodiment, the 5G eNB 103 includes a communication module 902, a control signaling module 904, a processor module 906, a memory module 908 and a radio resource management module 910. In an embodiment, the communication module 902 is configured to broadcast synchronization signal, the PBCH and the SBCH to plurality of UEs 102*a*-102*c* and 102*x*-102*z*. In another embodiment, the communication module 902 is configured to receive and detect system information request from plurality of UEs 102*a*-102*c* and 102*x*-102*z*. In yet another embodiment, the communication module 902 is configured to transmit system information response message or broadcast OSI during the SI windows to plurality of UEs 102*a*-102*c* and 102*x*-102*z*. In an embodiment, the communication module 902 is configured to communicate RRC signaling to and from the UE 102. For example, the wireless communication module 902 in the 5G eNB 103 can be configured to communicate the system information table (SIT) to one or more UEs 102*a*, 102*b*, 102*c*. Further, the communication module 902 in the 5G eNB 103 can be configured to transmit and receive data from one or more UEs 102*a*, 102*b*, 102*c* according to a physical layer waveform and coding for next generation wireless system. The control signaling module 904 in 5G eNB 103 can be configured to prepare the related RRC messages to be transmitted to the UE 102 and also can be configured to parse the related RRC message received from the UE 102.

Further, the control signaling module 904 in 5G eNB 103 can be configured to determine the bearer to be transmitted over within respective cells 104 in the eNB's 103. The bearer described herein can either be a Data Radio Bearer (DRB) or a Signaling Radio Bearer (SRB). The selection of the bearer is based on several variables, which include for example, but are not limited to, Quality of Service requirements (QoS), traffic characteristics of the bearer, and load and coverage area of the serving cell of eNB 103.

The processing module 906 synchronizes the operations and executes the instructions based on the timing signals generated by the clock chip.

Further, the memory module 908 is also configured to store information related to operation of the 5G eNB103 and the UE 102. The memory module 908 can be configured to store various UE related configurations when the UE 102 is in the inactive/connected mode. The radio resource management module 910 is responsible for various aspects like beam level mobility and cell level mobility etc. The radio resource management module 910 in the 5G eNB 103 may be configured to evaluate the handover decisions based on the BRS measurement reports sent by one or more UEs 102*a*-102*c* and 102*x*-102*z*. The 5G eNB 103 receives the measurement reports from one or more UEs 102*a*-102*c* and 102*x*-102*z* and decide to perform handover for that particular UE. Similarly, radio resource management module 910 in the 5G eNB 103 can be configured to receive the CSI-RS RSRP measurements for handling the measurement set and candidate set for beam level mobility handling for one or more UEs 102*a*, 102*b*, 102*c* etc.

Figure 9B:
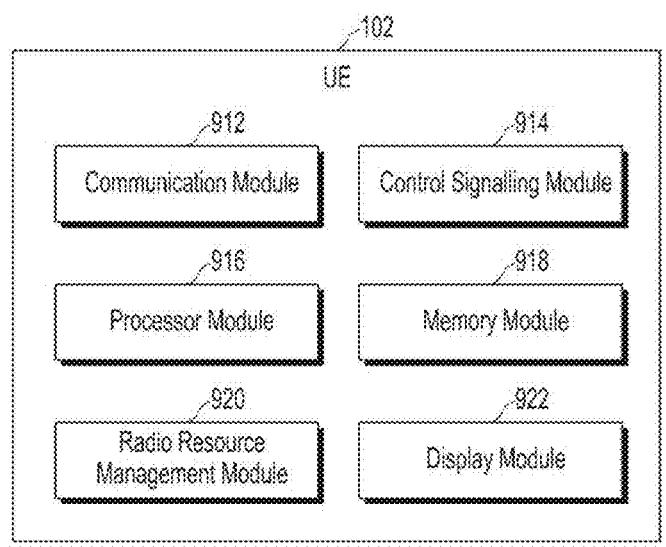
FIG. 9b is a block diagram illustrating various modules of a UE, according to an embodiment as disclosed herein.

FIG. 9*b* is a block diagram illustrating various modules of the UE 102, according to the embodiments as disclosed herein. In an embodiment, the UE 120 includes a communication module 912, a control signaling module 914, a processor module 916, a memory module 918, a radio resource management module 920 and a display module 922. In an embodiment, the communication module 912 is configured to decode the synchronization signal, the beam index sequence, the PBCH and the SBCH broadcasted by the 5G eNB 102. In an embodiment, the communication module 912 is configured to transmit the SI request for requesting one or more SIBs and/or SIT on the resource configured by the eNB 103. In an embodiment, the communication module 912 is configured to receive system information response message or receive the one or more blocks transmitted by the 5G eNB 103 during the respective SI windows. In an embodiment, the communication module 912 is configured to communicate RRC signaling to and from the 5G eNB 103. For example, the wireless communication module 912 in the UE 102 can be configured to communicate to request for SIT update or for triggering the SI request procedure, measurement report and RRC reconfiguration complete message to the 5G eNB 103. Further, the communication module 912 in the UE 102 can perform random access procedure on the cell 104 of the next generation RAT served by the 5G eNB 103. Further, the communication module 912 in the UE 102 can be configured to transmit and receive data from the 5G eNB 103 according to the physical layer waveform and coding assumed for next generation wireless system.

The control signaling module 914 in the UE 102 can be configured to prepare the related RRC messages to be transmitted to the 5G eNB 103 and also can be configured to parse the related RRC message received from the 5G eNB 103.

Further, the memory module 918 is also configured to store information related to UE operation. The memory module 918 can be configured to store various configurations like minimum system configuration received on the PBCH/SBCH, the SIT received in the response message or acquired from broadcast, measurement configuration, etc. received from the 5G eNB 103. The radio resource management module 920 in the UE 102 is responsible for various aspects like cell level mobility and beam level mobility etc.

The radio resource management module 920 in the UE 102 may be configured to evaluate the cell selection/reselection handover events based on the BRS measurements and perform CSI-RS RSRP measurements respectively. The display module 922 in the UE 102 can be configured so that user can input information or information can output on the display for the user to understand some UE operations when the UE 102 is operating in dual connectivity mode of operation. Most of the UE operations are transparent to the user and may not need user input nor output on the display.

Figure 10A:
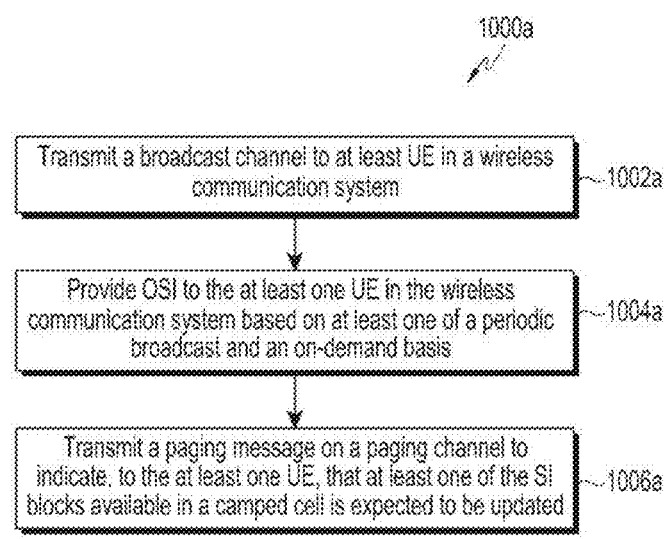
FIG. 10a is a flow diagram illustrating a method for provisioning the SI by the base station in the wireless communication system, according to an embodiment as disclosed herein.

FIG. 10*a* is a flow diagram 1000*a* illustrating a method for provisioning the SI by the base station 103 in the wireless communication system 100, according to an embodiment as disclosed herein.

At step 1002*a*, the method includes transmitting the broadcast channel to the at least one UE 102. The broadcast channel periodically transmits the MSI including at least one of the first MIB and the second MIB. In an embodiment, the method allows the communication module 902 to transmit the broadcast channel to the at least one UE 102.

At step 1004*a*, the method includes providing the OSI to the at least one UE 102 based on at least one of the periodic broadcast and the on-demand basis. The on-demand delivery of at least one SI block of the OSI is based on the SI request procedure triggered by the at least one UE 102. The on-demand basis to deliver the SI block of the OSI available in the camped cell 104 is decided based on at least one of the indication and the flag included in the MSI for that SI block. In an embodiment, the method allows the radio resource management module 910 to provide the OSI to the at least one UE 102 based on at least one of the periodic broadcast and the on-demand basis.

At step 1006*a*, the method includes transmitting the paging message on the paging channel to indicate, to the at least one UE 102, that at least one of the SI blocks available in the camped cell 104 is expected to be updated. In an embodiment, the method allows the radio resource management module 910 to transmit the paging message on the paging channel to indicate, to at least one UE 102, that at least one of the SI blocks available in the camped cell 104 is expected to be updated.

The various actions, acts, blocks, steps, or the like in the flow diagram 1000*a* may be performed in the order presented, in a different order or simultaneously. Further, in some embodiments, some of the actions, acts, blocks, steps, or the like may be omitted, added, modified, skipped, or the like without departing from the scope of the invention.

Figure 10B:
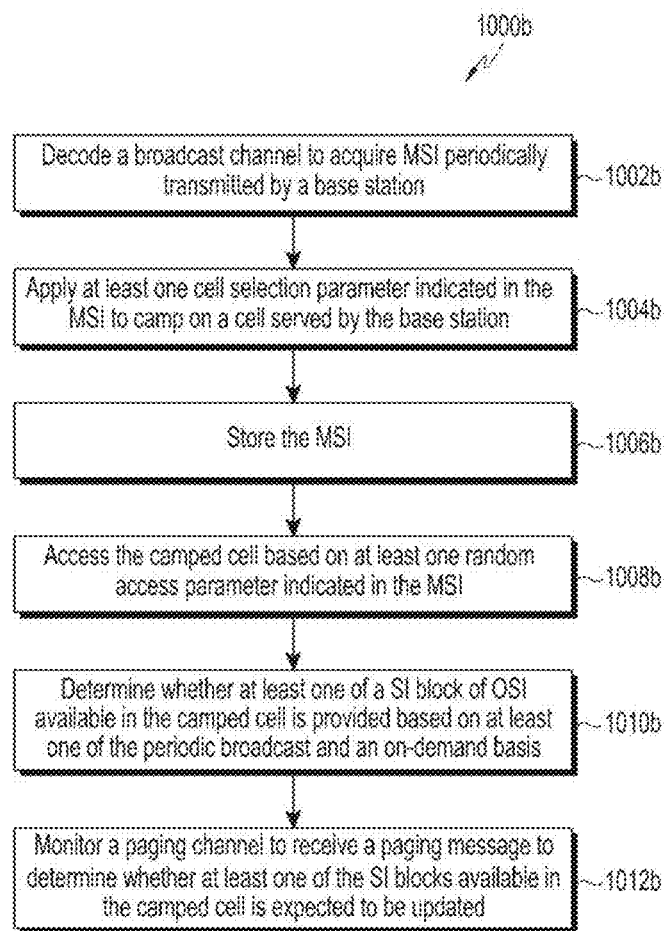
FIG. 10b is a flow diagram illustrating a method for provisioning the SI for the UE in the wireless communication system, according to an embodiment as disclosed herein.

FIG. 10*b* is a flow diagram 1000*b* illustrating a method for provisioning the SI for the UE 102 in the wireless communication system 100, according to an embodiment as disclosed herein.

At step 1002*b*, the method includes decoding the broadcast channel to acquire the MSI periodically transmitted by the base station 103. In an embodiment, the method allows the communication module 912 to decode the broadcast channel to acquire the MSI periodically transmitted by the base station.

At step 1004*b*, the method includes applying at least one cell selection parameter indicated in the MSI to camp on the cell 104 served by the base station 103. In an embodiment, the method allows the radio resource management module 920 to apply the at least one cell selection parameter indicated in the MSI to camp on the cell 104 served by the base station 103.

At step 1006*b*, the method includes storing the MSI. In an embodiment, the method allows the memory module 918 to store the MSI.

At step 1008*b*, the method includes accessing the camped cell 104 based on the at least one random access parameter indicated in the MSI. In an embodiment, the method allows the radio resource management module 920 to access the camped cell 104 based on at least one random access parameter indicated in the MSI.

At step 1010*b*, the method includes determining whether at least one of the SI block of OSI available in the camped cell 104 is provided based on the at least one of the periodic broadcast and the on-demand basis. The on-demand basis to deliver the SI block of the OSI available in the camped cell 104 is decided based on the at least one of the indication and the flag included in the MSI for that SI block. In an embodiment, the method allows the radio resource management module 920 to determine whether at least one of the SI block of the OSI available in the camped cell 104 is provided based on the at least one of the periodic broadcast and the on-demand basis.

At step 1012*b*, the method includes monitoring the paging channel to receive the paging message to determine whether at least one of the SI blocks available in the camped cell 104 is expected to be updated. In an embodiment, the method allows the radio resource management module 920 to monitor the paging channel to receive the paging message to determine whether at least one of the SI blocks available in the camped cell 104 is expected to be updated.

The various actions, acts, blocks, steps, or the like in the flow diagram 1000*b* may be performed in the order presented, in a different order or simultaneously. Further, in some embodiments, some of the actions, acts, blocks, steps, or the like may be omitted, added, modified, skipped, or the like without departing from the scope of the invention.

When the embodiments are implemented by software, firmware, middleware, or a microcode, a program code, or code segments, they can be stored in a machine-readable medium, such as a storage component. The code segment may indicate a procedure, a function, a sub program, a program, a routine, a sub routine, a module, a software package, a class, or a random combination of commands, data structures, or program description sentences. The code segment may be coupled with another code segment or a hardware circuit by transmitting and/or receiving information, data, factors, parameters, or memory contents. The information, factors, parameters, and data may be transmitted using an arbitrary proper means including memory sharing, message transmission, token transmission, and network transmission.

Further, the various actions, acts, blocks, steps, or the like in the flow diagrams or sequence diagrams may be performed in the order presented, in a different order or simultaneously. Further, in some embodiments, some of the actions, acts, blocks, steps, or the like may be omitted, added, modified, skipped, or the like without departing from the scope of the invention. In order to realize the software, the technologies described herein may be implemented as modules (for example, processes, functions and the like) performing the functions described herein. Software codes may be stored in memory units and executed by processors. The memory units may be implemented inside or outside the processor. In this case, the memory units can access the processor to be communicable through various means known in the art. Although the present disclosure has been described with an exemplary embodiment, various changes and modifications may be suggested to one skilled in the art.

What is claimed:

1. A method performed by a terminal in a wireless communication system, the method comprising:
   acquiring a system information block (SIB) broadcasted from a first cell, the SIB includes a system configuration index associated with the SIB, a system information area identifier associated with the SIB and an indicator indicating area specific or cell specific for the SIB;
   storing the acquired SIB;
   upon performing a cell selection from the first cell to a second cell, acquiring an other SIB broadcasted from the second cell, the other SIB includes a system configuration index associated with the other SIB, a system information area identifier associated with the other SIB and an indicator indicating area specific or cell specific for the other SIB; and
   determining a validity of the stored SIB in the second cell by comparing the system configuration index associated with the other SIB, the system information area identifier associated with the other SIB and the indicator indicating area specific or cell specific for the other SIB with the system configuration index associated with the SIB, the system information area identifier associated with the SIB and the indicator indicating area specific or cell specific for the SIB.

2. The method of claim 1, wherein determining the validity of the stored SIB in the second cell comprises:
in case that the system configuration index associated with the other SIB, the system information area identifier associated with the other SIB and the indicator indicating area specific or cell specific for the other SIB correspond to the system configuration index associated with the SIB, the system information area identifier associated with the SIB and the indicator indicating area specific or cell specific for the SIB, determining the stored SIB is valid for the second cell.

3. The method of claim 1, wherein determining the validity of the stored SIB in the second cell comprises:
in case that the system configuration index associated with the other SIB, the system information area identifier associated with the other SIB and the indicator indicating area specific or cell specific for the other SIB are not correspond to the system configuration index associated with the SIB, the system information area identifier associated with the SIB and the indicator indicating area specific or cell specific for the SIB, determining the stored SIB is not valid for the second cell.

4. The method of claim 1, further comprising:
receiving, from the first cell or the second cell, a master information block (MIB) including schedule information for a SIB1, wherein the schedule information for the SIB1 includes information indicating that the first cell or the second cell do not provide the SIB1 to the terminal.

5. The method of claim 1, further comprising:
receiving downlink control information (DCI) based on a paging radio network temporary identifier (P-RNTI) via physical downlink control channel (PDCCH), from the first cell or the second cell, wherein the DCI includes an indication indicating change of the SIB or the other SIB.

6. A terminal in a wireless communication system, the terminal comprising:
a transceiver; and
at least one processor configured to:
acquire via the transceiver a system information block (SIB) broadcasted from a first cell, the SIB includes a system configuration index associated with the SIB, a system information area identifier associated with the SIB and an indicator indicating area specific or cell specific for the SIB,
store the acquired SIB,
upon performing a cell selection from the first cell to a second cell, acquire via the transceiver an other SIB broadcasted from the second cell, the other SIB includes a system configuration index associated with the other SIB, a system information area identifier associated with the other SIB and an indicator indicating area specific or cell specific for the other SIB, and
determine a validity of the stored SIB in the second cell by comparing the system configuration index associated with the other SIB, the system information area identifier associated with the other SIB and the indicator indicating area specific or cell specific for the other SIB with the system configuration index associated with the SIB, the system information area identifier associated with the SIB and the indicator indicating area specific or cell specific for the SIB.

7. The terminal of claim 6, wherein the at least one processor is further configured to:
in case that the system configuration index associated with the other SIB, the system information area identifier associated with the other SIB and the indicator indicating area specific or cell specific for the other SIB correspond to the system configuration index associated with the SIB, the system information area identifier associated with the SIB and the indicator indicating area specific or cell specific for the SIB, determine the stored SIB is valid for the second cell.

8. The terminal of claim 6, wherein the at least one processor is further configured to:
in case that the system configuration index associated with the other SIB, the system information area identifier associated with the other SIB and the indicator indicating area specific or cell specific for the other SIB are not correspond to the system configuration index associated with the SIB, the system information area identifier associated with the SIB and the indicator indicating area specific or cell specific for the SIB, determine the stored SIB is not valid for the second cell.

9. The terminal of claim 6, wherein the at least one processor is further configured to:
receive via the transceiver, from the first cell or the second cell, a master information block (MIB) including schedule information for a SIB1, wherein the schedule information for the SIB1 includes information indicating that the first cell or the second cell do not provide the SIB1 to the terminal.

10. The terminal of claim 6, wherein the at least one processor is further configured to:
receive via the transceiver downlink control information (DCI) based on a paging radio network temporary identifier (P-RNTI) via physical downlink control channel (PDCCH), from the first cell or the second cell, wherein the DCI includes an indication indicating change of the SIB or the other SIB.

* * * * *